(12) United States Patent
Nishiguchi et al.

(10) Patent No.: US 9,797,273 B2
(45) Date of Patent: Oct. 24, 2017

(54) METHOD FOR CONVERTING THERMAL ENERGY INTO MECHANICAL ENERGY, ORGANIC RANKINE CYCLE DEVICE, AND METHOD FOR REPLACING WORKING FLUID

(71) Applicant: CENTRAL GLASS COMPANY, LIMITED, Ube, Yamaguchi (JP)

(72) Inventors: Yoshio Nishiguchi, Kawagoe (JP); Satoru Okamoto, Kawagoe (JP); Masatomi Kanai, Kawagoe (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 571 days.

(21) Appl. No.: 14/555,921

(22) Filed: Nov. 28, 2014

(65) Prior Publication Data

US 2015/0152749 A1    Jun. 4, 2015

(30) Foreign Application Priority Data

Nov. 29, 2013   (JP) ................................. 2013-248752

(51) Int. Cl.
    *C09K 5/04*    (2006.01)
    *F01K 25/08*   (2006.01)
    *F01K 25/10*   (2006.01)

(52) U.S. Cl.
    CPC .............. *F01K 25/10* (2013.01); *C09K 5/045* (2013.01); *F01K 25/08* (2013.01); *C09K 2205/126* (2013.01)

(58) Field of Classification Search
    CPC ... C09K 2205/126; C09K 5/045; F01K 25/08; F01K 25/10
    See application file for complete search history.

(56) References Cited

U.S. PATENT DOCUMENTS 3,393,515 A      7/1968 Tabor et al.
2012/0117991 A1  5/2012 Rached
(Continued)

FOREIGN PATENT DOCUMENTS

CN   102307965 A   1/2012
EP     3034579 A1  6/2016
(Continued)

OTHER PUBLICATIONS

Chao He et al., The optimal evaporation temperature and working fluids for subcritical organic Rankine cycle, Energy journal, Jan. 16, 2012, pp. 136-143, vol. issue 38, Elsevier.
(Continued)

*Primary Examiner* — Mark Laurenzi
*Assistant Examiner* — Wesley Harris
(74) *Attorney, Agent, or Firm* — Typha IP LLC

(57) ABSTRACT

Provided is a method for converting thermal energy into mechanical energy by use of an organic rankine cycle system that accommodates a working fluid composition. The method includes sequentially performing: evaporating the working fluid composition; expanding the working fluid composition; condensing the working fluid composition; and transferring the working fluid composition, while raising a pressure thereof, by a pump. The working fluid composition contains cis-1,3,3,3-tetrafluoropropene at a ratio higher than or equal to 92.0% by mass and lower than or equal to 99.9% by mass and trans-1,3,3,3-tetrafluoropropene or 2,3,3,3-tetrafluoropropene at a ratio higher than or equal to 0.1% by mass and lower than or equal to 8.0% by mass; and has an evaporation temperature higher than or equal to 60° C. and lower than or equal to 150° C.

19 Claims, 25 Drawing Sheets

(56) References Cited

U.S. PATENT DOCUMENTS

| | | |
|---|---|---|
| 2013/0075063 A1 | 3/2013 | Hulse et al. |
| 2013/0091843 A1 | 4/2013 | Zyhowski et al. |
| 2013/0119299 A1* | 5/2013 | Low ................. C08J 9/127 252/68 |
| 2016/0023176 A1 | 1/2016 | Bonnet et al. |
| 2016/0031773 A1 | 2/2016 | Bonnet et al. |
| 2016/0046548 A1 | 2/2016 | Bonnet et al. |

FOREIGN PATENT DOCUMENTS

| | | |
|---|---|---|
| JP | 02-272086 A | 11/1990 |
| JP | 2007-006684 A | 1/2007 |
| JP | 2008-531836 A | 8/2008 |
| JP | 2011-520089 A | 7/2011 |
| JP | 2012-511087 A | 5/2012 |
| JP | 2013-500374 A | 1/2013 |
| JP | 2013249326 A | 12/2013 |
| JP | 2014/531499 A | 11/2014 |
| WO | 2006/094303 A2 | 9/2006 |
| WO | 2009/134957 A2 | 11/2009 |
| WO | 2010/065895 A1 | 6/2010 |
| WO | 2012/030613 A2 | 3/2012 |
| WO | 2013028476 A2 | 2/2013 |
| WO | 2013/048896 A2 | 4/2013 |
| WO | 2013/082575 A1 | 6/2013 |
| WO | 2014/147312 A1 | 9/2014 |
| WO | 2014/147313 A1 | 9/2014 |
| WO | 2014/147314 A1 | 9/2014 |

OTHER PUBLICATIONS

European Office Action dated Aug. 3, 2016 for corresponding European Application No. 14004019.7.

Chinese Office Action dated Nov. 10, 2015 concerning a corresponding Chinese Patent Application No. 201410677199.1.

European Search Report dated Mar. 25, 2015 regarding a counterpart European patent application No. 14004019.7.

European Office Action dated Apr. 5, 2017 for corresponding European Patent Application No. 14004019.7.

Japanese Office Action dated Apr. 18, 2017 for corresponding Japanese Patent Application No. 2013-248752, with partial translation.

* cited by examiner

METHOD FOR CONVERTING THERMAL ENERGY INTO MECHANICAL ENERGY, ORGANIC RANKINE CYCLE DEVICE, AND METHOD FOR REPLACING WORKING FLUID

CROSS REFERENCE TO RELATED APPLICATIONS

This application is based upon and claims the benefit of priority from the prior Japanese Patent Application No. 2013-248752, filed on Nov. 29, 2013, the entire contents of which are incorporated herein by reference.

FIELD

The present invention relates to a working fluid composition containing cis-1,3,3,3-tetrafluoropropene, a method for converting thermal energy into mechanical energy in an organic rankine cycle device that accommodates the working fluid, such an organic rankine cycle device, and a method for replacing a working fluid having a high global warming potential.

BACKGROUND

The Kyoto Protocol to the United Nations Framework Convention on Climate Change that regulates emissions of greenhouse gas such as carbon dioxide, methane, dinitrogen monoxide, alternative fluorocarbon and the like took effect, and the emission of the greenhouse gas is currently restricted. Therefore, it is an important issue to develop waste heat electric power generation using unused energy that suppresses greenhouse gas emissions. Today, waste heat generated in steel, petroleum, chemical, cement, paper and pulp, ceramic engineering, biomass and various other industries, middle-to-low-temperature waste heat of gas discharged from gas turbines, engines and the like, and heat of waste hot water are not considered to be fully utilized.

In general, an organic rankine cycle (ORC) using an organic compound as a working medium is a closed rankine cycle that does not discharge the working medium outside. An organic rankine cycle device includes an evaporator that evaporates the working medium, a power generator, an expansion device, a condenser, a recirculation pump, and the like. In the rankine cycle, the working fluid passes four steps, namely, adiabatic compression in the pump, isobaric heating (evaporation), adiabatic expansion, and isobaric cooling (condensation) while circulating in the device. The working medium performs heat exchange with an external heat source in the step of isobaric heating, and the evaporated working medium is transferred to the expansion device. The working medium is subjected to adiabatic expansion to provide energy (work) to the outside, and the energy is extracted as electric energy or the like.

Conventionally, water has been practically used as a working medium for many years (see, for example, U.S. Pat. No. 3,393,515). However, water has a high freezing point of 0° C. and a large vapor specific volume. Therefore, when a heat source having a relatively low use temperature range (lower than or equal to about 200° C.) is used, water has drawbacks that the rankine cycle facilities need to be large and that the cycle efficiency is low.

In such a background, various studies have been made on an organic rankine cycle (ORC) as a technology for using low-temperature waste heat. The organic rankine cycle uses an organic compound having a boiling point lower than that of water as a working fluid. A technology of using an organic fluorine compound, among various organic compounds studied, has been proposed.

Japanese Laid-Open Patent Publication No. Hei 2-272086 discloses hydrogen-containing halogenated saturated hydrocarbons having a carbon number of 3, such as 1,1,1,3,3-pentafluoropropane and the like as a working fluid for an organic rankine cycle.

Japanese Laid-Open Patent Publication No. 2007-6684 discloses an organic rankine cycle device that uses 2,2-dichloro-1,1,1-trifluoropropane or 1,1,1,3,3-pentafluoropropane as a working fluid.

Japanese PCT National Phase Laid-Open Patent Publication No. 2012-511087 discloses an organic rankine cycle device that uses fluoroolefins such as 1-chloro-3,3,3-trifluoropropene, monochlorononafluoropentene and the like as a working fluid.

Japanese PCT National Phase Laid-Open Patent Publication No. 2013-500374 discloses an organic rankine cycle system that uses hyodrofluoroolefins having a carbon number of 4, such as 1,1,1,4,4,4-hexafluoro-2-butene and the like as a working fluid.

SUMMARY

Japanese Laid-Open Patent Publication No. Hei 2-272086 proposes hydrogen-containing halogenated saturated hydrocarbons having a carbon number or 3 as a working fluid. However, hydrogen-containing halogenated saturated hydrocarbons having a carbon number of 3 have a high global warming potential (GWP), and therefore there are concerns on continued use thereof in the future.

Japanese Laid-Open Patent Publication No. 2007-6684 proposes an organic rankine cycle device that uses 2,2-dichloro-1,1,1-trifluoropropane or 1,1,1,3,3-pentafluoropropane as a working fluid. However, these compounds are not preferable from the point of view of depletion of ozone layer and have a very high global warming potential. For these reasons, these compounds have a heavy environmental load, and therefore there are concerns on continued use thereof in the future.

Japanese PCT National Phase Laid-Open Patent Publication No. 2012-511087 and Japanese PCT National Phase Laid-Open Patent Publication No. 2013-500374 each propose an organic rankine cycle that uses compositions containing unsaturated halogenated hydrocarbons having a low global warming potential as a working fluid. These compositions have a higher rankine cycle efficiency than that of 1,1,1,3,3-pentafluoropropane that is currently in wide use as an organic rankine cycle working fluid. However, these compositions have drawbacks that, for example, the expansion device needs to have a large volume. Therefore, these compositions are not comprehensively sufficient for use from the point of view of performance, and are desired to be further improved in performance.

As described above, the performance of an organic rankine cycle device that uses a working fluid having high environmental compatibility is still insufficient. In such a situation, it is desired to find a working fluid composition that realizes heat transfer from unused heat having a temperature lower than or equal to 150° C., provides superior heat transfer performance to that of the conventional working fluids, and contains a low GWP compound as a main component.

The present invention has an object of providing a further improved novel working fluid composition, a further improved novel organic rankine cycle device, and a method for replacing a working fluid having a high global warming potential. The present invention also has an object of providing a working fluid composition that does not substantially contribute to global warming unlike many hydrofluorocarbons currently used and also providing an organic rankine cycle device usable for such a working fluid.

The present inventors made active studies in order to solve the above-described problems. As a result, the present inventors paid attention to unsaturated halogenated hydrocarbons and obtained the knowledge that a highly effective thermal energy conversion method can be realized by using, as a working fluid, a composition including a two-component halogenated hydrocarbon containing cis-1,3,3,3-tetrafluoropropene, among the unsaturated halogenated hydrocarbons, as a main component at a predetermined temperature and a predetermined pressure. Thus, the present invention has been made.

Provided according to an embodiment of the present invention is a method for converting thermal energy into mechanical energy by use of an organic rankine cycle system that accommodates a working fluid composition, the method comprising sequentially performing: evaporating the working fluid composition; expanding the working fluid composition; condensing the working fluid composition; and transferring the working fluid composition, while raising the pressure of the working fluid composition, by a pump. The working fluid composition contains cis-1,3,3,3-tetrafluoropropene at a ratio higher than or equal to 92.0% by mass and lower than or equal to 99.9% by mass and trans-1,3,3,3-tetrafluoropropene or 2,3,3,3-tetrafluoropropene at a ratio higher than or equal to 0.1% by mass and lower than or equal to 8.0% by mass; and has an evaporation temperature higher than or equal to 60° C. and lower than or equal to 150° C.

Provided according to an embodiment of the present invention is a method for converting thermal energy into mechanical energy by use of an organic rankine cycle system that accommodates a working fluid composition, the method comprising sequentially performing: evaporating the working fluid composition; expanding the working fluid composition; condensing the working fluid composition; and transferring the working fluid composition, while raising the pressure of the working fluid composition, by a pump. The working fluid composition contains cis-1,3,3,3-tetrafluoropropene at a ratio higher than or equal to 80.0% by mass and lower than or equal to 99.9% by mass and 1,1,1,3,3-pentafluoropropane at a ratio higher than or equal to 0.1% by mass and lower than or equal to 20.0% by mass; and has an evaporation temperature higher than or equal to 60° C. and lower than or equal to 150° C.

In the method for converting thermal energy into mechanical energy, the working fluid composition may contain cis-1,3,3,3-tetrafluoropropene at a ratio higher than or equal to 90.0% by mass and lower than or equal to 99.9% by mass and 1,1,1,3,3-pentafluoropropane at a ratio higher than or equal to 0.1% by mass and lower than or equal to 10.0% by mass.

Provided according to an embodiment of the present invention is a method for converting thermal energy into mechanical energy by use of an organic rankine cycle system that accommodates a working fluid composition, the method comprising sequentially performing: evaporating the working fluid composition; expanding the working fluid composition; condensing the working fluid composition; and transferring the working fluid composition, while raising the pressure of the working fluid composition, by a pump. The working fluid composition contains cis-1,3,3,3-tetrafluoropropene at a ratio higher than or equal to 50.0% by mass and lower than or equal to 99.9% by mass and trans-1-chloro-3,3,3-trifluoropropene at a ratio higher than or equal to 0.1% by mass and lower than or equal to 50.0% by mass; and has an evaporation temperature higher than or equal to 60° C. and lower than or equal to 150° C.

In the method for converting thermal energy into mechanical energy, the working fluid composition may contain cis-1,3,3,3-tetrafluoropropene at a ratio higher than or equal to 80.0% by mass and lower than or equal to 99.9% by mass and trans-1-chloro-3,3,3-trifluoropropene at a ratio higher than or equal to 0.1% by mass and lower than or equal to 20.0% by mass.

In the method for converting thermal energy into mechanical energy, the working fluid composition may contain a lubricant.

In the method for converting thermal energy into mechanical energy, the lubricant may be selected from mineral oil (paraffin-based oil or naphthene-based oil); alkylbenzenes (AB), poly(alpha-olefin), esters, polyesters (POE), polyalkyleneglycols (PAG), and polyvinylethers (PVE), which are each synthetic oil; and a combination thereof.

In the method for converting thermal energy into mechanical energy, the working fluid composition may further contain a stabilizer.

In the method for converting thermal energy into mechanical energy, the stabilizer may be selected from nitro compounds, epoxy compounds, phenols, imidazoles, amines, diene-based compounds, phosphates, aromatic unsaturated hydrocarbons, isoprenes, propadienes, terpenes and a combination thereof.

In the method for converting thermal energy into mechanical energy, the working fluid composition may further contain a flame retardant.

In the method for converting thermal energy into mechanical energy, the flame retardant may be selected from phosphates, halogenated aromatic compounds, fluorinated iodocarbon, fluorinated bromocarbon and a combination thereof.

In the method for converting thermal energy into mechanical energy, hot water, pressurized hot water or overheated steam having a temperature higher than or equal to 60° C. and lower than or equal to 150° C. may be used as a heat source of an evaporator.

Provided according to an embodiment of the present invention is an organic rankine cycle device using the method for converting thermal energy into mechanical energy according to any one of the above.

Provided according to an embodiment of the present invention is a method for replacing a working fluid in an organic rankine cycle device. The working fluid contains 1,1,1,3,3-pentafluoropropane (HFC-245fa) as a main component; and the method includes supplying the working fluid, used in the method for converting thermal energy into mechanical energy according to any one of the above, to the organic rankine cycle device that uses, used, or is designed to use, the working fluid.

REFERENCE SIGNS LIST

Figure 1:
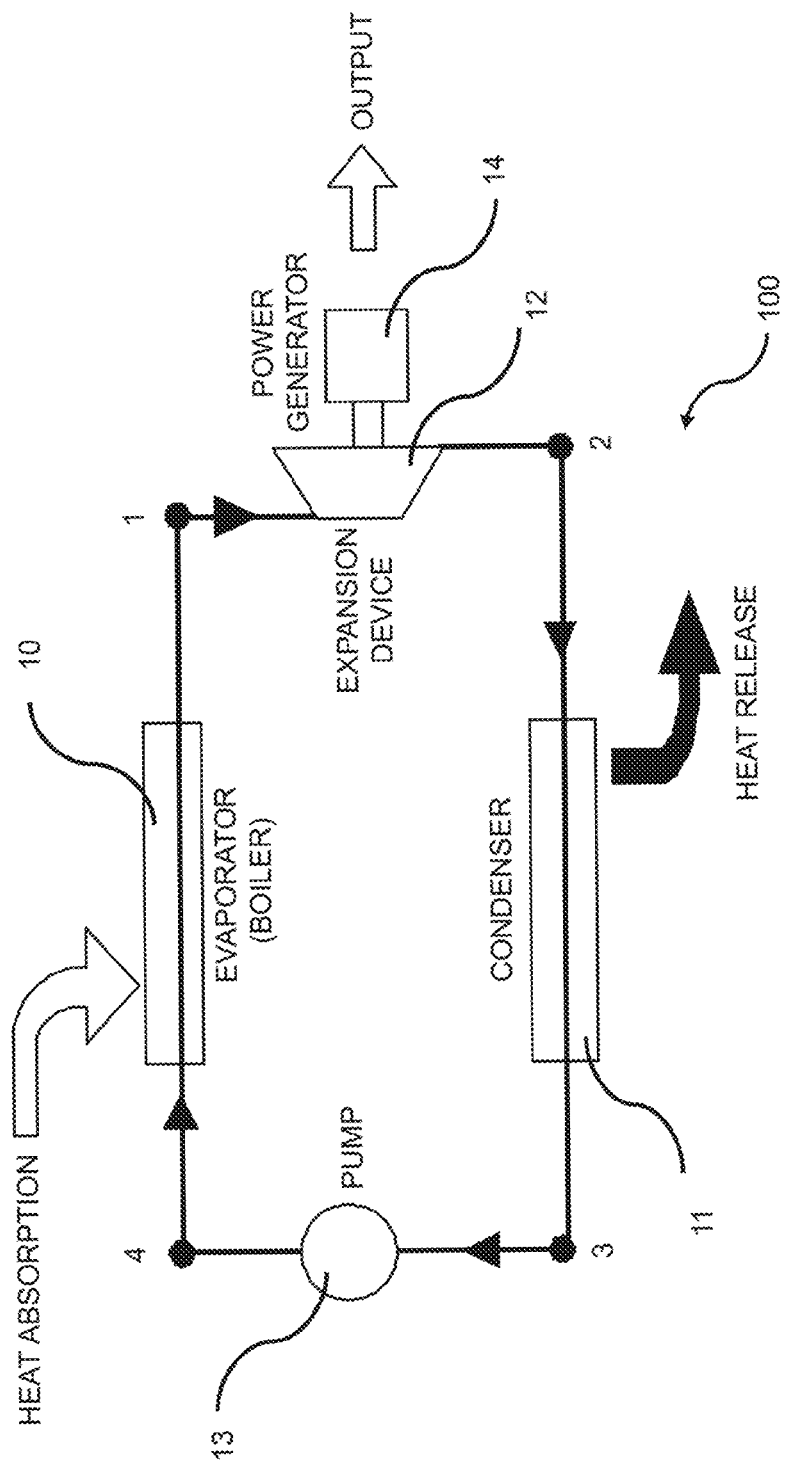
FIG. 1 is a schematic view of an organic rankine cycle to which a working fluid according to the present invention is applicable.

10: evaporator; 11: condenser; 12: expansion device; 13: circulation pump; 14: power generator; 100: organic rankine cycle device

DESCRIPTION OF EMBODIMENTS

Hereinafter, an organic rankine cycle device and a method for converting thermal energy into mechanical energy according to the present invention will be described with reference to the drawings. The organic rankine cycle device and the method for converting thermal energy into mechanical energy according to the present invention are not to be construed as being limited to the following embodiments or examples. In the figures referred to in the embodiments and the examples, the same elements or elements having the same functions will bear the same reference signs and the descriptions thereof will not be repeated.

A method for converting thermal energy into mechanical energy (hereinafter, may be referred to as a "thermal energy conversion method") according to the present invention uses a working fluid composition including a two-component halogenated hydrocarbon which is a mixture of cis-1,3,3,3-tetrafluoropropene as a first, namely, main component and trans-1,3,3,3-tetrafluoropropene or 2,3,3,3-tetrafluoropropene as a second component. The thermal energy conversion method according to the present invention also uses a working fluid composition including a two-component halogenated hydrocarbon which is a mixture of cis-1,3,3,3-tetrafluoropropene as a first, namely, main component and trans-1-chloro-3,3,3-trifluoropropene or 1,1,1,3,3-pentafluoropropane as a second component. The present inventors have found that a working fluid composition according to the present invention, because of being such a mixture of two components, is non-flammable or low flammable, has little environmental load, and has high thermal cycle characteristics and high heat transfer characteristics.

Cis-1,3,3,3-tetrafluoropropene (HFO-1234ze(Z)) will be described.

<HFO-1234ze (Z)>

HFO-1234ze(Z) includes a carbon-carbon double bond in a molecule and is highly reactive with a hydroxy group radical, and therefore has a very low global warming potential (GWP) and little environmental load. HFO-1234ze(Z) is low flammable or flame-resistant and is not toxic. HFO-1234ze(Z) has a boiling point of 9.8° C. at an atmospheric pressure, an atmospheric life time of 10 days, and a global warming potential (GWP) of 3 (Chemical Physics Letters 2009, Vol. 473, pp. 233-237). HFO-1234ze(Z) has a critical temperature of 150.1° C. and a critical pressure of 3.54 MPa (4th IIR conference on Thermophysical Properties and Transfer Processes of Refrigerant, Procedures, TP-018).

Trans-1,3,3,3-tetrafluoropropene (HFO-1234ze(E)) will be described.

<HFO-1234ze(E)>

HFO-1234ze(E) includes a carbon-carbon double bond in a molecule and is highly reactive with a hydroxy group radical, and therefore has a very low global warming potential (GWP) and little environmental load. HFO-1234ze(E) is low flammable or flame-resistant and is not toxic. HFO-1234ze(E) has a boiling point of −19° C. at an atmospheric pressure, an atmospheric life time of 14 days, and a global warming potential (GWP) of 6 (Chemical Physics Letters 2007, Vol. 443, pp. 199-204). HFO-1234ze(E) has a critical temperature of 109.4° C. and a critical pressure of 3.63 MPa (Journal of Chemical Engineering Data 2010, Vol. 55, pp. 1594-1597).

2,3,3,3-tetrafluoropropene (HFO-1234yf) will be described.

<HFO-1234yf>

HFO-1234yf includes a carbon-carbon double bond in a molecule and is highly reactive with a hydroxy group radical, and therefore has a very low global warming potential (GWP) and little environmental load. HFO-1234yf is low flammable and is not toxic. HFO-1234yf has a boiling point of −29° C. at an atmospheric pressure, an atmospheric life time of 11 days, and a global warming potential (GWP) of 4 (Chemical Physics Letters 2007, Vol. 439, pp. 18-22). HFO-1234yf has a critical temperature of 94.7° C. and a critical pressure of 3.38 MPa (International Journal of Refrigeration 2010, Vol. 33, pp. 474-479).

Now, trans-1-chloro-3,3,3-trifluoropropene (HCFO-1233zd (E)) will be described.

<HCFO-1233zd (E)>

HCFO-1233zd (E) includes a carbon-carbon double bond in a molecule and is highly reactive with a hydroxy group radical, and therefore has a very low global warming potential (GWP) and little environmental load. HCFO-1233zd (E) is non-flammable and is not toxic. HCFO-1233zd (E) has a boiling point of 18.3° C. at an atmospheric pressure, an atmospheric life time of 26 days, and a global warming potential (GWP) of 7 (Journal of Photochemistry and Photobiology A: Chemistry 2008, Vol. 199, pp. 92-97). HCFO-1233zd (E) has a critical temperature of 165.6° C. and a critical pressure of 3.77 MPa (Journal of Chemical Engineering Data 2012, Vol. 57, pp. 3581-3586).

Now, 1,1,1,3,3-pentafluoropropane (HFC-245fa) will be described.

<HFC-245fa>

HFC-245fa is non-flammable and is not highly toxic. HFC-245fa has a boiling point of 15.3° C. at an atmospheric pressure, an atmospheric life time of 7.6 years, and a global warming potential (GWP) of 1030 (IPCC Fourth Assessment Report 2007).

HFC-245fa has a high global warming potential (GWP). Therefore, HFC-245fa, when being used, is preferably contained at a ratio higher than or equal to 1% by mass and lower than or equal to 20% by mass, and more preferably contained at a ratio higher than or equal to 1% by mass and lower than or equal to 10% by mass.

In an embodiment, a working fluid composition according to the present invention has a feature that the mass ratio of cis-1,3,3,3-tetrafluoropropene is higher than or equal to 92.0% by mass and lower than or equal to 99.9% by mass, and that the mass ratio of trans-1,3,3,3-tetrafluoropropene or 2,3,3,3-tetrafluoropropene is higher than or equal to 0.1% by mass and lower than or equal to 8.0% by mass, for a reason regarding the heat transfer efficiency of a heat exchanger. Because of such a composition ratio, the working fluid composition according to the present invention has a global warming potential that is less than 150, and has less influence on the environment than HFC-245fa that is generally used.

In an embodiment, a working fluid composition according to the present invention has a feature that the mass ratio of cis-1,3,3,3-tetrafluoropropene is higher than or equal to 80.0% by mass and lower than or equal to 99.9% by mass, and that the mass ratio of 1,1,1,3,3-pentafluoropropane is higher than or equal to 0.1% by mass and lower than or equal to 20.0% by mass. Because of such a composition ratio, the working fluid composition according to the present invention has a global warming potential that is less than 150, and has less influence on the environment than HFC-245fa that is generally used.

In an embodiment, a working fluid composition according to the present invention has a feature that the mass ratio of cis-1,3,3,3-tetrafluoropropene is higher than or equal to 50.0% by mass and lower than or equal to 99.9% by mass, and that the mass ratio of trans-1-chloro-3,3,3-trifluoropropene is higher than or equal to 0.1% by mass and lower than or equal to 50.0% by mass. Because of such a composition ratio, the working fluid composition according to the present invention has a global warming potential that is less than 150, and has less influence on the environment than HFC-245fa that is generally used.

Cis-1,3,3,3-tetrafluoropropene and trans-1-chloro-3,3,3-trifluoropropene or 1,1,1,3,3-pentafluoropropane have critical temperatures close to each other. A working fluid composition according to the present invention containing these materials has little influence on the critical temperature as a composition. Comparing cis-1,3,3,3-tetrafluoropropene and trans-1,3,3,3-tetrafluoropropene or 2,3,3,3-tetrafluoropropene in terms of the critical temperature, the critical temperature of each of trans-1,3,3,3-tetrafluoropropene and 2,3,3,3-tetrafluoropropene is lower. Therefore, in the working fluid composition according to the present invention containing these materials, as the mass ratio of trans-1,3,3,3-tetrafluoropropene or 2,3,3,3-tetrafluoropropene is increased, the critical temperature is lowered. For this reason, in the working fluid composition according to the present invention containing cis-1,3,3,3-tetrafluoropropene and trans-1,3,3,3-tetrafluoropropene or 2,3,3,3-tetrafluoropropene, it is preferable that trans-1,3,3,3-tetrafluoropropene or 2,3,3,3-tetrafluoropropene is contained at a ratio higher than or equal to 0.1% by mass and lower than or equal to 8.0% by mass.

In the working fluid composition containing cis-1,3,3,3-tetrafluoropropene and trans-1-chloro-3,3,3-trifluoropropene, the mass ratio of cis-1,3,3,3-tetrafluoropropene is higher than or equal to 50.0% by mass and lower than or equal to 99.9% by mass, and more preferably higher than or equal to 90.0% by mass and lower than or equal to 99.9% by mass. The mass ratio of trans-1-chloro-3,3,3-trifluoropropene is preferably higher than or equal to 0.1% by mass and lower than or equal to 50.0% by mass, and more preferably higher than or equal to 0.1% by mass and lower than or equal to 10.0% by mass.

In the working fluid composition containing cis-1,3,3,3-tetrafluoropropene and 1,1,1,3,3-pentafluoropropane, the mass ratio of cis-1,3,3,3-tetrafluoropropene is higher than or equal to 80.0% by mass and lower than or equal to 99.9% by mass, and more preferably higher than or equal to 90.0% by mass and lower than or equal to 99.9% by mass. The mass ratio of 1,1,1,3,3-pentafluoropropane is preferably higher than or equal to 0.1% by mass and lower than or equal to 20.0% by mass, and more preferably higher than or equal to 0.1% by mass and lower than or equal to 10.0% by mass.

<Lubricant>

In the case where a working fluid composition according to the present invention is used for a working fluid of an organic rankine cycle, the lubricant used in a slide unit of the expansion device may be mineral oil (paraffin-based oil or naphthene-based oil) or any of alkylbenzenes (AB), poly (alpha-olefin), esters, polyolesters (POE), polyalkyleneglycols (PAG), and polyvinylethers (PVE), which are each synthetic oil.

The alkylbenzenes include, for example, n-octylbenzene, n-nonylbenzene, n-decylbenzene, n-undecylbenzene, n-dodecylbenzene, n-tridecylbenzene, 2-methyl-1-phenylheptane, 2-methyl-1-phenyloctane, 2-methyl-1-phenylnonane, 2-methyl-1-phenyldecane, 2-methyl-1-phenylundecane, 2-methyl-1-phenyldodecane, 2-methyl-1-phenyltridecane, and the like.

The esters include, for example, aromatic esters such as benzoic acid, phthalic acid, isophthalic acid, terephthalic acid, trimellitic acid, pyromellitic acid, a mixture thereof and the like; dibasic acid ester; polyol ester; complex ester; carbonate ester; and the like.

Examples of alcohol usable as a material of the polyol esters include esters of hindered alcohol such as neopentylglycol, trimethylolethane, trimethylolpropane, trimethylolbutane, di-(trimethylolpropane), tri-(trimethylolpropane), pentaerythritol, di-(pentaerythritol), tri-(pentaerythritol), and the like.

Examples of carboxylic acid usable as a material of the polyol esters include valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid, 3,5,5-trimethylhexanoic acid, and the like.

The polyalkyleneglycols include, for example, compounds obtained by addition-polymerizing ethylene oxide, propylene oxide, butylene oxide or the like to an aliphatic alcohol having a carbon number larger than or equal to 1 and smaller than or equal to 18, such as methanol, ethanol, linear or branched propanol, linear or branched butanol, linear or branched pentanol, linear or branched hexanol or the like.

The polyvinylethers include, for example, polymethylvinylether, polyethylvinylether, poly-n-propylvinylether, polyisopropylvinylether, and the like.

<Stabilizer>

A working fluid composition according to the present invention may contain a stabilizer in order to improve the thermal stability, the oxidation resistance and the like. Examples of the stabilizer include nitro compounds, epoxy compounds, phenols, imidazoles, amines, phosphates hydrocarbons and the like.

The nitro compounds may be known compounds, for example, aliphatic and/or aromatic derivatives. The aliphatic nitro compounds include, for example, nitromethane, nitroethane, 1-nitropropane, 2-nitropropane, and the like. The aromatic nitro compounds include, for example, nitrobenzene, o-, m- or p-dinitrobenzene, trinitrobenzene, o-, m- or p-nitrotoluene, o-, m- or p-ethylnitrobenzene, 2,3-, 2,4-, 2,5-, 2,6-, 3,4- or 3,5-dimethylnitrobenzene, o-, m- or p-nitroacetophenone, o-, m- or p-nitrophenol, o-, m- or p-nitroanisole, and the like.

The epoxy compounds include, for example, monoepoxy-based compounds such as ethyleneoxide, 1,2-butyleneoxide, propyleneoxide, styreneoxide, cyclohexeneoxide, glycidol, epichlorhydrin, glycidylmethacrylate, phenylglycidylether, allylglycidylether, methylglycidylether, butylglycidylether, 2-ethylhexylglycidylether, and the like; polyepoxy-based compounds such as diepoxybutane, vinylcyclohexenedioxide, neopentylglycoldiglycidylether, ethyleneglycoldiglycidylether, glycerinepolyglycidylether, trimethylolpropanetriglycidylether, and the like; etc.

The phenols may contain any of various substitutes such as an alkyl group, an alkenyl group, an alkoxy group, a carboxyl group, a carbonyl group, a halogen or the like as well as a hydroxy group. Such phenols include, for example, primary phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, buthyhydroxyanisole, phenol, xylenol, and the like; secondary phenols such as t-butylcatechol, 2,5-di-t-aminohydroquinone, 2,5-di-t-butylhydroquinone, and the like; etc.

The imidazoles may be compounds containing, as a substitute at the N position, a linear or branched alkyl group having a carbon number larger than or equal to 1 and smaller than or equal to 18, a cycloalkyl group or a aryl group; for example, 1-methylimidazole, 1-n-butylimidazole, 1-phenylimidazole, 1-benzylimidazole, 1-(β-oxyethyl)imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5-trimethylimidazole, 1,4,5-trimethylimidazole, 1-ethyl-2-methylimidazole, and the like. These compounds may be used independently or in a combination of two or more.

The amines include, for example, pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, triethylamine, ethylamine, diethylamine, propylamine, isopropylamine, dipropylamine, butylamine, isobutylamine, dibutylamine, tributylamine, dibenzylamine, tribenzylamine, 2-ethylhexylamine, aniline, N,N-dimethylaniline, N,N-diethylaniline, ethylenediamine, propylenediamine, diethylenetriamine, tetraethylenepentamine, benzylamine, diphenylamine, diethylhydroxylamine, and the like. These may be used independently or in a combination of two or more.

The hydrocarbons include, for example, diene-based compounds, aromatic unsaturated hydrocarbons such α-methylstyrene, p-isopropenyltoluene, and the like, isoprenes, propadienes, terpenes, and the like. These may be used independently or in a combination of two or more.

The stabilizer may be incorporated into one of, or both of, a coolant and a lubricant in advance, or may be put into an evaporator independently. There is no specific limitation on the amount of the stabilizer. The content of the stabilizer with respect to the main coolant (100% by mass) is preferably higher than or equal to 0.001% by mass and lower than or equal to 10% by mass, more preferably higher than or equal to 0.01% by mass and lower than or equal to 5% by mass, and still more preferably higher than or equal to 0.02% by mass and lower than or equal to 2% by mass. When the amount of the stabilizer exceeds the upper limit or less than the lower limit, the stability of the coolant, the thermal cycle characteristics and the like cannot be sufficient.

<Flame Retardant>

A working fluid composition according to the present invention may contain a flame retardant in order to suppress the combustibility. Examples of the flame retardant include phosphates, halogenated aromatic compounds, fluorinated iodocarbon, fluorinated bromocarbon, and the like.

The working fluid composition according to the present invention having such a composition has an evaporation temperature higher than or equal to 60° C. and lower than or equal to 150° C., preferably higher than or equal to 80° C. and lower than or equal to 130° C.

The evaporation pressure of the working fluid composition according to the present invention having such a composition is determined by the composition ratio and the evaporation temperature of the working fluid composition. Namely, the evaporation pressure is equal to the saturated vapor pressure of the working fluid composition at the evaporation temperature. In general, when the evaporation pressure exceeds 5.0 MPa, a compressor, a condenser and piping components that have a high pressure resistance and thus are costly are required, which is not preferable. In the case where a working fluid composition according to the present invention is used, the evaporation pressure can be lower than 5.0 MPa, and thus an expansion device, a condenser, a pump and piping components that are known are usable.

A working fluid composition according to the present invention is non-flammable, has little environmental load and has high thermal cycle characteristics. Such a working fluid composition according to the present invention is usable as a working fluid for an organic rankine cycle used for a power generation system; a heating medium for a high-temperature heat pump used for, for example, generating pressurized hot water or overheated steam; a coolant for a vapor-compressive freezing cycle system; a medium of a suction heat pump, a heat pipe or the like; a washing detergent for cyclic washing of a cooling system or a heat pump system; a metal washing detergent; a flux washing detergent; a diluted solvent; a foaming agent; an aerosol; or the like.

The heat transfer method and the thermal energy conversion method according to the present invention are applicable to a package-type compact device (rankine cycle system, heat pump cycle system, etc.) and also a large-scale, namely, a plant-scale power generation system, a heat-pump hot water supply system, a heat-pump steam generation system, and the like.

Hereinafter, an organic rankine cycle device that uses a working fluid composition according to the present invention will be described in detail.

<Organic Rankine Cycle Device>

An organic rankine cycle device generates electric power as follows. In an evaporator, thermal energy is supplied from a heat source to a working fluid. The working fluid, which has become a vapor in a high-temperature, high-pressure state, is subjected to adiabatic expansion in an expansion device. A work that is generated by the adiabatic expansion is used to drive a power generator, so that power is generated. The working fluid vapor obtained by the adiabatic expansion is condensed by a condenser to become a liquid, and is transferred to the evaporator by a pump. The thermal energy of the heat source may be of middle-to-low-temperature exhaust heat, or may be recyclable thermal energy, having a temperature lower than or equal to 200° C.

A fluid to be cooled or a fluid to be heated which exchanges heat with the working fluid composition in the evaporator or the condenser in the organic rankine cycle device may be air, water, brine, silicone oil or the like. Preferably, any one of these is selected in accordance with the cycle-driving temperature condition or the like.

FIG. 1 is a schematic view showing an example of organic rankine cycle device to which the working fluid composition according to the present invention is applicable. Hereinafter, a structure and an operation (repeat cycle) of an organic rankine cycle device 100 shown in FIG. 1 will be described.

The organic rankine cycle device 100 according to the present invention includes an evaporator (boiler) that receive heat and a condenser 11 that supplies heat. The organic rankine cycle device 100 also includes an expansion device 12 that is operated by the working fluid circulating in the system, a circulation pump 13 that raises the pressure of the liquid coming out from the condenser 11 and consumes power, and a power generator 14 that generates power by use of the expansion device 12.

While an organic rankine cycle is repeated by use of the working fluid according to the present invention, thermal energy is converted into mechanical energy via the following steps (a) through (e), and the mechanical energy is supplied to the power generator and is extracted as electric energy.

(a) The working fluid in a liquid state exchanges heat with a fluid to be cooled (heat source) in the heat exchanger (evaporator 10) and is evaporated (phase-changed from liquid to gas).

(b) The evaporated working fluid is extracted from the heat exchanger.

(c) The evaporated working fluid is supplied to the expansion device (power-generating turbine 12) to be expanded and converted into mechanical (electric) energy.

(d) The working fluid coming out from the expansion device is supplied to the condenser, in which the working fluid in a gas state is condensed (phase-changed from gas to liquid).

(e) The liquefied working fluid is transferred, while the pressure thereof is raised, by the pump 13 and is returned to the step (a).

The organic rankine cycle system accommodating the working fluid includes at least one evaporator 10, the expansion device 12, the condenser 11, the pump 13, and a pipe used to transfer the working fluid between these elements. The system may include an internal heat exchanger.

There is no specific limitation on the type of the expansion device. Usable expansion devices include a single-stage or multi-stage centrifugal expansion device, a rotary piston-type expansion device, a rotary vane-type expansion device, a scroll-type expansion device, a screw-type expansion device, and a piston-crank-type expansion device.

By use of the working fluid composition according to the present invention as the working fluid of an organic rankine cycle system, thermal energy of a temperature higher than or equal to 60° C. and lower than or equal to 150° C. can be converted into mechanical energy. The mechanical energy may be converted into electric energy by the power generator.

The working fluid composition according to the present invention is also applicable to an organic rankine cycle device that uses, used, or is designed to use, a working fluid mainly containing 1,1,1,3,3-pentafluoropropane (HFC-245fa) and having a high global warming potential (high-GWP working fluid). In the organic rankine cycle device, the high-GWP working fluid is replaced with the working fluid composition according to the present invention. Thus, the GWP can be lowered and the environmental load can be decreased.

According to an embodiment of method for replacing the working fluid accommodated in the organic rankine cycle device, the accommodated high-GWP working fluid is all recovered, and then the working fluid composition according to the present invention is put into the device. There is no specific limitation on the method for replacing the working fluid. It is desirable that the working fluid is replaced while the organic rankine cycle device is not in operation. In order to alleviate the environment load, it is desirable that the high-GWP working fluid is recovered by use of a recovery device that is used to recover a fluorocarbon coolant. After the high-GWP working fluid is recovered and before the working fluid composition according to the present invention is put into the device, the pressure of a working fluid accommodation part of the organic rankine cycle device may be reduced by a vacuum pump. There is no specific limitation on the method for putting the working fluid composition to the device. The working fluid may be put into the device by use of a pressure difference between the working fluid and the organic rankine cycle device, or by use of a mechanical driving power of a pump or the like.

The working fluid composition according to the present invention includes a two-component halogenated hydrocarbon which is a mixture of cis-1,3,3,3-tetrafluoropropene as a first, namely, main component and trans-1,3,3,3-tetrafluoropropene or 2,3,3,3-tetrafluoropropene as a second component. Therefore, the working fluid composition according to the present invention is low flammable and has less influence on the environment than HFC-245fa that is generally used. The working fluid composition according to the present invention has high heat transfer characteristics and high thermal energy conversion characteristics, and is preferably usable for an organic rankine cycle device.

Indexes indicating the evaluation results on characteristics of a working fluid composition to be used for an organic rankine cycle device may be, for example, power generation cycle efficiency ($\eta_{cycle}$) and expansion device size parameter (SP).

The power generation cycle efficiency ($\eta_{cycle}$) is a generally recognized index of the working fluid performance, and is especially useful to represent a relative thermodynamic efficiency of the working fluid composition in the rankine cycle. The ratio of the electric energy generated by the working fluid in the expansion device and the power generator with respect to the thermal energy supplied from the heat source when the working fluid is evaporated is represented by $\eta_{cycle}$.

The expansion device size parameter (SP) is an index used to evaluate the size of the expansion device, and is generally recognized (Energy 2012, Vol. 38, pp. 136-143). For a rankine cycle performed under the same conditions, a working fluid composition having a larger SP value requires a larger size expansion device. Namely, as the SP value of the working fluid composition is smaller, a more compact expansion device can be used. This contributes to size reduction of the rankine cycle system, and a working fluid having such a smaller SP value is more preferable.

When the value of power generation cycle efficiency is higher, the SP value is higher. By contrast, when the value of power generation cycle efficiency is lower, the SP value is lower. Namely, the power generation cycle efficiency and the SP value are in a trade-off relationship. It is more preferable that a working fluid composition to be used for an organic rankine cycle device has a higher power generation cycle efficiency, whereas it is more preferable that the SP value of the working fluid composition is lower in order to fulfill the demand for size reduction of the rankine cycle system. With the conventional working fluid compositions, it is difficult to fulfill such requirements with practically usable ranges.

The working fluid composition according to the present invention is a novel composition that includes a two-component halogenated hydrocarbon containing cis-1,3,3,3-tetrafluoropropene as a main component and therefore can adjust the power generation cycle efficiency and the SP value such that both of these are in practically usable ranges.

The working fluid composition according to the present invention contains cis-1,3,3,3-tetrafluoropropene as a main component. Therefore, the volumetric flow rate of the working fluid composition at the entrance of the expansion device and the volumetric flow rate thereof at the exit of the expansion device are of the same level as those of HFC-245fa that is generally used. For this reason, the working fluid composition according to the present invention is usable as an alternative for HFC-245fa in an existing organic rankine cycle device. Thus, the environmental load of the existing organic rankine cycle device can be decreased at low cost.

EXAMPLES

Hereinafter, the present invention will be described in detail by way of examples. The present invention is not limited to the following examples.

Example 1

Mixture working fluid composition of cis-1,3,3,3-tetrafluoropropene and 1,1,1,3,3-pentafluoropropane Performance of an organic rankine cycle using a mixture working fluid composition of cis-1,3,3,3-tetrafluoropropene and 1,1,1,3,3-pentafluoropropane was evaluated. For the evaluation, the power generation cycle efficiency and the expansion device size parameter were calculated under the conditions shown in Table 1. The physical property values of the working fluid composition were found based on REFPROP, ver. 9 issued by National Institute of Standards and Technology (NIST) of the United States.

Table 1 shows organic rankine cycle calculation conditions 1.

TABLE 1

| Organic rankine cycle calculation conditions 1 | | | |
|---|---|---|---|
| Supplied heat amount | $Q_{EVA}$ | 1000 | [kW] |
| Evaporation temperature | $T_{EVA}$ | 80 | [° C.] |
| Condensation temperature | $T_{CON}$ | 40 | [° C.] |
| Expansion device efficiency | $\eta_T$ | 0.80 | [-] |
| Pump efficiency | $\eta_P$ | 0.75 | [-] |
| Power generator efficiency | $\eta_G$ | 0.95 | [-] |

The organic rankine cycle calculation conditions 1 are set with an assumption that the temperature of the heat source water to be supplied to the evaporator is 90° C. and that the temperature of the cooling water to be supplied to the condenser is 30° C.

A non-azeotropic working fluid mixture is known to exhibit a temperature gradient when being evaporated or condensed. A "temperature gradient" is caused when a non-azeotropic working fluid mixture is evaporated or condensed at an isobaric pressure, and is a temperature difference between the fluid at the entrance and the fluid at the exit of a heat exchanger (difference between the temperature at the entrance and the temperature at the exit of the heat exchanger). In the case where a non-azeotropic working fluid mixture is applied to an organic rankine cycle, the gradient effect on the evaporation temperature and the condensation temperature needs to be considered.

The temperature gradient, which is the difference between the boiling point and the dew point of a non-azeotropic working fluid mixture at an isobaric pressure, is a characteristic of a coolant. The working fluid composition according to the present invention is an azeotrope-like composition or a non-azeotropic composition having a very small temperature gradient. From the point of view of the heat transfer efficiency in the heat exchanger, it is desired that the temperature gradient is small. Specifically, a preferable temperature gradient is smaller than or equal to 5 K.

For calculating the power generation cycle efficiency ($\eta_{cycle}$) and the expansion device size parameter (SP) of the organic rankine cycle, the following conditions were set.
(A) The ideal expansion process of the rankine cycle is isentropic expansion. In consideration of the actual loss in the device, expansion device adiabatic efficiency $\eta_T$ is introduced.
(B) The loss in the power generator caused by the expansion device is considered for the power generator efficiency $\eta_G$.
(C) The circulation pump is driven by the generated electric power, and the pump efficiency $\eta_P$ including the motor efficiency is introduced. The pump is of a canned type, and the loss is included in pump efficiency $\eta_P$ of the cycle as heat.
(D) The driving force for the circulation pump provided by the bearing lubricant is minute and thus is ignored.
(E) The heat loss and the pressure loss in the pipe are ignored.
(F) The working fluid at the exit of the evaporator is saturated vapor.
(G) The working fluid at the exit of the condenser is saturated liquid.

In the case where the working fluid is a non-azeotropic mixture, the following conditions were also set.

(H) The dew point of the evaporation step is the evaporation temperature, and the pressure thereof is the evaporation pressure.

(I) The dew point of the condensation step is the condensation temperature, and the pressure thereof is the condensation pressure.

Hereinafter, the basic expressions used to calculate the power generation cycle efficiency ($\eta_{cycle}$) of the organic rankine cycle will be described in detail. The basic expressions are the calculation expressions described in Ebara Jiho No. 211 (2006-4), pp. 11, "Development of a Power Generation Unit Driven by Waste Heat (Study on Working Fluids and Expansion Turbines)". In the case where the working fluid is a non-azeotropic mixture, a dew point method of determining the evaporation temperature and the condensation temperature by the dew point is adopted. The dew point method is adopted in JIS B8600 "Standard Conditions of Rating Temperature for Refrigerant Compressor".

The theoretical power $L_{Tth}$ generated in the expansion device by the working fluid circulation amount G is:

$$L_{Tth} = G \times (h_1 - h_{2th}) \quad (1).$$

The generated power $L_T$ obtained in consideration of the expansion efficiency $\eta_T$ is:

$$L_T = L_{Tth} \times \eta_T = G \times (h_1 - h_2) \quad (2).$$

The amount of power generation $E_G$ obtained in consideration of the power generator efficiency $\eta_G$ is:

$$E_G = L_T \times \eta_G \quad (3).$$

The circulation pump pumps the working medium solution from the exit of the condenser with the condenser pressure $P_C$ to the evaporator with the evaporator pressure $P_E$ that is high, and the theoretical power $L_{Pth}$ required therefor is:

$$L_{Pth} = (P_E - P_C) \times G / \rho_3 \quad (4).$$

The required power $E_P$ obtained in consideration of the pump efficiency $\eta_p$ is:

$$E_P = L_{Pth} / \eta_P = G \times (h_4 - h_3) \quad (5).$$

The effective amount of power generation $E_{cycle}$ is:

$$E_{cycle} = E_G - E_P \quad (6).$$

The heat quantity $Q_E$ to be supplied to the evaporator is:

$$Q_E = G \times (h_1 - h_4) = G \times (h_1 - h_3) - (P_E - P_C) \times G / (\rho_3 \times \eta_P). \quad (7)$$

The efficiency of the power generation cycle is:

$$\eta_{cycle} = (E_G - E_P) \times 100 / Q_E \quad (8).$$

Now, the expansion device size parameter (SP) will be described in detail. The basic expressions are the calculation expressions described in Energy 2012, Vol. 38, pp. 136-143.

When the circulation amount of the working fluid is G, the working fluid volumetric flow rate $V_{2th}$ at the exit of the expansion device in the isentropic expansion is:

$$V_{2th} = G / \rho_{2th} \quad (9).$$

The theoretical adiabatic heat drop $\Delta H_{th}$ of the expansion device is:

$$\Delta H_{th} = h_1 - h_{2th} \quad (10).$$

The expansion device size parameter (SP) is:

$$SP = (V_{2th})^{0.5} / (\Delta H_{th})^{0.25} \quad (11).$$

In (1) through (11) above, the symbols represent the following.

Figure 2:
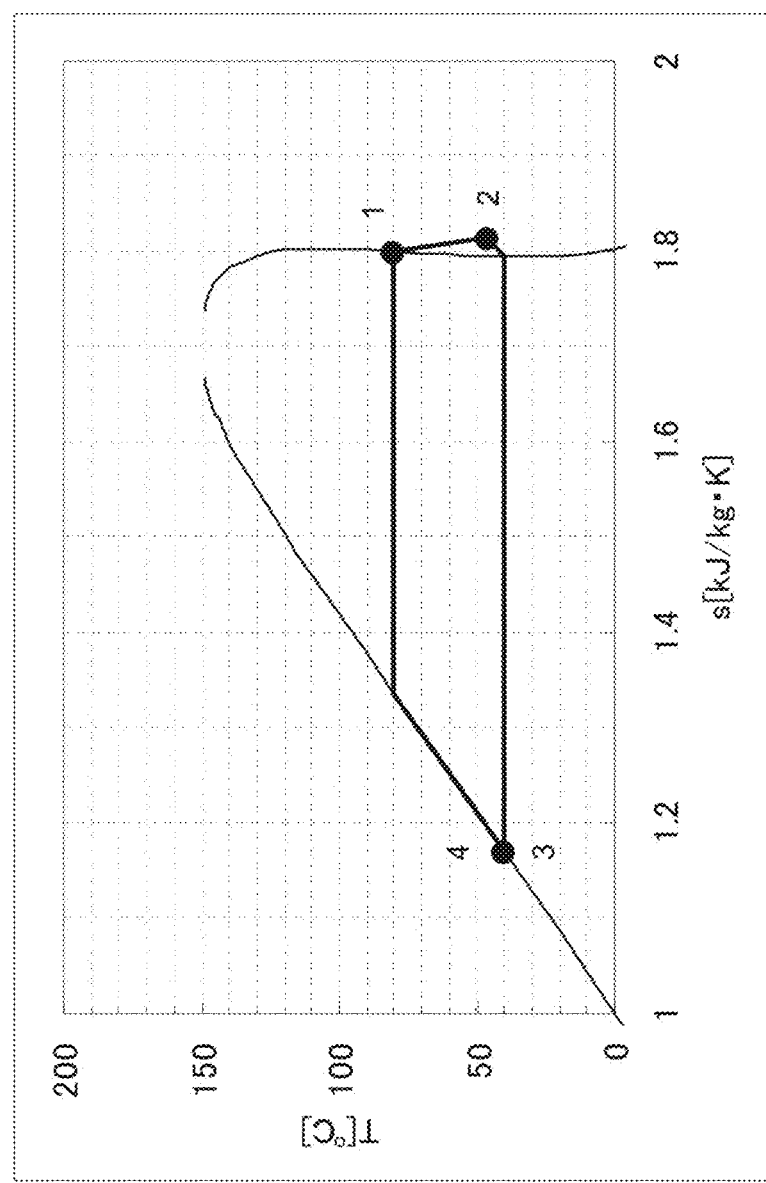
FIG. 2 shows a Ts diagram in example 1 according to the present invention.

G: Working fluid circulation amount
$L_{Tth}$: Theoretical power generated in the expansion device
$L_T$: Power generated in the expansion device
$E_G$: Amount of power generation
$E_p$: Power required for the circulation pump
$P_c$: Condensation pressure
$P_E$: Evaporation pressure
$L_{Pth}$: Theoretical power required for driving the circulation power
$E_{cycle}$: Effective amount of power generation
$Q_E$: Input heat quantity
$\eta_{cycle}$: Power generation cycle efficiency
$V_{2th}$: Theoretical volumetric flow rate at the exit of the expansion device
$\Delta H_{th}$: Theoretical adiabatic heat drop of the expansion device
SP: Expansion device size parameter
$\rho$: Density of the working fluid
h: Specific entropy
1,2,3,4: Cycle point FIG. 2 shows a Ts diagram in example 1 (mass ratio of cis-1,3,3,3-tetrafluoropropene:1,1,1,3,3-pentafluoropropane is 95:5). In the figure, cycle points 1, 2, 3 and 4 represent organic rankine cycle calculation conditions 1.

Example 2

Figure 3:
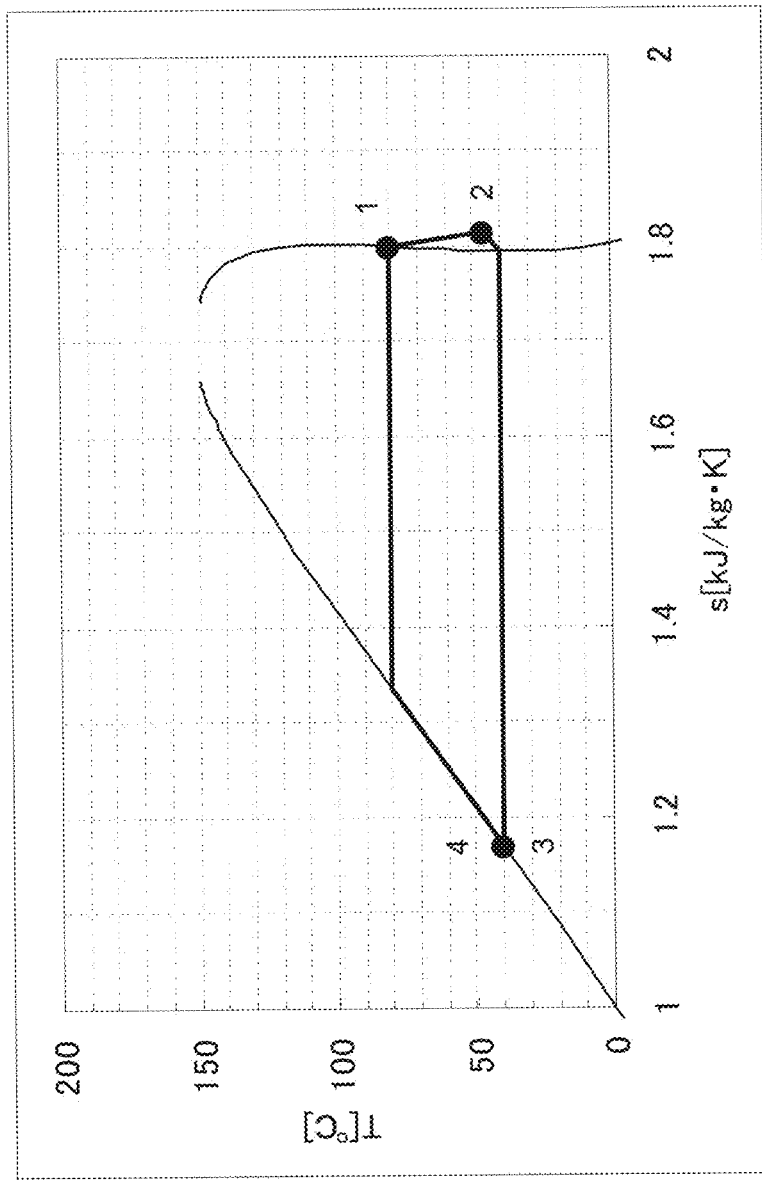
FIG. 3 shows a Ts diagram in example 2 according to the present invention.

Mixture working fluid composition of cis-1,3,3,3-tetrafluoropropene and trans-1-chloro-3,3,3-trifluoropropene Performance of an organic rankine cycle using a mixture working fluid composition of cis-1,3,3,3-tetrafluoropropene and trans-1-chloro-3,3,3-trifluoropropene was evaluated. For the evaluation, the power generation cycle efficiency and the expansion device size parameter were calculated under the conditions shown in Table 1. FIG. 3 shows a Ts diagram in example 2 (mass ratio of cis-1,3,3,3-tetrafluoropropene:trans-1-chloro-3,3,3-trifluoropropene is 95:5).

Example 3

Figure 4:
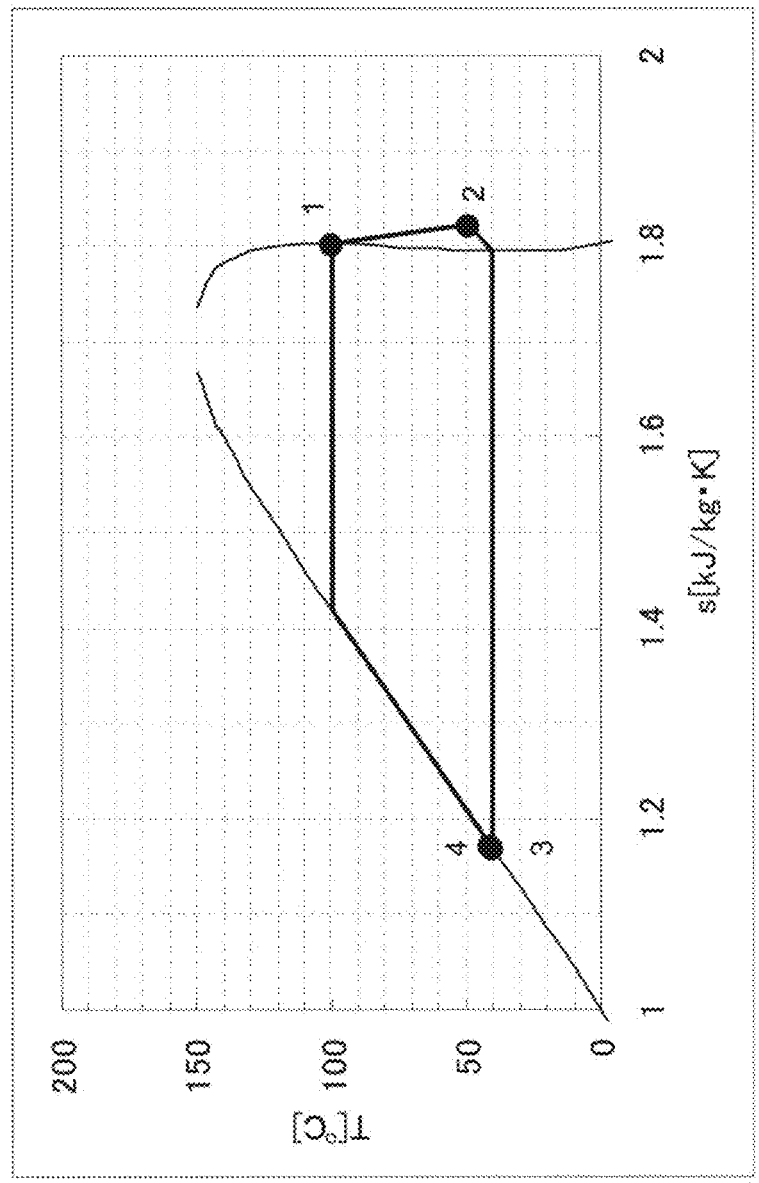
FIG. 4 shows a Ts diagram in example 3 according to the present invention.

Mixture working fluid composition of cis-1,3,3,3-tetrafluoropropene and 1,1,1,3,3-pentafluoropropane Performance of an organic rankine cycle using a mixture working fluid composition of cis-1,3,3,3-tetrafluoropropene and 1,1,1,3,3-pentafluoropropane was evaluated. For the evaluation, the power generation cycle efficiency and the expansion device size parameter were calculated under the conditions shown in Table 2. FIG. 4 shows a Ts diagram in example 3 (mass ratio of cis-1,3,3,3-tetrafluoropropene:1,1,1,3,3-pentafluoropropane is 95:5).

Table 2 shows organic rankine cycle calculation conditions 2.

TABLE 2

| Organic rankine cycle calculation conditions 2 | | |
|---|---|---|
| Supplied heat amount | $Q_{EVA}$ | 1000 [kW] |
| Evaporation temperature | $T_{EVA}$ | 100 [° C.] |
| Condensation temperature | $T_{CON}$ | 40 [° C.] |
| Expansion device efficiency | $\eta_T$ | 0.80 [—] |

TABLE 2-continued

| Organic rankine cycle calculation conditions 2 | | |
|---|---|---|
| Pump efficiency | $\eta_P$ | 0.75 [-] |
| Power generator efficiency | $\eta_G$ | 0.95 [-] |

The organic rankine cycle calculation conditions 2 are set with an assumption that the temperature of the heat source water to be supplied to the evaporator is 110° C. and that the temperature of the cooling water to be supplied to the condenser is 30° C.

Example 4

Figure 5:
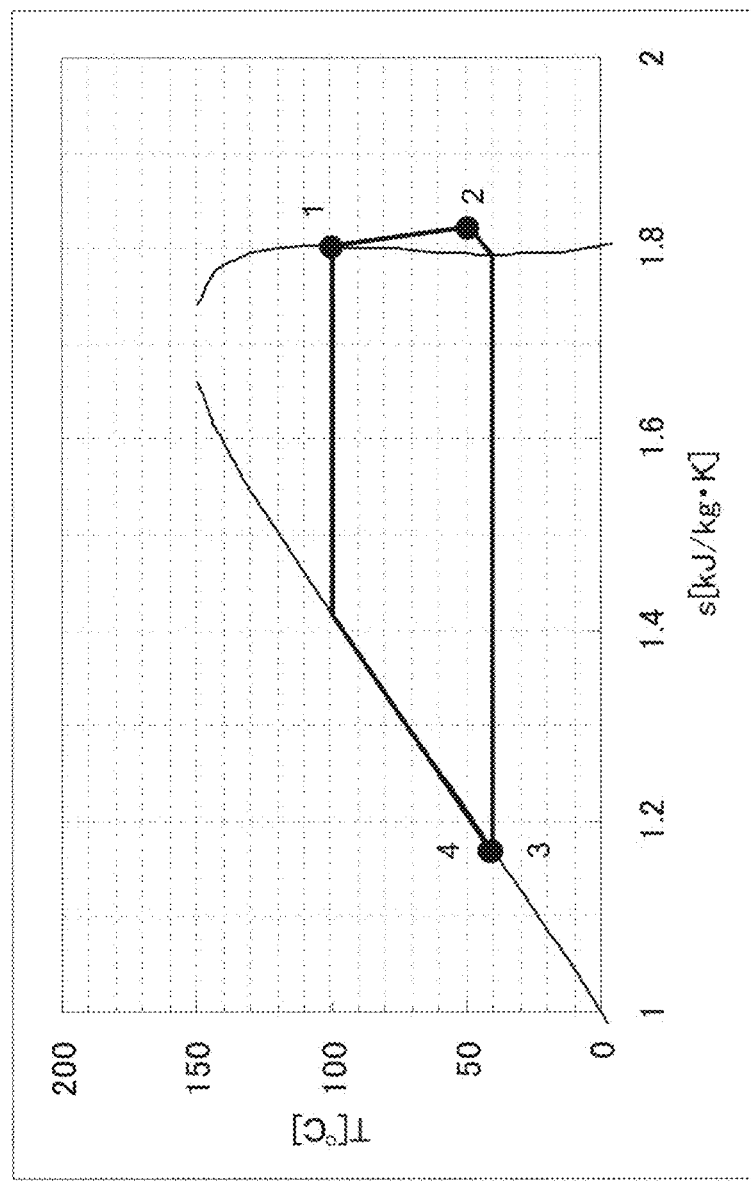
FIG. 5 shows a Ts diagram in example 4 according to the present invention.

Mixture working fluid composition of cis-1,3,3,3-tetrafluoropropene and trans-1-chloro-3,3,3-trifluoropropene Performance of an organic rankine cycle using a mixture working fluid composition of cis-1,3,3,3-tetrafluoropropene and trans-1-chloro-3,3,3-trifluoropropene was evaluated. For the evaluation, the power generation cycle efficiency and the expansion device size parameter were calculated under the conditions shown in Table 2. FIG. 5 shows a Ts diagram in example 4 (mass ratio of cis-1,3,3,3-tetrafluoropropene: trans-1-chloro-3,3,3-trifluoropropene is 95:5).

Example 5

Figure 6:
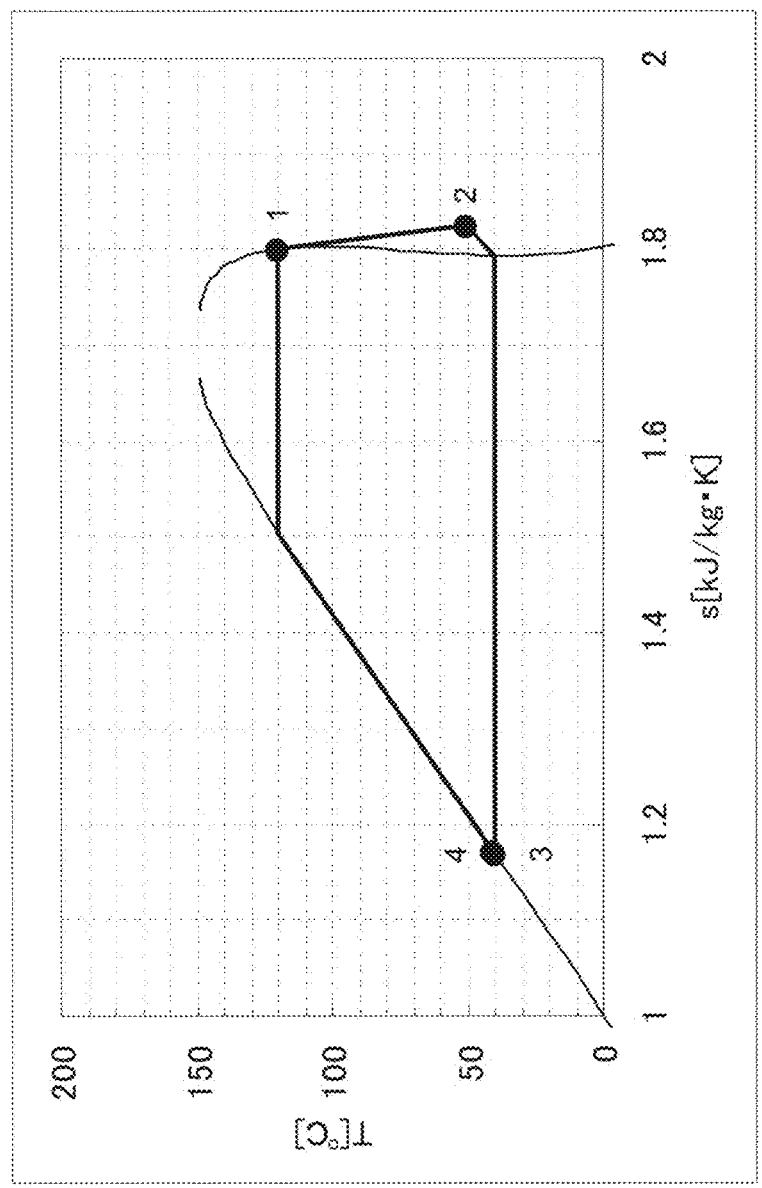
FIG. 6 shows a Ts diagram in example 5 according to the present invention.

Mixture working fluid composition of cis-1,3,3,3-tetrafluoropropene and 1,1,1,3,3-pentafluoropropane Performance of an organic rankine cycle using a mixture working fluid composition of cis-1,3,3,3-tetrafluoropropene and 1,1,1,3,3-pentafluoropropane was evaluated. For the evaluation, the power generation cycle efficiency and the expansion device size parameter were calculated under the conditions shown in Table 3. FIG. 6 shows a Ts diagram in example 5 (mass ratio of cis-1,3,3,3-tetrafluoropropene:1,1,1,3,3-pentafluoropropane is 95:5).

Table 3 shows organic rankine cycle calculation conditions 3.

TABLE 3

| Organic rankine cycle calculation conditions 3 | | |
|---|---|---|
| Supplied heat amount | $Q_{EVA}$ | 1000 [kW] |
| Evaporation temperature | $T_{EVA}$ | 120 [° C.] |
| Condensation temperature | $T_{CON}$ | 40 [° C.] |
| Expansion device efficiency | $\eta_T$ | 0.80 [-] |
| Pump efficiency | $\eta_P$ | 0.75 [-] |
| Power generator efficiency | $\eta_G$ | 0.95 [-] |

Example 6

Figure 7:
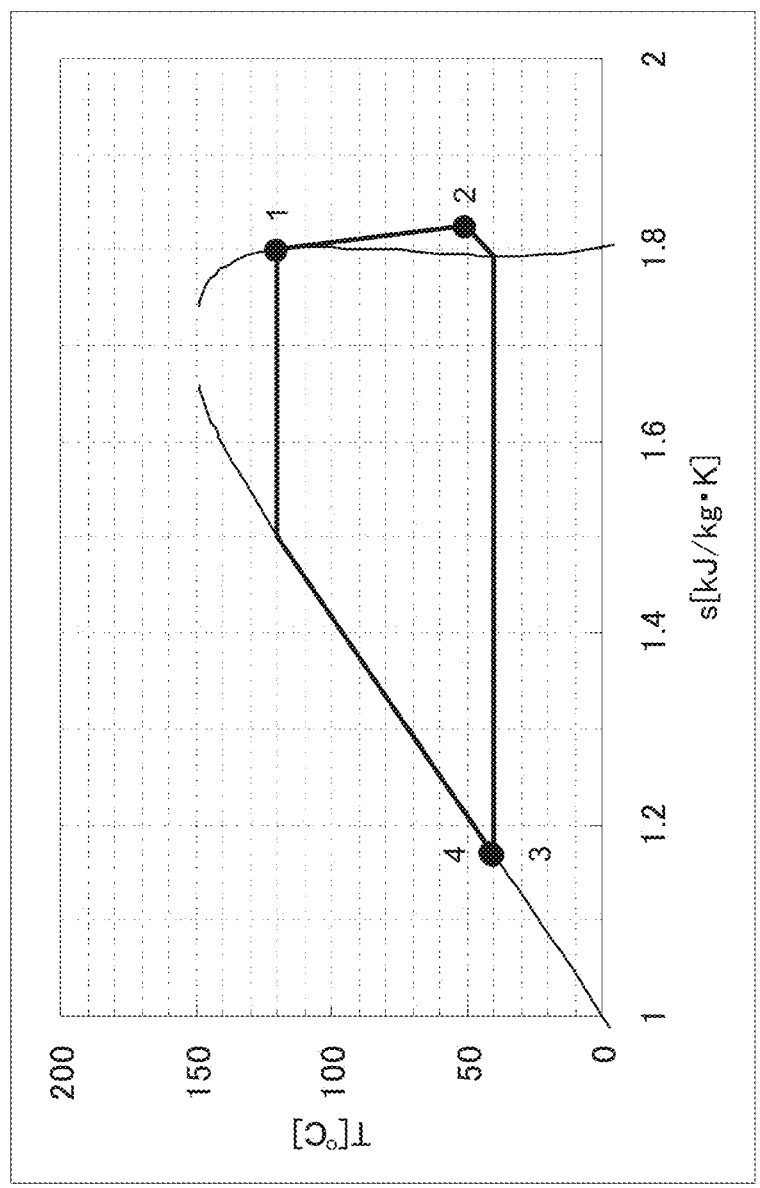
FIG. 7 shows a Ts diagram in example 6 according to the present invention.

Mixture working fluid composition of cis-1,3,3,3-tetrafluoropropene and trans-1-chloro-3,3,3-trifluoropropene Performance of an organic rankine cycle using a mixture working fluid composition of cis-1,3,3,3-tetrafluoropropene and trans-1-chloro-3,3,3-trifluoropropene was evaluated. For the evaluation, the power generation cycle efficiency and the expansion device size parameter were calculated under the conditions shown in Table 3. FIG. 7 shows a Ts diagram in example 6 (mass ratio of cis-1,3,3,3-tetrafluoropropene: trans-1-chloro-3,3,3-trifluoropropene is 95:5).

Example 7

<Mixture working fluid composition of cis-1,3,3,3-tetrafluoropropene and trans-1,3,3,3-tetrafluoropropene>

Figure 8:
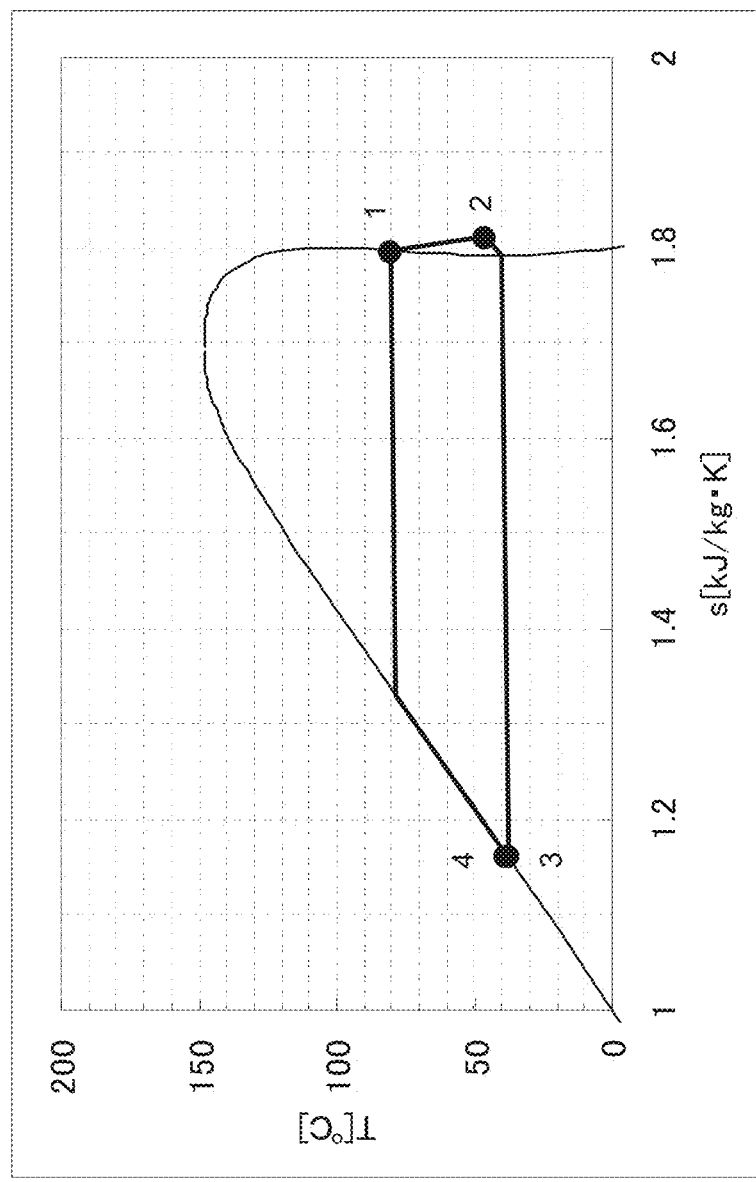
FIG. 8 shows a Ts diagram in example 7 according to the present invention.

Performance of an organic rankine cycle using a mixture working fluid composition of cis-1,3,3,3-tetrafluoropropene and trans-1,3,3,3-tetrafluoropropene was evaluated. For the evaluation, the power generation cycle efficiency and the expansion device size parameter were calculated under the conditions shown in Table 1. FIG. 8 shows a Ts diagram in example 7 (mass ratio of cis-1,3,3,3-tetrafluoropropene: trans-1,3,3,3-tetrafluoropropene is 95:5).

Example 8

Figure 9:
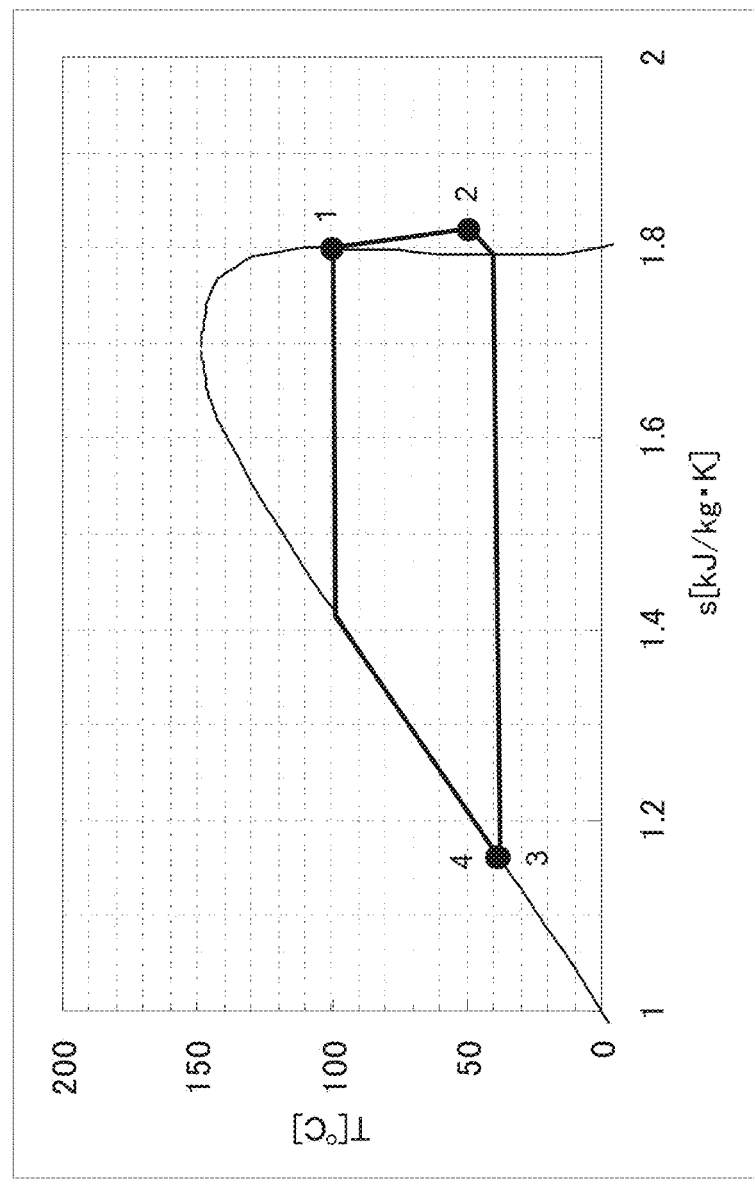
FIG. 9 shows a Ts diagram in example 8 according to the present invention.

Mixture working fluid composition of cis-1,3,3,3-tetrafluoropropene and trans-1,3,3,3-tetrafluoropropene Performance of an organic rankine cycle using a mixture working fluid composition of cis-1,3,3,3-tetrafluoropropene and trans-1,3,3,3-tetrafluoropropene was evaluated. For the evaluation, the power generation cycle efficiency and the expansion device size parameter were calculated under the conditions shown in Table 2. FIG. 9 shows a Ts diagram in example 8 (mass ratio of cis-1,3,3,3-tetrafluoropropene: trans-1,3,3,3-tetrafluoropropene is 95:5).

Example 9

Figure 10:
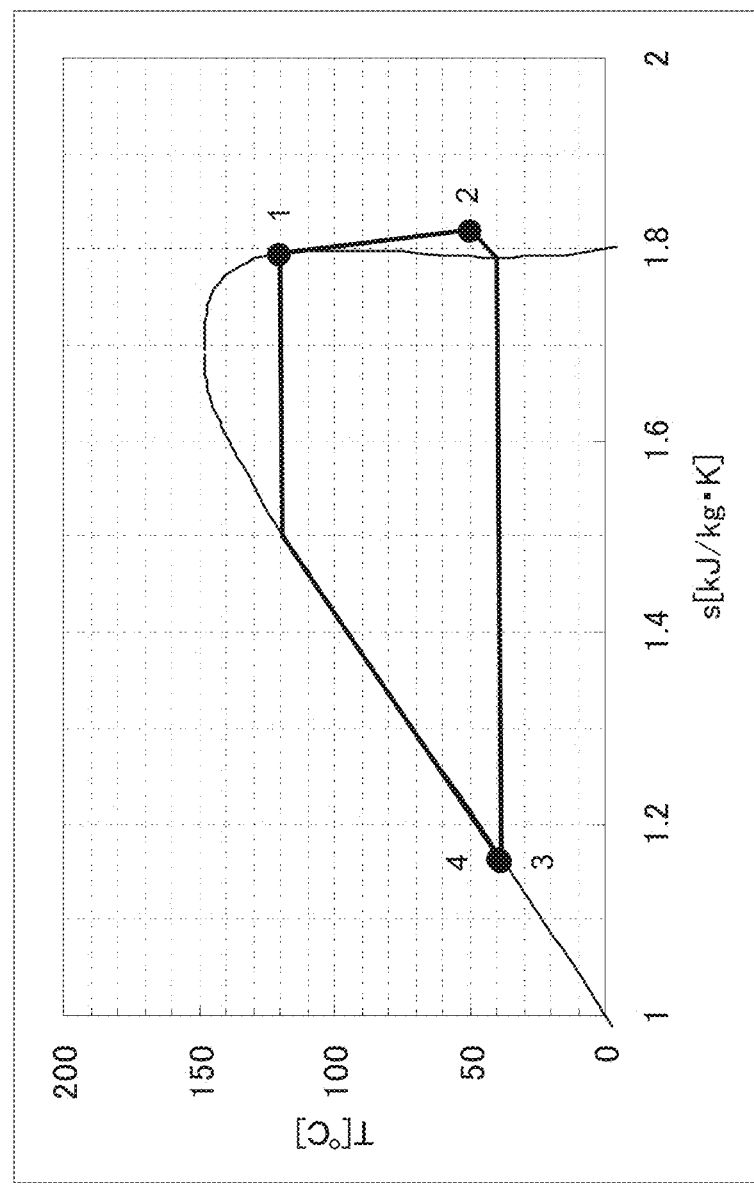
FIG. 10 shows a Ts diagram in example 9 according to the present invention.

Mixture working fluid composition of cis-1,3,3,3-tetrafluoropropene and trans-1,3,3,3-tetrafluoropropene Performance of an organic rankine cycle using a mixture working fluid composition of cis-1,3,3,3-tetrafluoropropene and trans-1,3,3,3-tetrafluoropropene was evaluated. For the evaluation, the power generation cycle efficiency and the expansion device size parameter were calculated under the conditions shown in Table 3. FIG. 10 shows a Ts diagram in example 9 (mass ratio of cis-1,3,3,3-tetrafluoropropene: trans-1,3,3,3-tetrafluoropropene is 95:5).

Example 10

Figure 11:
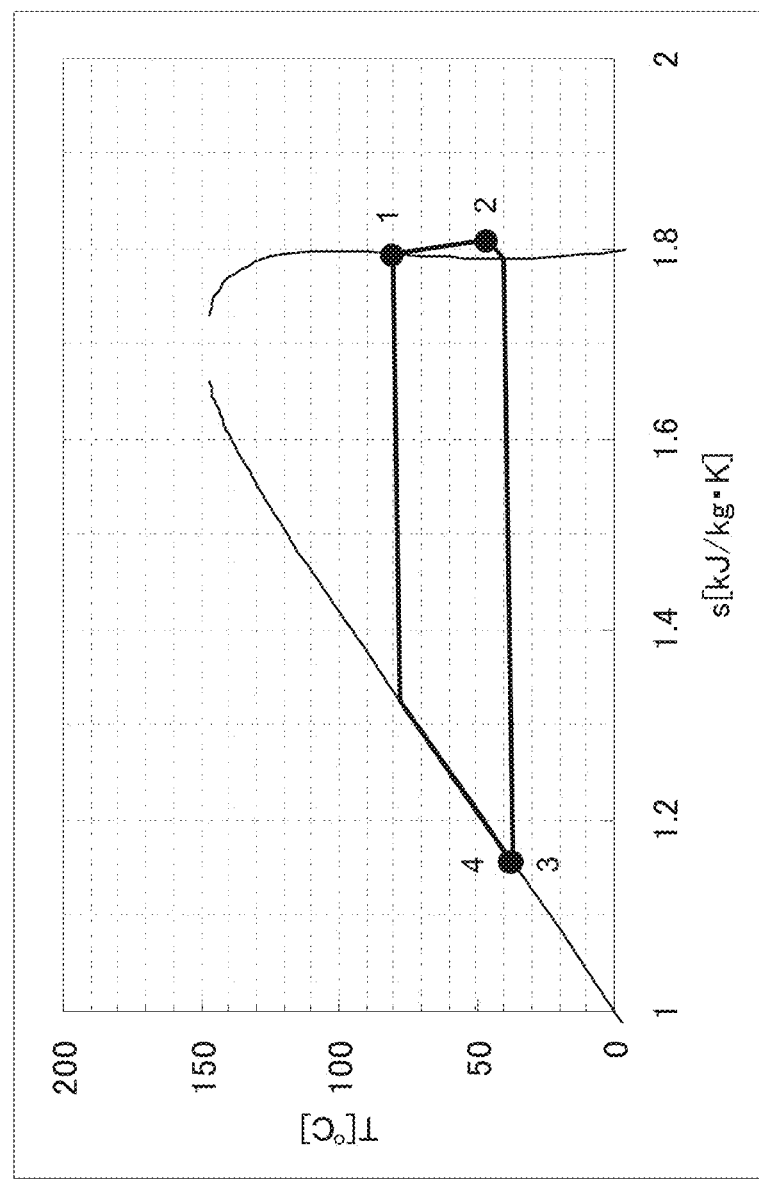
FIG. 11 shows a Ts diagram in example 10 according to the present invention.

Mixture working fluid composition of cis-1,3,3,3-tetrafluoropropene and 2,3,3,3-tetrafluoropropene Performance of an organic rankine cycle using a mixture working fluid composition of cis-1,3,3,3-tetrafluoropropene and 2,3,3,3-tetrafluoropropene was evaluated. For the evaluation, the power generation cycle efficiency and the expansion device size parameter were calculated under the conditions shown in Table 1. FIG. 11 shows a Ts diagram in example 10 (mass ratio of cis-1,3,3,3-tetrafluoropropene:2,3,3,3-tetrafluoropropene is 95:5).

Example 11

Figure 12:
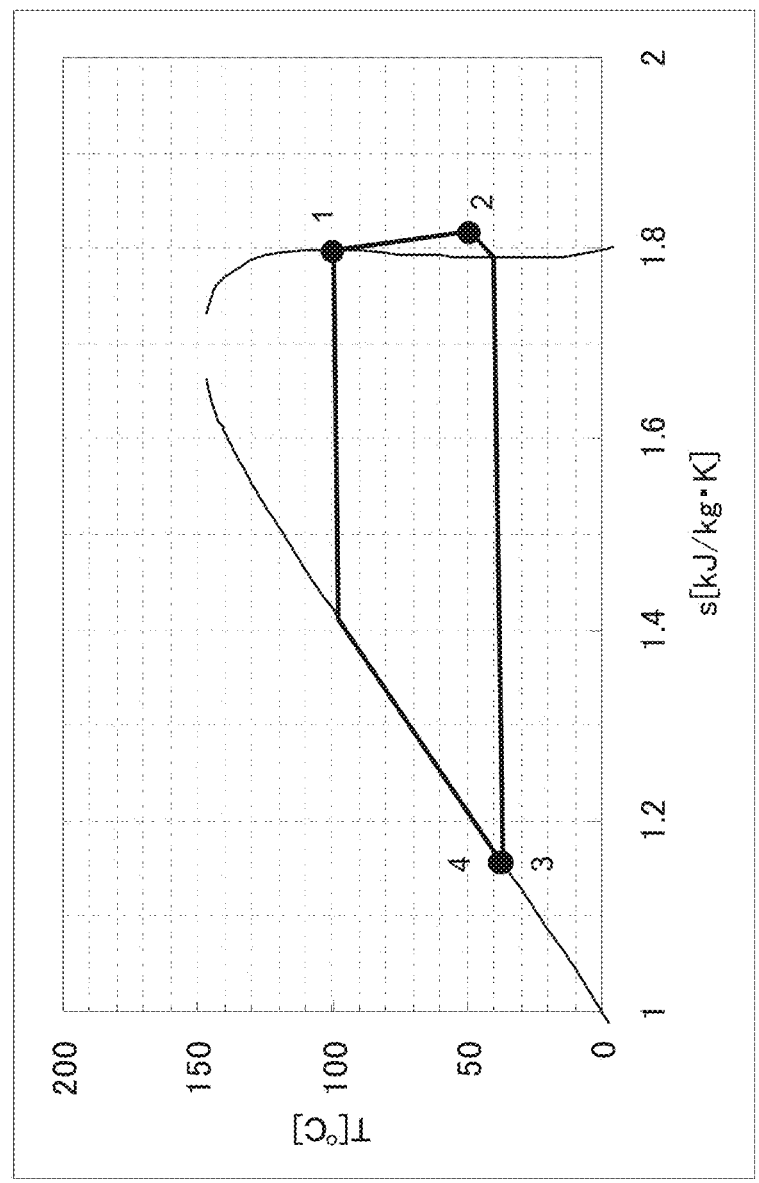
FIG. 12 shows a Ts diagram in example 11 according to the present invention.

Mixture working fluid composition of cis-1,3,3,3-tetrafluoropropene and 2,3,3,3-tetrafluoropropene Performance of an organic rankine cycle using a mixture working fluid composition of cis-1,3,3,3-tetrafluoropropene and 2,3,3,3-tetrafluoropropene was evaluated. For the evaluation, the power generation cycle efficiency and the expansion device size parameter were calculated under the conditions shown in Table 2. FIG. 12 shows a Ts diagram in example 11 (mass ratio of cis-1,3,3,3-tetrafluoropropene:2,3,3,3-tetrafluoropropene is 95:5).

Example 12

Figure 13:
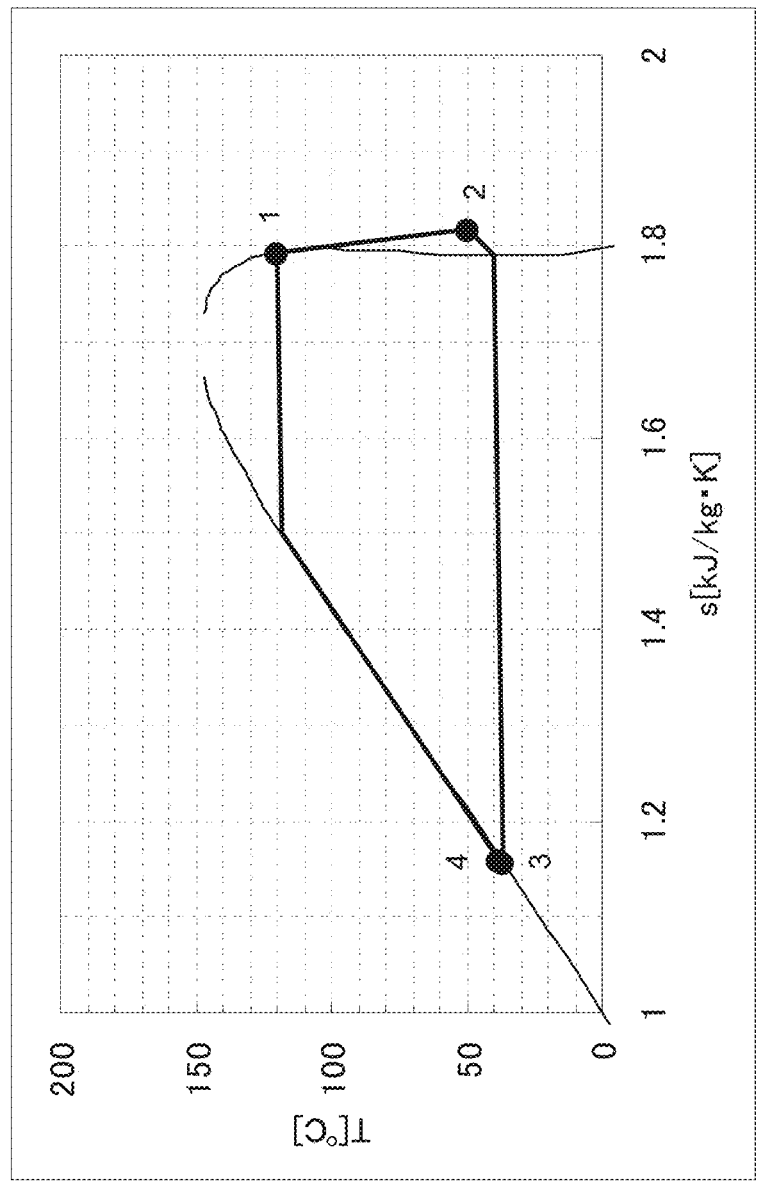
FIG. 13 shows a Ts diagram in example 12 according to the present invention.

Mixture working fluid composition of cis-1,3,3,3-tetrafluoropropene and 2,3,3,3-tetrafluoropropene Performance of an organic rankine cycle using a mixture working fluid composition of cis-1,3,3,3-tetrafluoropropene and 2,3,3,3-tetrafluoropropene was evaluated. For the evaluation, the power generation cycle efficiency and the expansion device size parameter were calculated under the conditions shown in Table 3. FIG. 13 shows a Ts diagram in example 12 (mass ratio of cis-1,3,3,3-tetrafluoropropene:2,3,3,3-tetrafluoropropene is 95:5).

Comparative Example 1

1,1,1,3,3-pentafluoropropane

Figure 14:
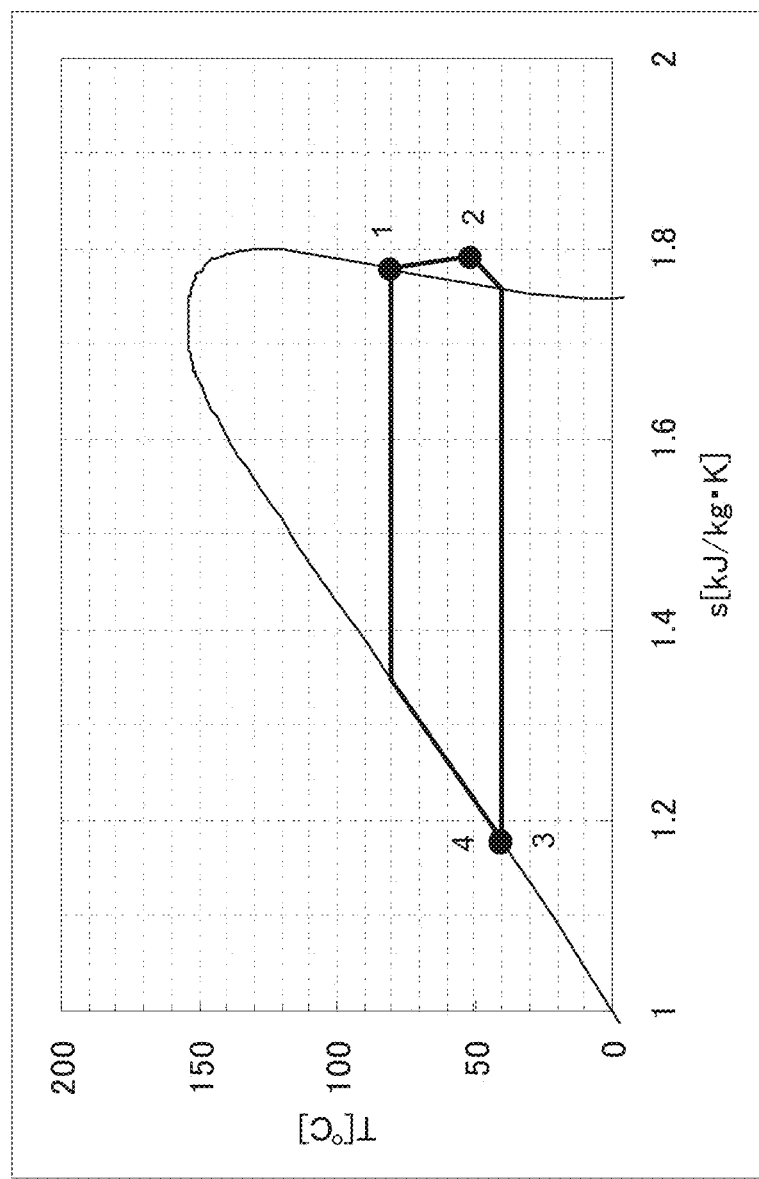
FIG. 14 shows a Ts diagram in comparative example 1 used for the present invention.

Performance of an organic rankine cycle using 1,1,1,3,3-pentafluoropropane as a working fluid instead of the working fluid composition according to the present invention was evaluated. For the evaluation, the power generation cycle efficiency and the expansion device size parameter were calculated under the conditions shown in Table 1. FIG. 14 shows a Ts diagram in comparative example 1.

Comparative Example 2

1,1,1,3,3-pentafluoropropane

Figure 15:
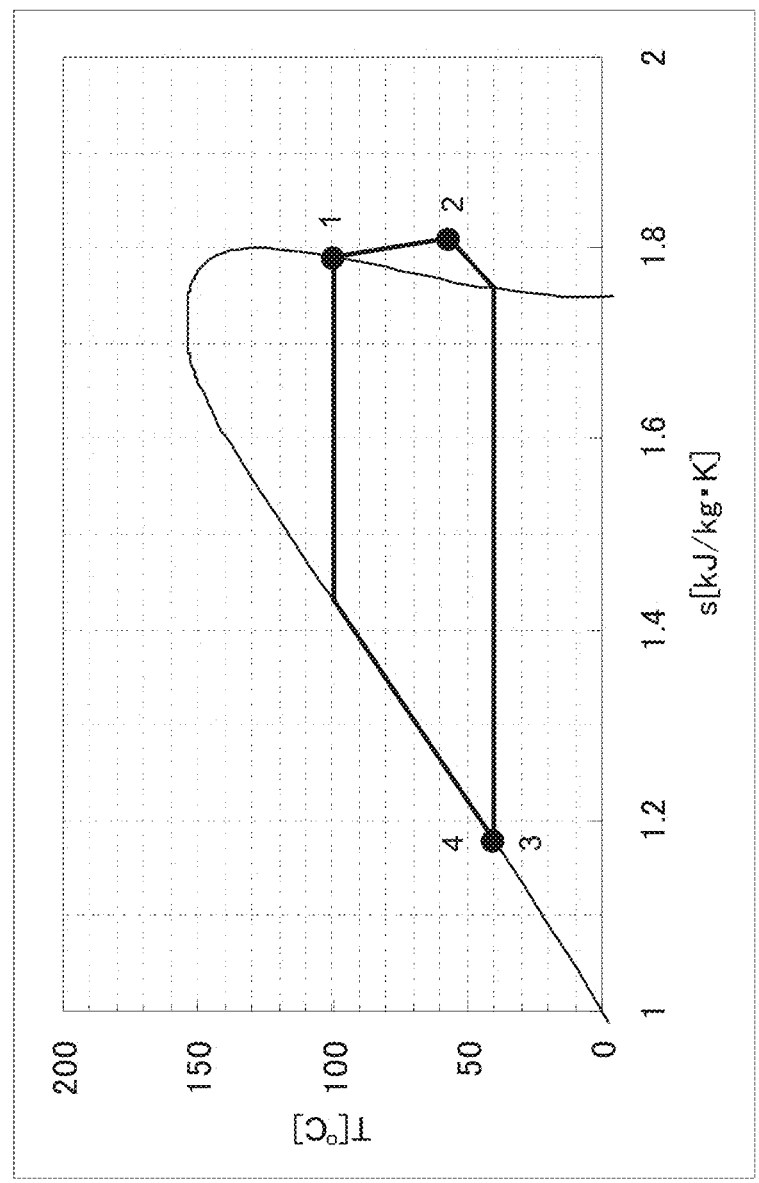
FIG. 15 shows a Ts diagram in comparative example 2 used for comparison with the present invention.

Performance of an organic rankine cycle using 1,1,1,3,3-pentafluoropropane as a working fluid instead of the working fluid composition according to the present invention was evaluated. For the evaluation, the power generation cycle efficiency and the expansion device size parameter were calculated under the conditions shown in Table 2. FIG. 15 shows a Ts diagram in comparative example 2.

Comparative Example 3

1,1,1,3,3-Pentafluoropropane

Figure 16:
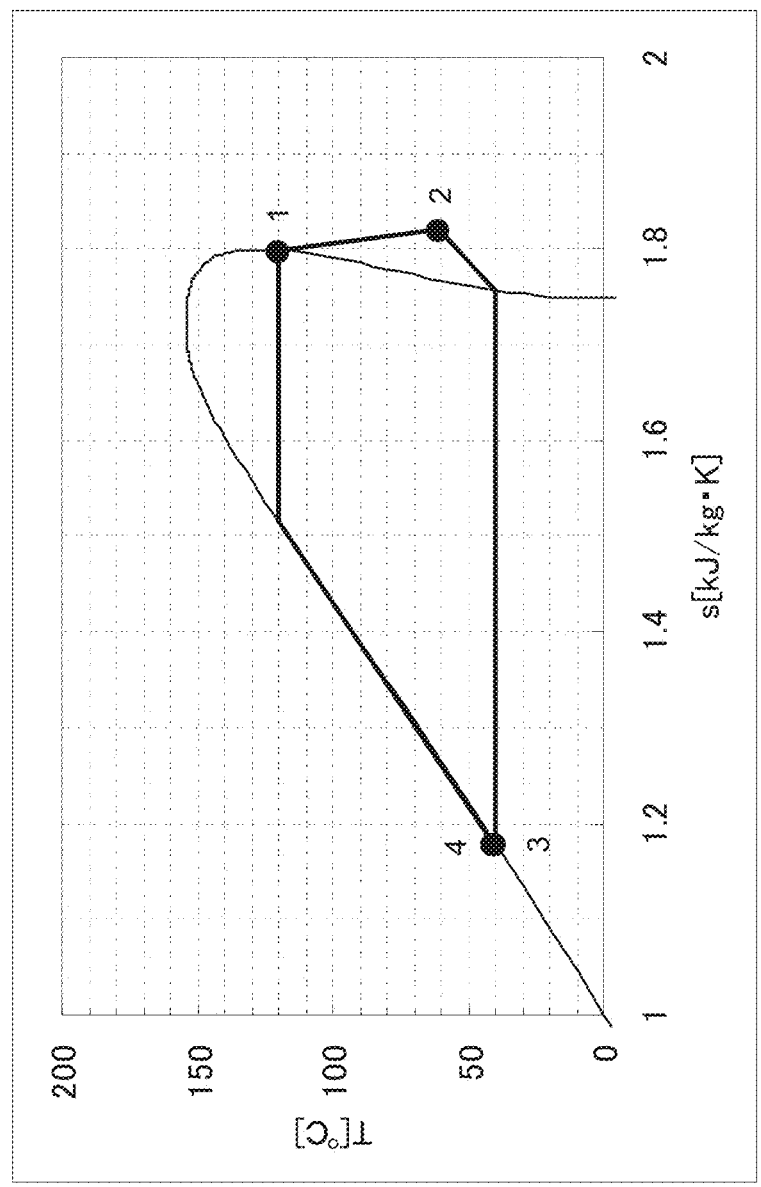
FIG. 16 shows a Ts diagram in comparative example 3 used for comparison with the present invention.

Performance of an organic rankine cycle using 1,1,1,3,3-pentafluoropropane as a working fluid instead of the working fluid composition according to the present invention was evaluated. For the evaluation, the power generation cycle efficiency and the expansion device size parameter were calculated under the conditions shown in Table 3. FIG. 16 shows a Ts diagram in comparative example 3.

Comparative Example 4

Cis-1-chloro-3,3,3-trifluoropropene

Figure 17:
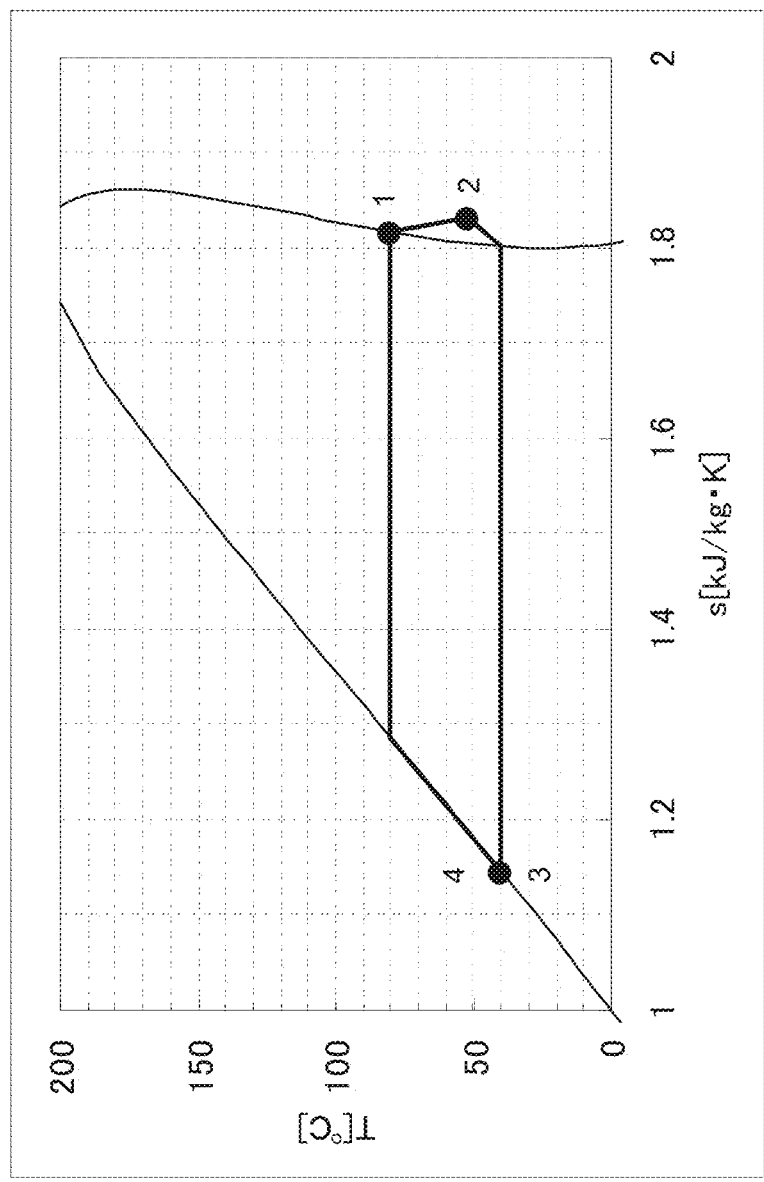
FIG. 17 shows a Ts diagram in comparative example 4 used for comparison with the present invention.

Performance of an organic rankine cycle using cis-1-chloro-3,3,3-trifluoropropene as a working fluid instead of the working fluid composition according to the present invention was evaluated. For the evaluation, the power generation cycle efficiency and the expansion device size parameter were calculated under the conditions shown in Table 1. FIG. 17 shows a Ts diagram in comparative example 4.

Comparative Example 5

Cis-1-chloro-3,3,3-trifluoropropene

Figure 18:
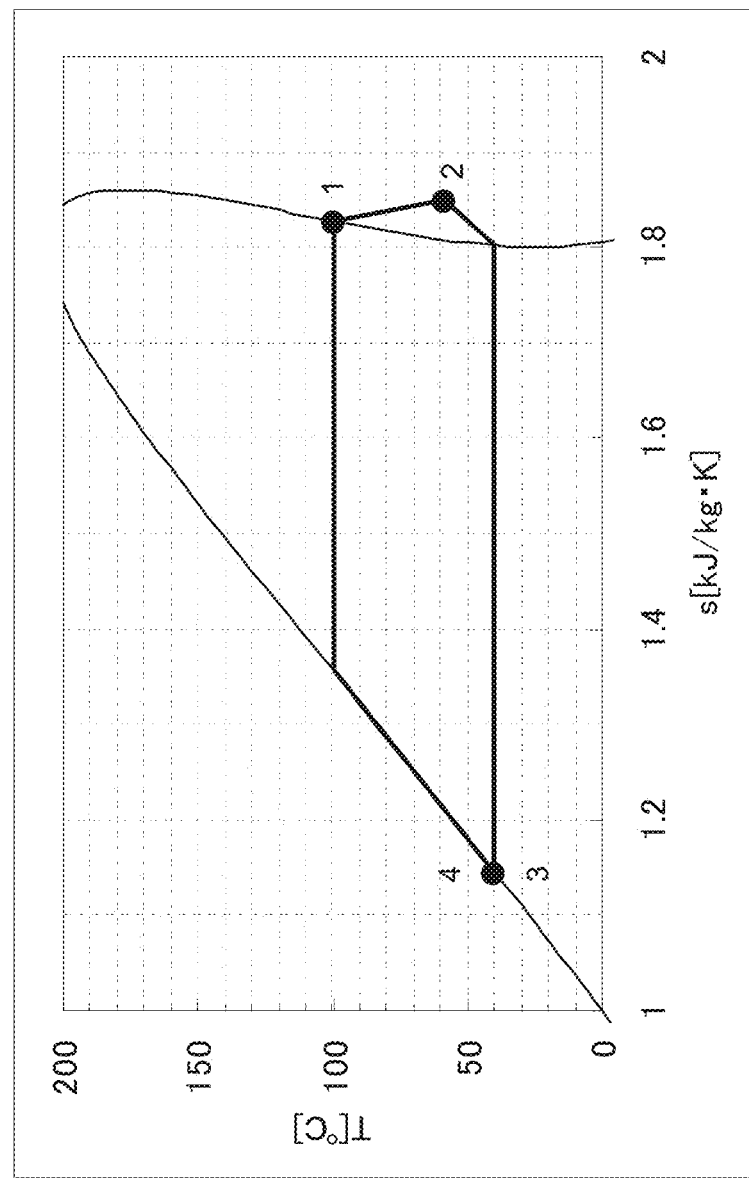
FIG. 18 shows a Ts diagram in comparative example 5 used for comparison with the present invention.

Performance of an organic rankine cycle using cis-1-chloro-3,3,3-trifluoropropene as a working fluid instead of the working fluid composition according to the present invention was evaluated. For the evaluation, the power generation cycle efficiency and the expansion device size parameter were calculated under the conditions shown in Table 2. FIG. 18 shows a Ts diagram in comparative example 5.

Comparative Example 6

Cis-1-chloro-3,3,3-trifluoropropene

Figure 19:
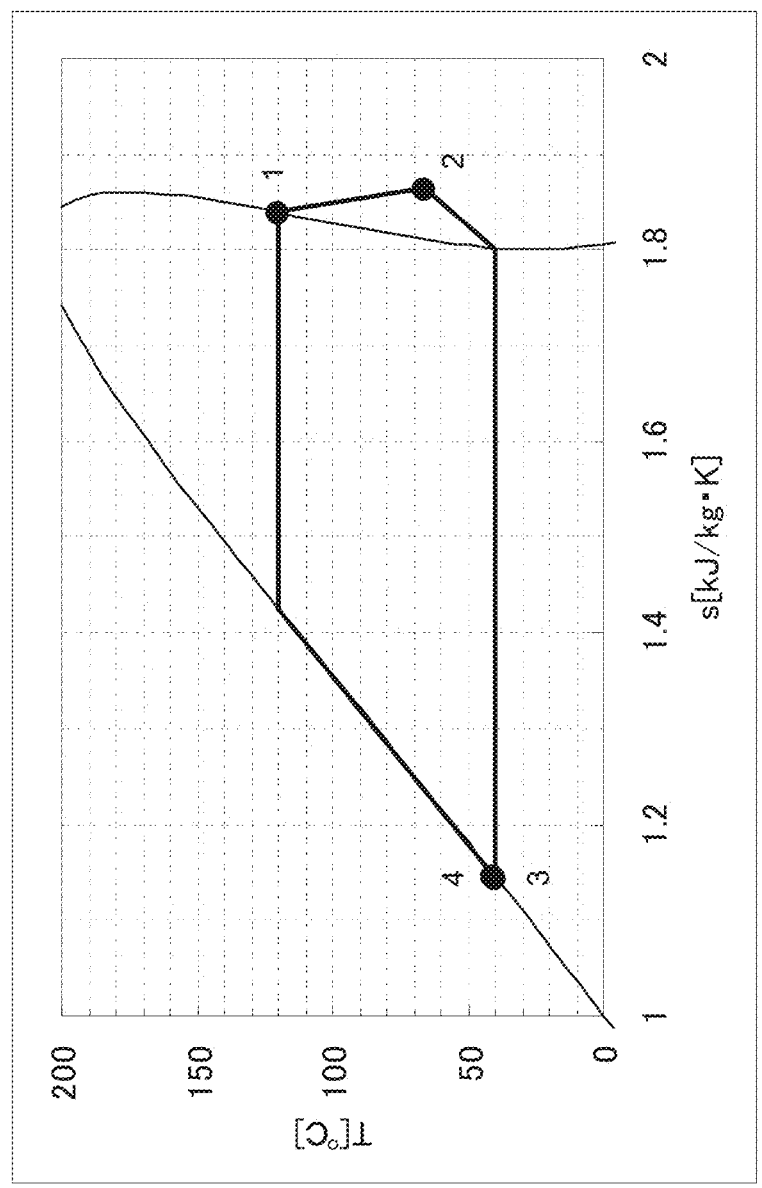
FIG. 19 shows a Ts diagram in comparative example 6 used for comparison with the present invention.

Performance of an organic rankine cycle using cis-1-chloro-3,3,3-trifluoropropene as a working fluid instead of the working fluid composition according to the present invention was evaluated. For the evaluation, the power generation cycle efficiency and the expansion device size parameter were calculated under the conditions shown in Table 3. FIG. 19 shows a Ts diagram in comparative example 6.

Comparative Example 7

Figure 20:
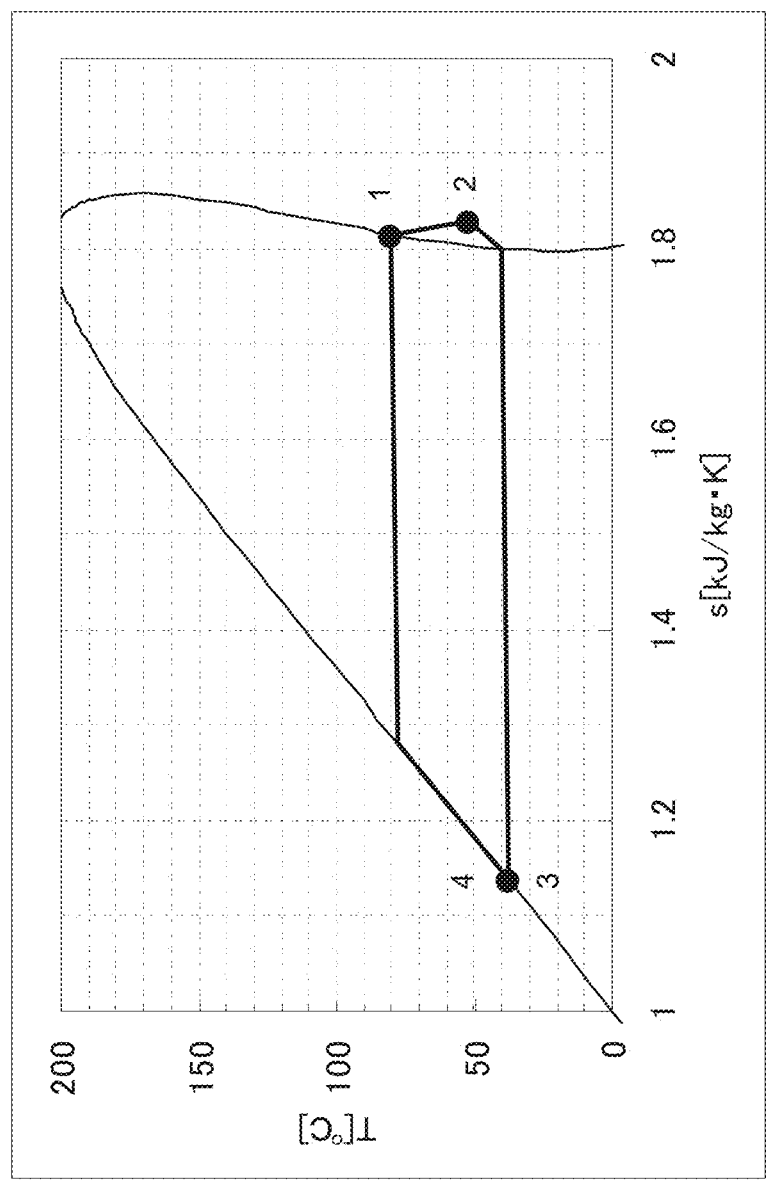
FIG. 20 shows a Ts diagram in comparative example 7 used for comparison with the present invention.

Mixture working fluid composition of cis-1-chloro-3,3,3-trifluoropropene and 1,1,1,3,3-pentafluoropropane Performance of an organic rankine cycle using a mixture working fluid composition of cis-1-chloro-3,3,3-trifluoropropene and 1,1,1,3,3-pentafluoropropane was evaluated. For the evaluation, the power generation cycle efficiency and the expansion device size parameter were calculated under the conditions shown in Table 1. FIG. 20 shows a Ts diagram in comparative example 7 (mass ratio of cis-1-chloro-3,3,3-trifluoropropene:1,1,1,3,3-pentafluoropropane is 95:5).

Comparative Example 8

Figure 21:
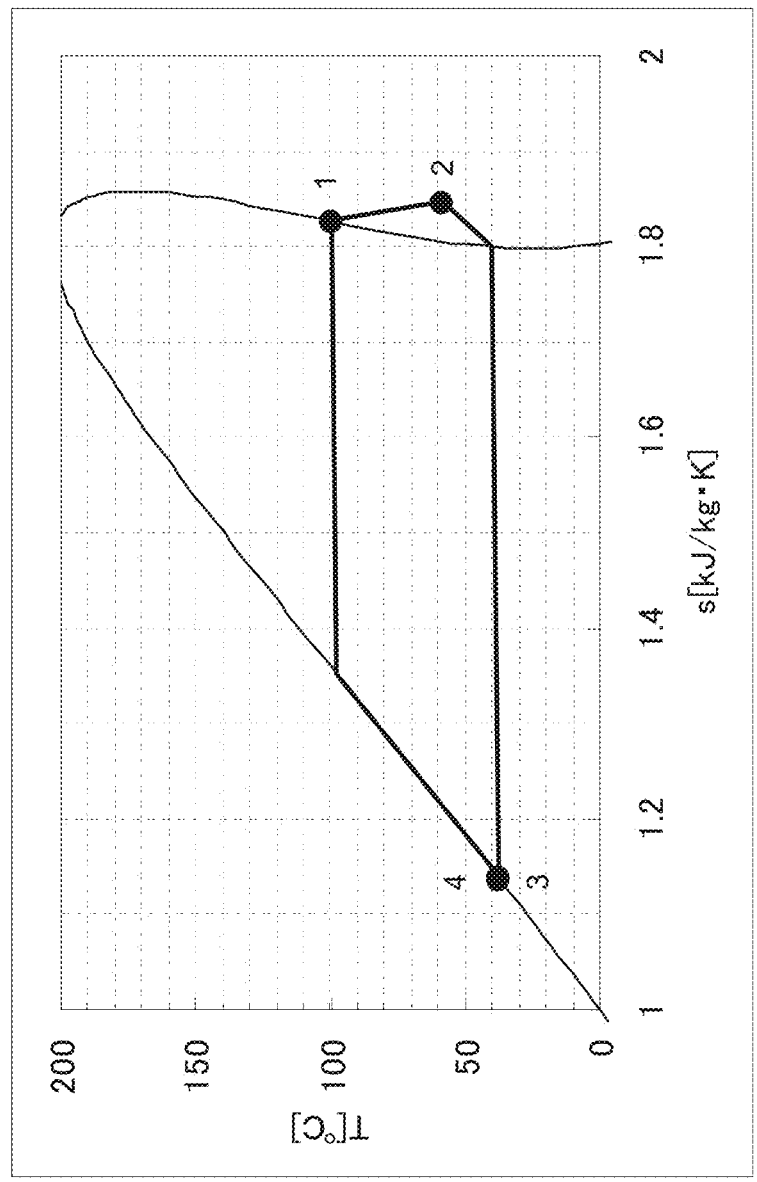
FIG. 21 shows a Ts diagram in comparative example 8 used for comparison with the present invention.

Mixture working fluid composition of cis-1-chloro-3,3,3-trifluoropropene and 1,1,1,3,3-pentafluoropropane Performance of an organic rankine cycle using a mixture working fluid composition of cis-1-chloro-3,3,3-trifluoropropene and 1,1,1,3,3-pentafluoropropane was evaluated. For the evaluation, the power generation cycle efficiency and the expansion device size parameter were calculated under the conditions shown in Table 2. FIG. 21 shows a Ts diagram in comparative example 8 (mass ratio of cis-1-chloro-3,3,3-trifluoropropene:1,1,1,3,3-pentafluoropropane is 95:5).

Comparative Example 9

Figure 22:
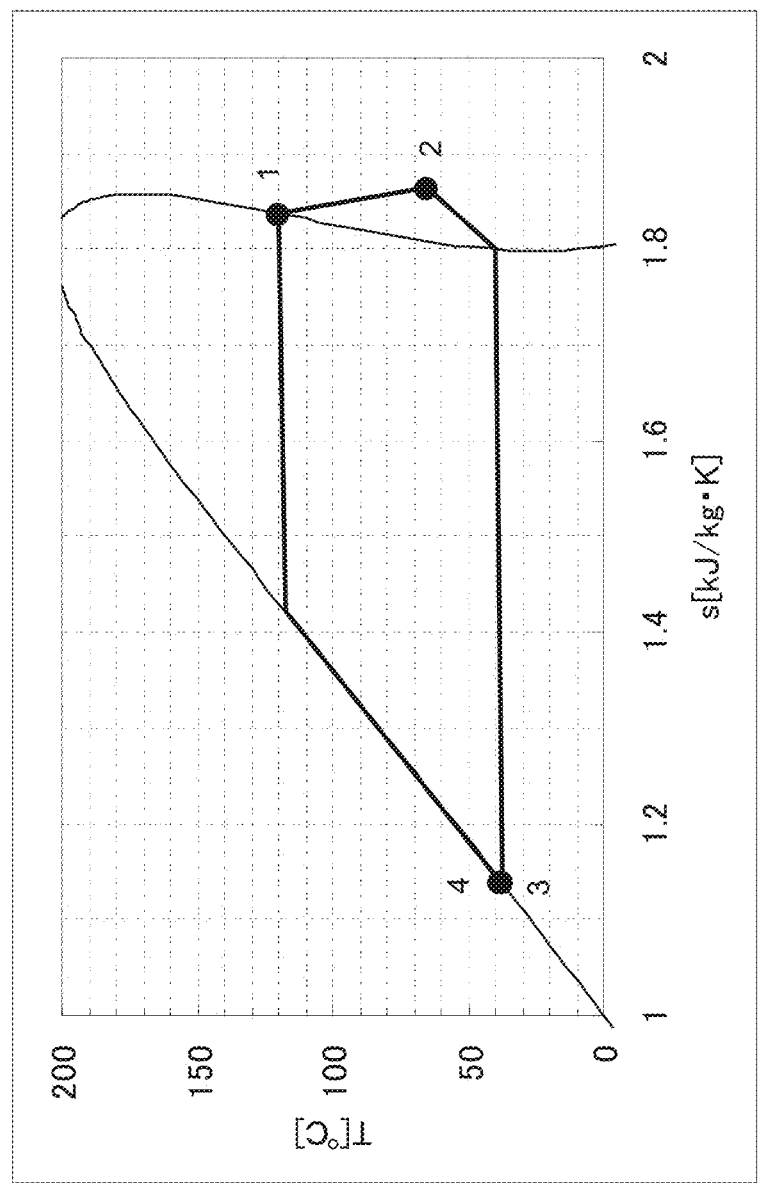
FIG. 22 shows a Ts diagram in comparative example 9 used for comparison with the present invention.

Mixture working fluid composition of cis-1-chloro-3,3,3-trifluoropropene and 1,1,1,3,3-pentafluoropropane Performance of an organic rankine cycle using a mixture working fluid composition of cis-1-chloro-3,3,3-trifluoropropene and 1,1,1,3,3-pentafluoropropane was evaluated. For the evaluation, the power generation cycle efficiency and the expansion device size parameter were calculated under the conditions shown in Table 3. FIG. 22 shows a Ts diagram in comparative example 9 (mass ratio of cis-1-chloro-3,3,3-trifluoropropene:1,1,1,3,3-pentafluoropropane is 95:5).

Comparative Example 10

Figure 23:
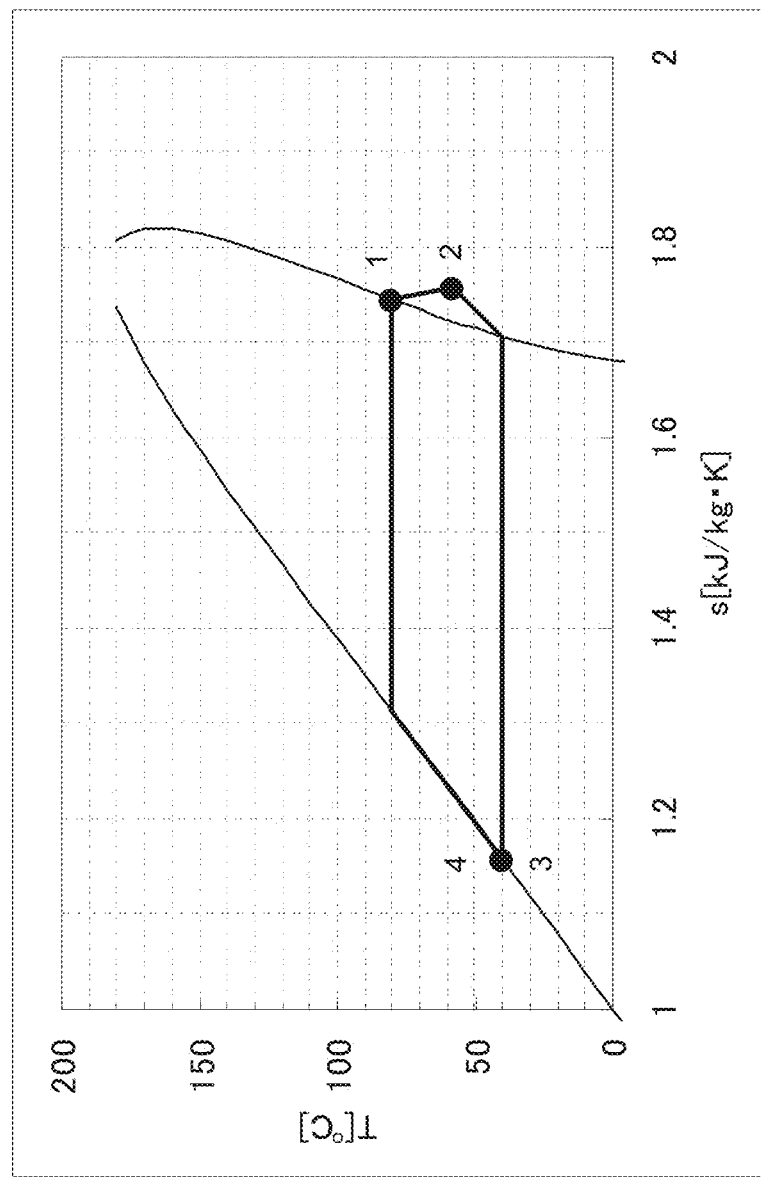
FIG. 23 shows a Ts diagram in comparative example 10 used for comparison with the present invention.

Mixture working fluid composition of cis-1,1,1,4,4,4-hexafluoro-2-butene and pentane Cis-1,1,1,4,4,4-hexafluoro-2-butene (HFO-1336mzz (Z)) will be described.
<HFO-1336mzz (Z)>
HFO-1336mzz (Z) is non-flammable and is not highly toxic. HFO-1336mzz (Z) has a boiling point of 33° C. at an atmospheric pressure, an atmospheric life time of 20 days, and a global warming potential (GWP) of 9 (Journal of Physical chemistry A 2011, Vol. 115, pp. 10539-10549).
Now, pentane will be described.
<Pentane>
Pentane is flammable and is not highly toxic. Pentane has a boiling point of 36° C. at an atmospheric pressure and a global warming potential (GWP) of 3.
Performance of an organic rankine cycle using a mixture working fluid composition of cis-1,1,1,4,4,4-hexafluoro-2-butene and pentane was evaluated. For the evaluation, the power generation cycle efficiency and the expansion device size parameter were calculated under the conditions shown in Table 1. FIG. 23 shows a Ts diagram in comparative example 10 (mass ratio of cis-1,1,1,4,4,4-hexafluoro-2-butene:pentane is 95:5).

Comparative Example 11

Figure 24:
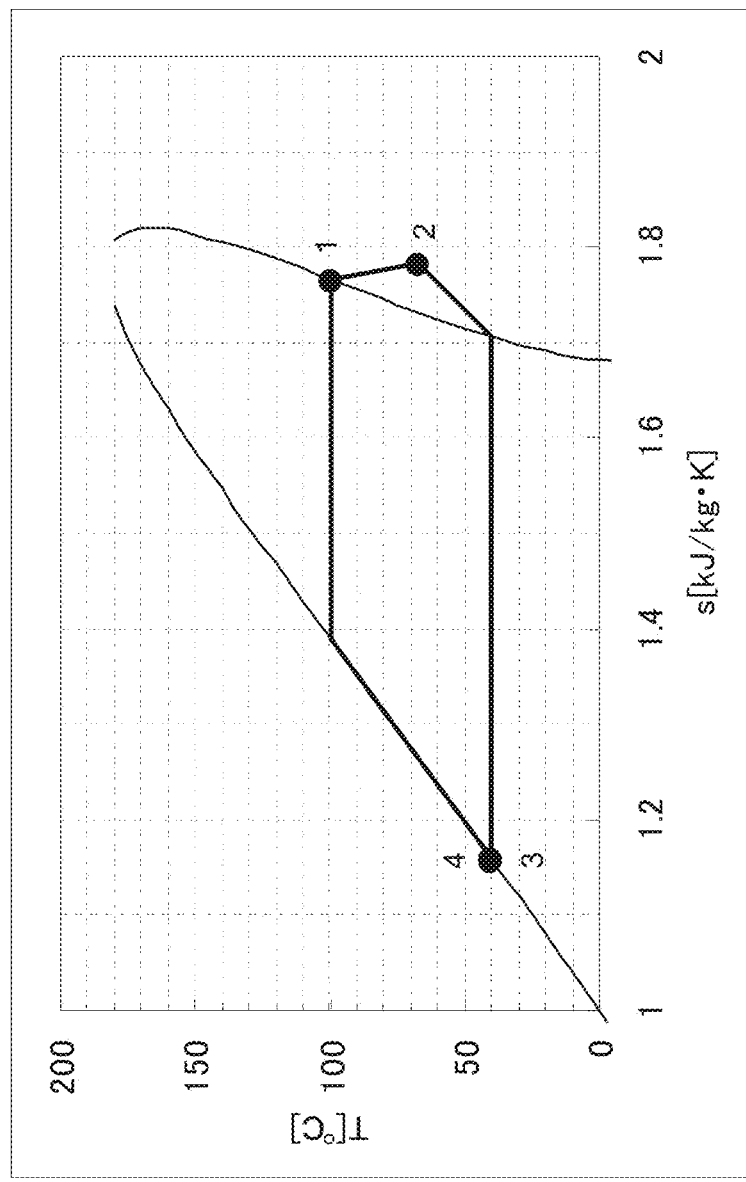
FIG. 24 shows a Ts diagram in comparative example 11 used for comparison with the present invention.

Mixture working fluid composition of cis-1,1,1,4,4,4-hexafluoro-2-butene and pentane Performance of an organic rankine cycle using a mixture working fluid composition of cis-1,1,1,4,4,4-hexafluoro-2-butene and pentane was evaluated. For the evaluation, the power generation cycle efficiency and the expansion device size parameter were calculated under the conditions shown in Table 2. FIG. 24 shows a Ts diagram in comparative example 11 (mass ratio of cis-1,1,1,4,4,4-hexafluoro-2-butene:pentane is 95:5).

Comparative Example 12

Figure 25:
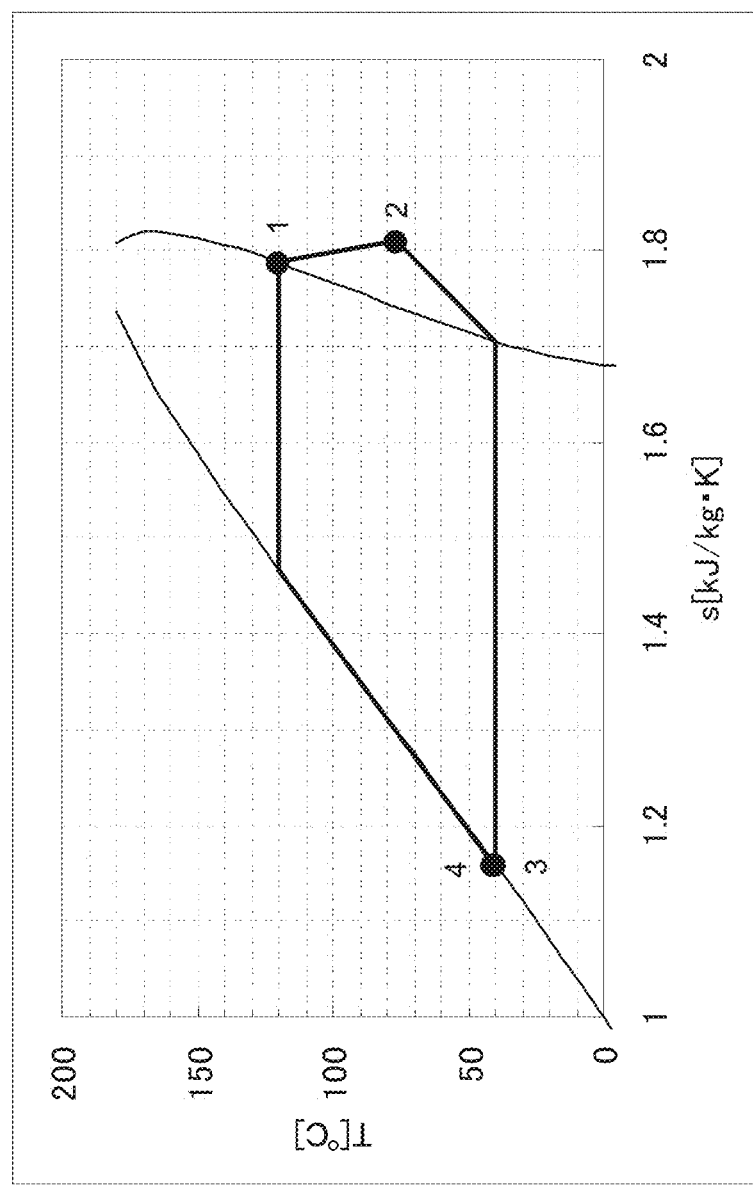
FIG. 25 shows a Ts diagram in comparative example 12 used for comparison with the present invention.

Mixture working fluid composition of cis-1,1,1,4,4,4-hexafluoro-2-butene and pentane Performance of an organic rankine cycle using a mixture working fluid composition of cis-1,1,1,4,4,4-hexafluoro-2-butene and pentane was evaluated. For the evaluation, the power generation cycle efficiency and the expansion device size parameter were calculated under the conditions shown in Table 3. FIG. 25 shows a Ts diagram in comparative example 12 (mass ratio of cis-1,1,1,4,4,4-hexafluoro-2-butene:pentane is 95:5).

Tables 4 through 41 show the calculation results on the organic rankine cycle performance ($\eta_{cycle}$ and SP) in examples 1 through 12 and comparative examples 1 through 12.

For examples 1 through 12 and comparative examples 7 through 12, the ratios of the first component and the second component of the working fluid composition are shown with "percent by mass". In examples 1, 3 and 5, the first component of the working fluid composition is cis-1,3,3,3-tetrafluoropropene, and the second component thereof is 1,1,1,3,3-pentafluoropropane.

In examples 2, 4 and 6, the first component of the mixture working fluid composition is cis-1,3,3,3-tetrafluoropropene, and the second component thereof is trans-1-chloro-3,3,3-trifluoropropene.

In examples 7 through 9, the first component of the mixture working fluid composition is cis-1,3,3,3-tetrafluoropropene, and the second component thereof is trans-1,3,3,3-tetrafluoropropene.

In examples 10 through 12, the first component of the mixture working fluid composition is cis-1,3,3,3-tetrafluoropropene, and the second component thereof is 2,3,3,3-tetrafluoropropene.

In comparative examples 7 through 9, the first component of the mixture working fluid composition is cis-1-chloro-3,3,3-trifluoropropene, and the second component thereof is 1,1,1,3,3-pentafluoropropane.

In comparative examples 10 through 12, the first component of the mixture working fluid composition is cis-1,1,1,4,4,4-hexafluoro-2-butene, and the second component thereof is pentane.

TABLE 4

<Example 1: mixture working fluid composition of cis-1,3,3,3-tetrafluoropropene and 1,1,1,3,3-pentafluoropropane; calculation conditions 1>

| Working fluid | | 1st component<br>2nd component | 50<br>50 | 60<br>40 | 70<br>30 | 80<br>20 | 90<br>10 | 92<br>8 |
|---|---|---|---|---|---|---|---|---|
| GWP | [—] | | 517 | 414 | 311 | 208 | 106 | 85 |
| Evaporator pressure | [kPa] | | 845 | 850 | 855 | 857 | 859 | 859 |
| Condenser pressure | [kPa] | | 278 | 281 | 284 | 287 | 288 | 289 |
| Pressure ratio | [—] | | 3.0 | 3.0 | 3.0 | 3.0 | 3.0 | 3.0 |
| Wetness | [—] | | — | — | — | — | — | — |
| Mass flow rate | [kg/s] | | 4.7 | 4.7 | 4.6 | 4.6 | 4.6 | 4.6 |
| Volumetric flow rate at expansion device | [m³/s] | | 0.106 | 0.106 | 0.106 | 0.107 | 0.107 | 0.107 |
| Volumetric flow rate at expansion device exit | [m³/s] | | 0.336 | 0.334 | 0.332 | 0.332 | 0.331 | 0.331 |
| Pump power | [kW] | | 2.9 | 2.9 | 2.9 | 2.9 | 2.9 | 2.9 |
| Work of expansion device | [kW] | | 81.2 | 81.4 | 81.5 | 81.6 | 81.7 | 81.7 |
| Power generator output | [kW] | | 77.2 | 77.3 | 77.4 | 77.5 | 77.6 | 77.6 |
| Net work | [kW] | | 74.3 | 74.4 | 74.5 | 74.6 | 74.7 | 74.7 |

TABLE 4-continued

<Example 1: mixture working fluid composition of cis-1,3,3,3-tetrafluoropropene and 1,1,1,3,3-pentafluoropropane; calculation conditions 1>

| | | | | | | |
|---|---|---|---|---|---|---|
| Power generation cycle efficiency | [%] | 7.84 | 7.85 | 7.86 | 7.87 | 7.88 | 7.88 |
| SP | [m] | 0.047 | 0.047 | 0.047 | 0.047 | 0.047 | 0.047 |
| Temperature gradient (evaporator) | [K] | 0.0 | 0.0 | 0.0 | 0.0 | 0.0 | 0.0 |
| Temperature gradient (condenser) | [K] | 0.1 | 0.1 | 0.1 | 0.0 | 0.0 | 0.0 |

| | | | | | | |
|---|---|---|---|---|---|---|
| Working fluid | 1st component | 95 | 97 | 98 | 99 | 99.9 |
| | 2nd component | 5 | 3 | 2 | 1 | 0.1 |
| GWP | [—] | 54 | 34 | 24 | 13 | 4 |
| Evaporator pressure | [kPa] | 859 | 859 | 859 | 859 | 859 |
| Condenser pressure | [kPa] | 289 | 289 | 290 | 290 | 290 |
| Pressure ratio | [—] | 3.0 | 3.0 | 3.0 | 3.0 | 3.0 |
| Wetness | [—] | — | — | — | — | — |
| Mass flow rate | [kg/s] | 4.6 | 4.6 | 4.6 | 4.6 | 4.6 |
| Volumetric flow rate at expansion device | [m³/s] | 0.107 | 0.108 | 0.108 | 0.108 | 0.108 |
| Volumetric flow rate at expansion device exit | [m³/s] | 0.331 | 0.331 | 0.331 | 0.331 | 0.332 |
| Pump power | [kW] | 2.9 | 2.9 | 2.9 | 2.9 | 2.9 |
| Work of expansion device | [kW] | 81.8 | 81.8 | 81.8 | 81.8 | 81.8 |
| Power generator output | [kW] | 77.7 | 77.7 | 77.7 | 77.7 | 77.7 |
| Net work | [kW] | 74.7 | 74.8 | 74.8 | 74.8 | 74.8 |
| Power generation cycle efficiency | [%] | 7.88 | 7.88 | 7.89 | 7.89 | 7.89 |
| SP | [m] | 0.047 | 0.047 | 0.047 | 0.047 | 0.047 |
| Temperature gradient (evaporator) | [K] | 0.0 | 0.0 | 0.0 | 0.0 | 0.0 |
| Temperature gradient (condenser) | [K] | 0.0 | 0.0 | 0.0 | 0.0 | 0.0 |

Table 5 shows the relative values of the volumetric flow rate at the expansion device entrance, the volumetric flow rate at the expansion device exit, the power generation cycle efficiency, and the SP in example 1 shown in Table 4 where the corresponding values of 1,1,1,3,3-pentafluoropropane are 1.

TABLE 5

<Example 1: mixture working fluid composition of cis-1,3,3,3-tetrafluoropropene and 1,1,1,3,3-pentafluoropropane; relative values of calculation conditions 1>

| | | | | | | | |
|---|---|---|---|---|---|---|---|
| Working fluid | 1st component | 50 | 60 | 70 | 80 | 90 | 92 |
| | 2nd component | 50 | 40 | 30 | 20 | 10 | 8 |
| Volumetric flow rate at expansion device entrance | [—] | 0.97 | 0.97 | 0.98 | 0.98 | 0.98 | 0.99 |
| Volumetric flow rate at expansion device exit | [—] | 0.94 | 0.94 | 0.93 | 0.93 | 0.93 | 0.93 |
| Power generation cycle efficiency | [—] | 1.01 | 1.01 | 1.01 | 1.01 | 1.01 | 1.01 |
| SP | [—] | 0.96 | 0.96 | 0.95 | 0.95 | 0.95 | 0.95 |

TABLE 5-continued

<Example 1: mixture working fluid composition of cis-1,3,3,3-tetrafluoropropene and 1,1,1,3,3-pentafluoropropane; relative values of calculation conditions 1>

| | | | | | | |
|---|---|---|---|---|---|---|
| Working fluid | 1st component | 95 | 97 | 98 | 99 | 99.9 |
| | 2nd component | 5 | 3 | 2 | 1 | 0.1 |
| Volumetric flow rate at expansion device entrance | [—] | 0.99 | 0.99 | 0.99 | 0.99 | 0.99 |
| Volumetric flow rate at expansion device exit | [—] | 0.93 | 0.93 | 0.93 | 0.93 | 0.93 |
| Power generation cycle efficiency | [—] | 1.01 | 1.01 | 1.01 | 1.01 | 1.01 |
| SP | [—] | 0.95 | 0.95 | 0.95 | 0.95 | 0.95 |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 6

<Example 2: mixture working fluid composition of cis-1,3,3,3-tetrafluoropropene and trans-1-chloro-3,3,3-trifluoropropene; calculation conditions 1>

| | | | | | | | |
|---|---|---|---|---|---|---|---|
| Working fluid | 1st component | 50 | 60 | 70 | 80 | 90 | 92 |
| | 2nd component | 50 | 40 | 30 | 20 | 10 | 8 |
| GWP | [—] | 5.0 | 4.6 | 4.2 | 3.8 | 3.4 | 3.3 |
| Evaporator pressure | [kPa] | 774 | 794 | 813 | 830 | 845 | 848 |

TABLE 6-continued

<Example 2: mixture working fluid composition of cis-1,3,3,3-tetrafluoropropene and trans-1-chloro-3,3,3-trifluoropropene; calculation conditions 1>

| | | | | | | | |
|---|---|---|---|---|---|---|---|
| Condenser pressure | [kPa] | 258 | 266 | 273 | 279 | 285 | 286 |
| Pressure ratio | [—] | 3.0 | 3.0 | 3.0 | 3.0 | 3.0 | 3.0 |
| Wetness | [—] | — | — | — | — | — | — |
| Mass flow rate | [kg/s] | 4.7 | 4.7 | 4.6 | 4.6 | 4.6 | 4.6 |
| Volumetric flow rate at expansion device entrance | [m³/s] | 0.118 | 0.116 | 0.113 | 0.111 | 0.109 | 0.109 |
| Volumetric flow rate at expansion device exit | [m³/s] | 0.366 | 0.357 | 0.349 | 0.342 | 0.336 | 0.335 |
| Pump power | [kW] | 2.7 | 2.7 | 2.8 | 2.9 | 2.9 | 2.9 |
| Work of expansion device | [kW] | 81.6 | 81.6 | 81.7 | 81.7 | 81.8 | 81.8 |
| Power generator output | [kW] | 77.5 | 77.6 | 77.6 | 77.6 | 77.7 | 77.7 |
| Net work | [kW] | 74.8 | 74.8 | 74.8 | 74.8 | 74.8 | 74.8 |
| Power generation cycle efficiency | [%] | 7.89 | 7.89 | 7.89 | 7.89 | 7.89 | 7.89 |
| SP | [m] | 0.049 | 0.049 | 0.048 | 0.047 | 0.047 | 0.047 |
| Temperature gradient (evaporator) | [K] | 0.6 | 0.4 | 0.3 | 0.2 | 0.1 | 0.1 |
| Temperature gradient (condenser) | [K] | 0.6 | 0.5 | 0.3 | 0.2 | 0.1 | 0.1 |

| Working fluid | 1st component | 95 | 97 | 98 | 99 | 99.9 |
|---|---|---|---|---|---|---|
| | 2nd component | 5 | 3 | 2 | 1 | 0.1 |
| GWP | [—] | 3.2 | 3.1 | 3.1 | 3.0 | 3.0 |
| Evaporator pressure | [kPa] | 852 | 855 | 856 | 857 | 859 |
| Condenser pressure | [kPa] | 287 | 288 | 289 | 289 | 290 |
| Pressure ratio | [—] | 3.0 | 3.0 | 3.0 | 3.0 | 3.0 |
| Wetness | [—] | — | — | — | — | — |
| Mass flow rate | [kg/s] | 4.6 | 4.6 | 4.6 | 4.6 | 4.6 |
| Volumetric flow rate at expansion device entrance | [m³/s] | 0.109 | 0.108 | 0.108 | 0.108 | 0.108 |
| Volumetric flow rate at expansion device exit | [m³/s] | 0.334 | 0.333 | 0.332 | 0.332 | 0.332 |
| Pump power | [kW] | 2.9 | 2.9 | 2.9 | 2.9 | 2.9 |
| Work of expansion device | [kW] | 81.8 | 81.8 | 81.8 | 81.8 | 81.8 |
| Power generator output | [kW] | 77.7 | 77.7 | 77.7 | 77.7 | 77.7 |
| Net work | [kW] | 74.8 | 74.8 | 74.8 | 74.8 | 74.8 |
| Power generation cycle efficiency | [%] | 7.89 | 7.89 | 7.89 | 7.89 | 7.89 |
| SP | [m] | 0.047 | 0.047 | 0.047 | 0.047 | 0.047 |
| Temperature gradient (evaporator) | [K] | 0.0 | 0.0 | 0.0 | 0.0 | 0.0 |
| Temperature gradient (condenser) | [K] | 0.0 | 0.0 | 0.0 | 0.0 | 0.0 |

Table 7 shows the relative values of the volumetric flow rate at the expansion device entrance, the volumetric flow rate at the expansion device exit, the power generation cycle efficiency, and the SP in example 2 shown in Table 6 where the corresponding values of 1,1,1,3,3-pentafluoropropane are 1.

TABLE 7

<Example 2: mixture working fluid composition of cis-1,3,3,3-tetrafluoropropene and trans-1-chloro-3,3,3-trifluoropropene; relative values of calculation conditions 1>

| Working fluid | 1st component | 50 | 60 | 70 | 80 | 90 | 92 |
|---|---|---|---|---|---|---|---|
| | 2nd component | 50 | 40 | 30 | 20 | 10 | 8 |
| Volumetric flow rate at expansion device entrance | [—] | 1.09 | 1.06 | 1.04 | 1.02 | 1.00 | 1.00 |
| Volumetric flow rate at expansion device exit | [—] | 1.03 | 1.00 | 0.98 | 0.96 | 0.94 | 0.94 |
| Power generation cycle efficiency | [—] | 1.01 | 1.01 | 1.01 | 1.01 | 1.01 | 1.01 |
| SP | [—] | 1.00 | 0.99 | 0.98 | 0.96 | 0.95 | 0.95 |

| Working fluid | 1st component | 95 | 97 | 98 | 99 | 99.9 |
|---|---|---|---|---|---|---|
| | 2nd component | 5 | 3 | 2 | 1 | 0.1 |
| Volumetric flow rate at expansion device entrance | [—] | 1.00 | 0.99 | 0.99 | 0.99 | 0.99 |

TABLE 7-continued

<Example 2: mixture working fluid composition of cis-1,3,3,3-tetrafluoropropene and trans-1-chloro-3,3,3-trifluoropropene; relative values of calculation conditions 1>

| | | | | | | |
|---|---|---|---|---|---|---|
| Volumetric flow rate at expansion device exit | [—] | 0.93 | 0.93 | 0.93 | 0.93 | 0.93 |
| Power generation cycle efficiency | [—] | 1.01 | 1.01 | 1.01 | 1.01 | 1.01 |
| SP | [—] | 0.95 | 0.95 | 0.95 | 0.95 | 0.95 |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 8

<Example 3: mixture working fluid composition of cis-1,3,3,3-tetrafluoropropene and 1,1,1,3,3-pentafluoropropane; calculation conditions 2>

| Working fluid | 1st component | | 50 | 60 | 70 | 80 | 90 | 92 |
|---|---|---|---|---|---|---|---|---|
| | 2nd component | | 50 | 40 | 30 | 20 | 10 | 8 |
| GWP | | [—] | 517 | 414 | 311 | 208 | 106 | 85 |
| Evaporator pressure | | [kPa] | 1337 | 1344 | 1348 | 1350 | 1351 | 1350 |
| Condenser pressure | | [kPa] | 278 | 281 | 284 | 287 | 288 | 289 |
| Pressure ratio | | [—] | 4.8 | 4.8 | 4.7 | 4.7 | 4.7 | 4.7 |
| Wetness | | [—] | — | — | — | — | — | — |
| Mass flow rate | | [kg/s] | 4.5 | 4.5 | 4.4 | 4.4 | 4.4 | 4.4 |
| Volumetric flow rate at expansion device entrance | | [m³/s] | 0.061 | 0.061 | 0.062 | 0.062 | 0.062 | 0.062 |
| Volumetric flow rate at expansion device exit | | [m³/s] | 0.326 | 0.324 | 0.323 | 0.322 | 0.322 | 0.322 |
| Pump power | | [kW] | 5.1 | 5.2 | 5.2 | 5.2 | 5.2 | 5.2 |
| Work of expansion device | | [kW] | 109.3 | 109.5 | 109.7 | 109.9 | 110.1 | 110.2 |
| Power generator output | | [kW] | 103.8 | 104.0 | 104.2 | 104.4 | 104.6 | 104.7 |
| Net work | | [kW] | 98.7 | 98.9 | 99.0 | 99.2 | 99.4 | 99.5 |
| Power generation cycle efficiency | | [%] | 10.4 | 10.4 | 10.5 | 10.5 | 10.5 | 10.5 |
| SP | | [m] | 0.043 | 0.042 | 0.042 | 0.042 | 0.042 | 0.042 |
| Temperature gradient (evaporator) | | [K] | 0.0 | 0.0 | 0.0 | 0.0 | 0.0 | 0.0 |
| Temperature gradient (condenser) | | [K] | 0.1 | 0.1 | 0.1 | 0.0 | 0.0 | 0.0 |

| Working fluid | 1st component | | 95 | 97 | 98 | 99 | 99.9 |
|---|---|---|---|---|---|---|---|
| | 2nd component | | 5 | 3 | 2 | 1 | 0.1 |
| GWP | | [—] | 54 | 34 | 24 | 13 | 4 |
| Evaporator pressure | | [kPa] | 1350 | 1350 | 1349 | 1349 | 1349 |
| Condenser pressure | | [kPa] | 289 | 289 | 290 | 290 | 290 |
| Pressure ratio | | [—] | 4.7 | 4.7 | 4.7 | 4.7 | 4.7 |
| Wetness | | [—] | — | — | — | — | — |
| Mass flow rate | | [kg/s] | 4.4 | 4.4 | 4.4 | 4.4 | 4.4 |
| Volumetric flow rate at expansion device entrance | | [m³/s] | 0.063 | 0.063 | 0.063 | 0.063 | 0.063 |
| Volumetric flow rate at expansion device exit | | [m³/s] | 0.322 | 0.322 | 0.322 | 0.322 | 0.322 |
| Pump power | | [kW] | 5.2 | 5.2 | 5.2 | 5.2 | 5.2 |
| Work of expansion device | | [kW] | 110.3 | 110.3 | 110.3 | 110.3 | 110.3 |
| Power generator output | | [kW] | 104.7 | 104.8 | 104.8 | 104.8 | 104.8 |
| Net work | | [kW] | 99.5 | 99.5 | 99.6 | 99.6 | 99.6 |
| Power generation cycle efficiency | | [%] | 10.5 | 10.5 | 10.5 | 10.5 | 10.5 |
| SP | | [m] | 0.042 | 0.042 | 0.042 | 0.042 | 0.042 |
| Temperature gradient (evaporator) | | [K] | 0.0 | 0.0 | 0.0 | 0.0 | 0.0 |
| Temperature gradient (condenser) | | [K] | 0.0 | 0.0 | 0.0 | 0.0 | 0.0 |

Table 9 shows the relative values of the volumetric flow rate at the expansion device entrance, the volumetric flow rate at the expansion device exit, the power generation cycle efficiency, and the SP in example 3 shown in Table 8 where the corresponding values of 1,1,1,3,3-pentafluoropropane are 1.

TABLE 9

<Example 3: mixture working fluid composition of cis-1,3,3,3-tetrafluoropropene and 1,1,1,3,3-pentafluoropropane; relative values of calculation conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | [—] | | 0.98 | 0.99 | 0.99 | 1.00 | 1.00 | 1.00 |
| Volumetric flow rate at expansion device exit | [—] | | 0.94 | 0.94 | 0.93 | 0.93 | 0.93 | 0.93 |
| Power generation cycle efficiency | [—] | | 1.01 | 1.01 | 1.01 | 1.01 | 1.02 | 1.02 |
| SP | [—] | | 0.96 | 0.96 | 0.96 | 0.95 | 0.95 | 0.95 |
| Working fluid | 1st component<br>2nd component | | 95<br>5 | 97<br>3 | 98<br>2 | 99<br>1 | 99.9<br>0.1 | |
| Volumetric flow rate at expansion device entrance | [—] | | 1.01 | 1.01 | 1.01 | 1.01 | 1.01 | |
| Volumetric flow rate at expansion device exit | [—] | | 0.93 | 0.93 | 0.93 | 0.93 | 0.93 | |
| Power generation cycle efficiency | [—] | | 1.02 | 1.02 | 1.02 | 1.02 | 1.02 | |
| SP | [—] | | 0.95 | 0.95 | 0.95 | 0.95 | 0.95 | |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 10

<Example 4: mixture working fluid composition of cis-1,3,3,3-tetrafluoropropene and trans-1-chloro-3,3,3-trifluoropropene; calculation conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 5.0 | 4.6 | 4.2 | 3.8 | 3.4 | 3.3 |
| Evaporator pressure | [kPa] | | 1220 | 1251 | 1279 | 1305 | 1328 | 1333 |
| Condenser pressure | [kPa] | | 258 | 266 | 273 | 279 | 285 | 286 |
| Pressure ratio | [—] | | 4.7 | 4.7 | 4.7 | 4.7 | 4.7 | 4.7 |
| Wetness | [—] | | — | — | — | — | — | — |
| Mass flow rate | [kg/s] | | 4.5 | 4.5 | 4.4 | 4.4 | 4.4 | 4.4 |
| Volumetric flow rate at expansion device entrance | [m$^3$/s] | | 0.069 | 0.068 | 0.066 | 0.065 | 0.064 | 0.064 |
| Volumetric flow rate at expansion device exit | [m$^3$/s] | | 0.355 | 0.346 | 0.339 | 0.332 | 0.327 | 0.326 |
| Pump power | [kW] | | 4.8 | 4.9 | 5.0 | 5.1 | 5.2 | 5.2 |
| Work of expansion device | [kW] | | 110.1 | 110.2 | 110.2 | 110.3 | 110.3 | 110.3 |
| Power generator output | [kW] | | 104.6 | 104.7 | 104.7 | 104.8 | 104.8 | 104.8 |
| Net work | [kW] | | 99.9 | 99.8 | 99.7 | 99.7 | 99.6 | 99.6 |
| Power generation cycle efficiency | [%] | | 10.5 | 10.5 | 10.5 | 10.5 | 10.5 | 10.5 |
| SP | [m] | | 0.044 | 0.044 | 0.043 | 0.043 | 0.042 | 0.042 |
| Temperature gradient (evaporator) | [K] | | 0.5 | 0.4 | 0.3 | 0.2 | 0.1 | 0.1 |
| Temperature gradient (condenser) | [K] | | 0.6 | 0.5 | 0.3 | 0.2 | 0.1 | 0.1 |

TABLE 10-continued

<Example 4: mixture working fluid composition of cis-1,3,3,3-tetrafluoropropene and trans-1-chloro-3,3,3-trifluoropropene; calculation conditions 2>

| Working fluid | 1st component | 95 | 97 | 98 | 99 | 99.9 |
|---|---|---|---|---|---|---|
|  | 2nd component | 5 | 3 | 2 | 1 | 0.1 |
| GWP | [—] | 3.2 | 3.1 | 3.1 | 3.0 | 3.0 |
| Evaporator pressure | [kPa] | 1339 | 1343 | 1345 | 1347 | 1349 |
| Condenser pressure | [kPa] | 287 | 288 | 289 | 289 | 290 |
| Pressure ratio | [—] | 4.7 | 4.7 | 4.7 | 4.7 | 4.7 |
| Wetness | [—] | — | — | — | — | — |
| Mass flow rate | [kg/s] | 4.4 | 4.4 | 4.4 | 4.4 | 4.4 |
| Volumetric flow rate at expansion device entrance | [m$^3$/s] | 0.063 | 0.063 | 0.063 | 0.063 | 0.063 |
| Volumetric flow rate at expansion device exit | [m$^3$/s] | 0.324 | 0.323 | 0.323 | 0.322 | 0.322 |
| Pump power | [kW] | 5.2 | 5.2 | 5.2 | 5.2 | 5.2 |
| Work of expansion device | [kW] | 110.3 | 110.3 | 110.3 | 110.3 | 110.3 |
| Power generator output | [kW] | 104.8 | 104.8 | 104.8 | 104.8 | 104.8 |
| Net work | [kW] | 99.6 | 99.6 | 99.6 | 99.6 | 99.6 |
| Power generation cycle efficiency | [%] | 10.5 | 10.5 | 10.5 | 10.5 | 10.5 |
| SP | [m] | 0.042 | 0.042 | 0.042 | 0.042 | 0.042 |
| Temperature gradient (evaporator) | [K] | 0.0 | 0.0 | 0.0 | 0.0 | 0.0 |
| Temperature gradient (condenser) | [K] | 0.0 | 0.0 | 0.0 | 0.0 | 0.0 |

Table 11 shows the relative values of the volumetric flow rate at the expansion device entrance, the volumetric flow rate at the expansion device exit, the power generation cycle efficiency, and the SP in example 4 shown in Table 10 where the corresponding values of 1,1,1,3,3-pentafluoropropane are 1.

TABLE 11

<Example 4: mixture working fluid composition of cis-1,3,3,3-tetrafluoropropene and trans-1-chloro-3,3,3-trifluoropropene; relative values of calculation conditions 2>

| Working fluid | 1st component | 50 | 60 | 70 | 80 | 90 | 92 |
|---|---|---|---|---|---|---|---|
|  | 2nd component | 50 | 40 | 30 | 20 | 10 | 8 |
| Volumetric flow rate at expansion device entrance | [—] | 1.11 | 1.09 | 1.06 | 1.04 | 1.03 | 1.02 |
| Volumetric flow rate at expansion device exit | [—] | 1.03 | 1.00 | 0.98 | 0.96 | 0.95 | 0.94 |
| Power generation cycle efficiency | [—] | 1.02 | 1.02 | 1.02 | 1.02 | 1.02 | 1.02 |
| SP | [—] | 1.00 | 0.99 | 0.98 | 0.97 | 0.96 | 0.96 |

| Working fluid | 1st component | 95 | 97 | 98 | 99 | 99.9 |
|---|---|---|---|---|---|---|
|  | 2nd component | 5 | 3 | 2 | 1 | 0.1 |
| Volumetric flow rate at expansion device entrance | [—] | 1.02 | 1.01 | 1.01 | 1.01 | 1.01 |
| Volumetric flow rate at expansion device exit | [—] | 0.94 | 0.94 | 0.94 | 0.93 | 0.93 |
| Power generation cycle efficiency | [—] | 1.02 | 1.02 | 1.02 | 1.02 | 1.02 |
| SP | [—] | 0.95 | 0.95 | 10.95 | 0.95 | 0.95 |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 12

<Example 5: mixture working fluid composition of cis-1,3,3,3-tetrafluoropropene and 1,1,1,3,3-pentafluoropropane; calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 517 | 414 | 311 | 208 | 106 | 85 |
| Evaporator pressure | [kPa] | | 2021 | 2028 | 2032 | 2032 | 2031 | 2030 |
| Condenser pressure | [kPa] | | 278 | 281 | 284 | 287 | 288 | 289 |
| Pressure ratio | [—] | | 7.3 | 7.2 | 7.1 | 7.1 | 7.0 | 7.0 |
| Wetness | [—] | | — | — | — | — | — | — |
| Mass flow rate | [kg/s] | | 4.3 | 4.3 | 4.3 | 4.3 | 4.3 | 4.3 |
| Volumetric flow rate at expansion device entrance | [m$^3$/s] | | 0.036 | 0.036 | 0.036 | 0.036 | 0.037 | 0.037 |
| Volumetric flow rate at expansion device exit | [m$^3$/s] | | 0.318 | 0.317 | 0.315 | 0.315 | 0.315 | 0.315 |
| Pump power | [kW] | | 8.2 | 8.2 | 8.3 | 8.3 | 8.3 | 8.3 |
| Work of expansion device | [kW] | | 131.4 | 131.7 | 132.0 | 132.3 | 132.6 | 132.6 |
| Power generator output | [kW] | | 124.9 | 125.1 | 125.4 | 125.7 | 125.9 | 126.0 |
| Net work | [kW] | | 116.7 | 116.9 | 117.1 | 117.3 | 117.6 | 117.6 |
| Power generation cycle efficiency | [%] | | 12.3 | 12.3 | 12.4 | 12.4 | 12.4 | 12.4 |
| SP | [m] | | 0.040 | 0.040 | 0.039 | 0.039 | 0.039 | 0.039 |
| Temperature gradient (evaporator) | [K] | | 0.0 | 0.0 | 0.0 | 0.0 | 0.0 | 0.0 |
| Temperature gradient (condenser) | [K] | | 0.1 | 0.1 | 0.1 | 0.0 | 0.0 | 0.0 |
| Working fluid | 1st component<br>2nd component | | 95<br>5 | 97<br>3 | 98<br>2 | 99<br>1 | 99.9<br>0.1 | |
| GWP | [—] | | 54 | 34 | 24 | 13 | 4 | |
| Evaporator pressure | [kPa] | | 2029 | 2028 | 2028 | 2027 | 2027 | |
| Condenser pressure | [kPa] | | 289 | 289 | 290 | 290 | 290 | |
| Pressure ratio | [—] | | 7.0 | 7.0 | 7.0 | 7.0 | 7.0 | |
| Wetness | [—] | | — | — | — | — | — | |
| Mass flow rate | [kg/s] | | 4.3 | 4.3 | 4.3 | 4.3 | 4.3 | |
| Volumetric flow rate at expansion device entrance | [m$^3$/s] | | 0.037 | 0.037 | 0.037 | 0.037 | 0.037 | |
| Volumetric flow rate at expansion device exit | [m$^3$/s] | | 0.315 | 0.315 | 0.315 | 0.315 | 0.315 | |
| Pump power | [kW] | | 8.3 | 8.3 | 8.3 | 8.3 | 8.3 | |
| Work of expansion device | [kW] | | 132.7 | 132.7 | 132.8 | 132.8 | 132.8 | |
| Power generator output | [kW] | | 126.1 | 126.1 | 126.1 | 126.2 | 126.2 | |
| Net work | [kW] | | 117.7 | 117.8 | 117.8 | 117.8 | 117.8 | |
| Power generation cycle efficiency | [%] | | 12.4 | 12.4 | 12.4 | 12.4 | 12.4 | |
| SP | [m] | | 0.039 | 0.039 | 0.039 | 0.039 | 0.039 | |
| Temperature gradient (evaporator) | [K] | | 0.0 | 0.0 | 0.0 | 0.0 | 0.0 | |
| Temperature gradient (condenser) | [K] | | 0.0 | 0.0 | 0.0 | 0.0 | 0.0 | |

Table 13 shows the relative values of the volumetric flow rate at the expansion device entrance, the volumetric flow rate at the expansion device exit, the power generation cycle efficiency, and the SP in example 5 shown in Table 12 where the corresponding values of 1,1,1,3,3-pentafluoropropane are 1.

TABLE 13

<Example 5: mixture working fluid composition of cis-1,3,3,3-tetrafluoropropene and 1,1,1,3,3-pentafluoropropane; relative values of calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | [—] | | 0.99 | 0.99 | 0.99 | 1.00 | 1.01 | 1.01 |
| Volumetric flow rate at expansion device exit | [—] | | 0.95 | 0.94 | 0.94 | 0.94 | 0.94 | 0.94 |
| Power generation cycle efficiency | [—] | | 1.01 | 1.01 | 1.01 | 1.01 | 1.02 | 1.02 |
| SP | [—] | | 0.97 | 0.96 | 0.96 | 0.96 | 0.96 | 0.95 |
| Working fluid | 1st component<br>2nd component | | 95<br>5 | 97<br>3 | 98<br>2 | 99<br>1 | 99.9<br>0.1 | |
| Volumetric flow rate at expansion device entrance | [—] | | 1.01 | 1.02 | 1.02 | 1.02 | 1.02 | |
| Volumetric flow rate at expansion device exit | [—] | | 0.94 | 0.94 | 0.94 | 0.94 | 0.94 | |
| Power generation cycle efficiency | [—] | | 1.02 | 1.02 | 1.02 | 1.02 | 1.02 | |
| SP | [—] | | 0.95 | 0.95 | 0.95 | 0.95 | 0.95 | |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 14

<Example 6: mixture working fluid composition of cis-1,3,3,3-tetrafluoropropene and trans-1-chloro-3,3,3-trifluoropropene; calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 5.0 | 4.6 | 4.2 | 3.8 | 3.4 | 3.3 |
| Evaporator pressure | [kPa] | | 1837 | 1882 | 1924 | 1962 | 1996 | 2003 |
| Condenser pressure | [kPa] | | 258 | 266 | 273 | 279 | 285 | 286 |
| Pressure ratio | [—] | | 7.1 | 7.1 | 7.1 | 7.0 | 7.0 | 7.0 |
| Wetness | [—] | | — | — | — | — | — | — |
| Mass flow rate | [kg/s] | | 4.3 | 4.3 | 4.3 | 4.3 | 4.3 | 4.3 |
| Volumetric flow rate at expansion device entrance | [m$^3$/s] | | 0.041 | 0.040 | 0.039 | 0.038 | 0.038 | 0.038 |
| Volumetric flow rate at expansion device exit | [m$^3$/s] | | 0.347 | 0.338 | 0.331 | 0.325 | 0.319 | 0.318 |
| Pump power | [kW] | | 7.6 | 7.8 | 8.0 | 8.1 | 8.2 | 8.3 |
| Work of expansion device | [kW] | | 132.9 | 132.9 | 132.9 | 132.8 | 132.8 | 132.8 |
| Power generator output | [kW] | | 126.3 | 126.2 | 126.2 | 126.2 | 126.2 | 126.2 |
| Net work | [kW] | | 118.7 | 118.5 | 118.3 | 118.1 | 118.0 | 117.9 |
| Power generation cycle efficiency | [%] | | 12.5 | 12.5 | 12.5 | 12.5 | 12.5 | 12.5 |
| SP | [m] | | 0.041 | 0.041 | 0.040 | 0.040 | 0.040 | 0.039 |
| Temperature gradient (evaporator) | [K] | | 0.5 | 0.4 | 0.3 | 0.2 | 0.1 | 0.1 |
| Temperature gradient (condenser) | [K] | | 0.6 | 0.5 | 0.3 | 0.2 | 0.1 | 0.1 |

TABLE 14-continued

<Example 6: mixture working fluid composition of cis-1,3,3,3-tetrafluoropropene and trans-1-chloro-3,3,3-trifluoropropene; calculation conditions 3>

| Working fluid | | 1st component | 95 | 97 | 98 | 99 | 99.9 |
|---|---|---|---|---|---|---|---|
| | | 2nd component | 5 | 3 | 2 | 1 | 0.1 |
| GWP | [—] | | 3.2 | 3.1 | 3.1 | 3.0 | 3.0 |
| Evaporator pressure | [kPa] | | 2012 | 2018 | 2021 | 2024 | 2026 |
| Condenser pressure | [kPa] | | 287 | 288 | 289 | 289 | 290 |
| Pressure ratio | [—] | | 7.0 | 7.0 | 7.0 | 7.0 | 7.0 |
| Wetness | [—] | | — | — | — | — | — |
| Mass flow rate | [kg/s] | | 4.3 | 4.3 | 4.3 | 4.3 | 4.3 |
| Volumetric flow rate at expansion device entrance | [m$^3$/s] | | 0.037 | 0.037 | 0.037 | 0.037 | 0.037 |
| Volumetric flow rate at expansion device exit | [m$^3$/s] | | 0.317 | 0.316 | 0.316 | 0.315 | 0.315 |
| Pump power | [kW] | | 8.3 | 8.3 | 8.3 | 8.3 | 8.3 |
| Work of expansion device | [kW] | | 132.8 | 132.8 | 132.8 | 132.8 | 132.8 |
| Power generator output | [kW] | | 126.2 | 126.2 | 126.2 | 126.2 | 126.2 |
| Net work | [kW] | | 117.9 | 117.9 | 117.9 | 117.9 | 117.8 |
| Power generation cycle efficiency | [%] | | 12.5 | 12.5 | 12.5 | 12.4 | 12.4 |
| SP | [m] | | 0.039 | 0.039 | 0.039 | 0.039 | 0.039 |
| Temperature gradient (evaporator) | [K] | | 0.0 | 0.0 | 0.0 | 0.0 | 0.0 |
| Temperature gradient (condenser) | [K] | | 0.0 | 0.0 | 0.0 | 0.0 | 0.0 |

Table 15 shows the relative values of the volumetric flow rate at the expansion device entrance, the volumetric flow rate at the expansion device exit, the power generation cycle efficiency, and the SP in example 6 shown in Table 14 where the corresponding values of 1,1,1,3,3-pentafluoropropane are 1.

TABLE 15

<Example 6: mixture working fluid composition of cis-1,3,3,3-tetrafluoropropene and trans-1-chloro-3,3,3-trifluoropropene; relative values of calculation conditions 3>

| Working fluid | | 1st component | 50 | 60 | 70 | 80 | 90 | 92 |
|---|---|---|---|---|---|---|---|---|
| | | 2nd component | 50 | 40 | 30 | 20 | 10 | 8 |
| Volumetric flow rate at expansion device entrance | [—] | | 1.14 | 1.11 | 1.08 | 1.06 | 1.04 | 1.03 |
| Volumetric flow rate at expansion device exit | [—] | | 1.03 | 1.01 | 0.98 | 0.97 | 0.95 | 0.95 |
| Power generation cycle efficiency | [—] | | 1.02 | 1.02 | 1.02 | 1.02 | 1.02 | 1.02 |
| SP | [—] | | 1.01 | 0.99 | 0.98 | 0.97 | 0.96 | 0.96 |

| Working fluid | | 1st component | 95 | 97 | 98 | 99 | 99.9 |
|---|---|---|---|---|---|---|---|
| | | 2nd component | 5 | 3 | 2 | 1 | 0.1 |
| Volumetric flow rate at expansion device entrance | [—] | | 1.03 | 1.02 | 1.02 | 1.02 | 1.02 |
| Volumetric flow rate at expansion device exit | [—] | | 0.94 | 0.94 | 0.94 | 0.94 | 0.94 |
| Power generation cycle efficiency | [—] | | 1.02 | 1.02 | 1.02 | 1.02 | 1.02 |
| SP | [—] | | 0.96 | 0.96 | 0.96 | 0.95 | 0.95 |

Here, the relative value of the cycle efficiency is preferable larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 16

<Example 7: mixture working fluid composition of cis-1,3,3,3-tetrafluoropropene and trans-1,3,3,3-tetrafluoropropene; calculation conditions 1>

| Working fluid | | 1st component | 50 | 60 | 70 | 80 | 90 | 92 |
|---|---|---|---|---|---|---|---|---|
| | | 2nd component | 50 | 40 | 30 | 20 | 10 | 8 |
| GWP | [—] | | 4.5 | 4.2 | 3.9 | 3.6 | 3.3 | 3.2 |
| Evaporator pressure | [kPa] | | 1296 | 1185 | 1088 | 1002 | 926 | 912 |
| Condenser pressure | [kPa] | | 450 | 408 | 371 | 340 | 313 | 308 |
| Pressure ratio | [—] | | 2.9 | 2.9 | 2.9 | 2.9 | 3.0 | 3.0 |
| Wetness | [—] | | — | — | — | — | — | — |
| Mass flow rate | [kg/s] | | 4.9 | 4.7 | 4.6 | 4.6 | 4.5 | 4.5 |
| Volumetric flow rate at expansion device entrance | [m$^3$/s] | | 0.072 | 0.078 | 0.084 | 0.091 | 0.099 | 0.101 |
| Volumetric flow rate at expansion device exit | [m$^3$/s] | | 0.222 | 0.241 | 0.261 | 0.282 | 0.305 | 0.310 |
| Pump power | [kW] | | 4.7 | 4.2 | 3.8 | 3.4 | 3.1 | 3.1 |
| Work of expansion device | [kW] | | 81.7 | 81.4 | 81.1 | 81.0 | 81.1 | 81.2 |
| Power generator output | [kW] | | 77.6 | 77.3 | 77.1 | 76.9 | 77.1 | 77.1 |
| Net work | [kW] | | 72.9 | 73.1 | 73.3 | 73.5 | 73.9 | 74.1 |
| Power generation cycle efficiency | [%] | | 7.70 | 7.72 | 7.73 | 7.76 | 7.80 | 7.81 |
| SP | [m] | | 0.039 | 0.040 | 0.042 | 0.043 | 0.045 | 0.045 |
| Temperature gradient (evaporator) | [K] | | 5.8 | 6.2 | 6.0 | 5.1 | 3.1 | 2.6 |
| Temperature gradient (condenser) | [K] | | 7.3 | 7.7 | 7.4 | 6.2 | 3.9 | 3.2 |

| Working fluid | | 1st component | 95 | 97 | 98 | 99 | 99.9 |
|---|---|---|---|---|---|---|---|
| | | 2nd component | 5 | 3 | 2 | 1 | 0.1 |
| GWP | [—] | | 3.2 | 3.1 | 3.1 | 3.0 | 3.0 |
| Evaporator pressure | [kPa] | | 891 | 878 | 871 | 865 | 859 |
| Condenser pressure | [kPa] | | 301 | 296 | 294 | 292 | 290 |
| Pressure ratio | [—] | | 3.0 | 3.0 | 3.0 | 3.0 | 3.0 |
| Wetness | [—] | | — | — | — | — | — |
| Mass flow rate | [kg/s] | | 4.5 | 4.5 | 4.5 | 4.5 | 4.5 |
| Volumetric flow rate at expansion device entrance | [m$^3$/s] | | 0.103 | 0.105 | 0.106 | 0.107 | 0.108 |
| Volumetric flow rate at expansion device exit | [m$^3$/s] | | 0.318 | 0.323 | 0.326 | 0.329 | 0.331 |
| Pump power | [kW] | | 3.0 | 3.0 | 3.0 | 2.9 | 2.9 |
| Work of expansion device | [kW] | | 81.4 | 81.5 | 81.6 | 81.7 | 81.8 |
| Power generator output | [kW] | | 77.3 | 77.5 | 77.5 | 77.6 | 77.7 |
| Net work | [kW] | | 74.3 | 74.5 | 74.6 | 74.7 | 74.8 |
| Power generation cycle efficiency | [%] | | 7.84 | 7.85 | 7.87 | 7.88 | 7.89 |
| SP | [m] | | 0.046 | 0.046 | 0.046 | 0.046 | 0.046 |
| Temperature gradient (evaporator) | [K] | | 1.7 | 1.1 | 0.7 | 0.4 | 0.0 |
| Temperature gradient (condenser) | [K] | | 2.2 | 1.4 | 0.9 | 0.5 | 0.0 |

Table 17 shows the relative values of the volumetric flow rate at the expansion device entrance, the volumetric flow rate at the expansion device exit, the power generation cycle efficiency, and the SP in example 7 shown in Table 16 where the corresponding values of 1,1,1,3,3-pentafluoropropane are 1.

TABLE 17

<Example 7: mixture working fluid composition of cis-1,3,3,3-tetrafluoropropene and trans-1,3,3,3-tetrafluoropropene; relative values of calculation conditions 1>

| Working fluid | 1st component | 50 | 60 | 70 | 80 | 90 | 92 |
|---|---|---|---|---|---|---|---|
|  | 2nd component | 50 | 40 | 30 | 20 | 10 | 8 |
| Volumetric flow rate at expansion device entrance | [—] | 0.66 | 0.72 | 0.78 | 0.84 | 0.91 | 0.93 |
| Volumetric flow rate at expansion device exit | [—] | 0.62 | 0.68 | 0.73 | 0.79 | 0.86 | 0.87 |
| Power generation cycle efficiency | [—] | 0.99 | 0.99 | 0.99 | 1.00 | 1.00 | 1.00 |
| SP | [—] | 0.79 | 0.82 | 0.85 | 0.88 | 0.91 | 0.92 |

| Working fluid | 1st component | 95 | 97 | 98 | 99 | 99.9 |
|---|---|---|---|---|---|---|
|  | 2nd component | 5 | 3 | 2 | 1 | 0.1 |
| Volumetric flow rate at expansion device entrance | [—] | 0.95 | 0.96 | 0.97 | 0.98 | 0.99 |
| Volumetric flow rate at expansion device exit | [—] | 0.89 | 0.91 | 0.91 | 0.92 | 0.93 |
| Power generation cycle efficiency | [—] | 1.01 | 1.01 | 1.01 | 1.01 | 1.01 |
| SP | [—] | 0.93 | 0.93 | 0.94 | 0.94 | 0.95 |

Here, the relative value of the cycle efficiency is preferable larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 18

<Example 8: mixture working fluid composition of cis-1,3,3,3-tetrafluoropropene and trans-1,3,3,3-tetrafluoropropene; calculation conditions 2>

| Working fluid | 1st component | 50 | 60 | 70 | 80 | 90 | 92 |
|---|---|---|---|---|---|---|---|
|  | 2nd component | 50 | 40 | 30 | 20 | 10 | 8 |
| GWP | [—] | 4.5 | 4.2 | 3.9 | 3.6 | 3.3 | 3.2 |
| Evaporator pressure | [kPa] | 2021 | 1855 | 1705 | 1572 | 1454 | 1432 |
| Condenser pressure | [kPa] | 450 | 408 | 371 | 340 | 313 | 308 |
| Pressure ratio | [—] | 4.5 | 4.6 | 4.6 | 4.6 | 4.6 | 4.6 |
| Wetness | [—] | — | — | — | — | — | — |
| Mass flow rate | [kg/s] | 4.7 | 4.6 | 4.5 | 4.4 | 4.4 | 4.4 |
| Volumetric flow rate at expansion device entrance | [m$^3$/s] | 0.041 | 0.045 | 0.049 | 0.053 | 0.058 | 0.059 |
| Volumetric flow rate at expansion device exit | [m$^3$/s] | 0.216 | 0.234 | 0.254 | 0.274 | 0.297 | 0.302 |
| Pump power | [kW] | 8.5 | 7.5 | 6.7 | 6.1 | 5.6 | 5.5 |
| Work of expansion device | [kW] | 109.6 | 109.4 | 109.2 | 109.1 | 109.4 | 109.5 |
| Power generator output | [kW] | 104.1 | 103.9 | 103.7 | 103.7 | 103.9 | 104.1 |
| Net work | [kW] | 95.7 | 96.4 | 97.0 | 97.6 | 98.3 | 98.5 |
| Power generation cycle efficiency | [%] | 10.1 | 10.2 | 10.2 | 10.3 | 10.4 | 10.4 |
| SP | [m] | 0.035 | 0.036 | 0.038 | 0.039 | 0.040 | 0.041 |
| Temperature gradient (evaporator) | [K] | 4.7 | 5.2 | 5.1 | 4.3 | 2.7 | 2.2 |
| Temperature gradient (condenser) | [K] | 7.3 | 7.7 | 7.4 | 6.2 | 3.9 | 3.2 |

| Working fluid | 1st component | 95 | 97 | 98 | 99 | 99.9 |
|---|---|---|---|---|---|---|
|  | 2nd component | 5 | 3 | 2 | 1 | 0.1 |
| GWP | [—] | 3.2 | 3.1 | 3.1 | 3.0 | 3.0 |
| Evaporator pressure | [kPa] | 1400 | 1379 | 1369 | 1359 | 1350 |

TABLE 18-continued

<Example 8: mixture working fluid composition of cis-1,3,3,3-tetrafluoropropene
and trans-1,3,3,3-tetrafluoropropene; calculation conditions 2>

| | | | | | | |
|---|---|---|---|---|---|---|
| Condenser pressure | [kPa] | 301 | 296 | 294 | 292 | 290 |
| Pressure ratio | [—] | 4.7 | 4.7 | 4.7 | 4.7 | 4.7 |
| Wetness | [—] | — | — | — | — | — |
| Mass flow rate | [kg/s] | 4.4 | 4.4 | 4.4 | 4.4 | 4.4 |
| Volumetric flow rate at expansion device entrance | [m³/s] | 0.060 | 0.061 | 0.062 | 0.062 | 0.063 |
| Volumetric flow rate at expansion device exit | [m³/s] | 0.309 | 0.314 | 0.317 | 0.319 | 0.322 |
| Pump power | [kW] | 5.4 | 5.3 | 5.3 | 5.3 | 5.2 |
| Work of expansion device | [kW] | 109.8 | 110.0 | 110.1 | 110.2 | 110.3 |
| Power generator output | [kW] | 104.3 | 104.5 | 104.6 | 104.7 | 104.8 |
| Net work | [kW] | 98.9 | 99.2 | 99.3 | 99.4 | 99.6 |
| Power generation cycle efficiency | [%] | 10.4 | 10.5 | 10.5 | 10.5 | 10.5 |
| SP | [m] | 0.041 | 0.041 | 0.042 | 0.042 | 0.042 |
| Temperature gradient (evaporator) | [K] | 1.5 | 0.9 | 0.6 | 0.3 | 0.0 |
| Temperature gradient (condenser) | [K] | 2.2 | 1.4 | 0.9 | 0.5 | 0.0 |

Table 19 shows the relative values of the volumetric flow rate at the expansion device entrance, the volumetric flow rate at the expansion device exit, the power generation cycle efficiency, and the SP in example 8 shown in Table 18 where the corresponding values of 1,1,1,3,3-pentafluoropropane are 1.

TABLE 19

<Example 8: mixture working fluid composition of cis-1,3,3,3-tetrafluoropropene
and trans-1,3,3,3-tetrafluoropropene; relative values of calculation conditions 2>

| Working fluid | 1st component<br>2nd component | 50<br>50 | 60<br>40 | 70<br>30 | 80<br>20 | 90<br>10 | 92<br>8 |
|---|---|---|---|---|---|---|---|
| Volumetric flow rate at expansion device entrance | [—] | 0.66 | 0.72 | 0.78 | 0.85 | 0.93 | 0.94 |
| Volumetric flow rate at expansion device exit | [—] | 0.63 | 0.68 | 0.74 | 0.79 | 0.86 | 0.87 |
| Power generation cycle efficiency | [—] | 0.98 | 0.99 | 0.99 | 1.00 | 1.00 | 1.01 |
| SP | [—] | 0.79 | 0.82 | 0.85 | 0.88 | 0.91 | 0.92 |

| Working fluid | 1st component<br>2nd component | 95<br>5 | 97<br>3 | 98<br>2 | 99<br>1 | 99.9<br>0.1 |
|---|---|---|---|---|---|---|
| Volumetric flow rate at expansion device entrance | [—] | 0.97 | 0.98 | 0.99 | 1.00 | 1.01 |
| Volumetric flow rate at expansion device exit | [—] | 0.89 | 0.91 | 0.92 | 0.92 | 0.93 |
| Power generation cycle efficiency | [—] | 1.01 | 1.01 | 1.01 | 1.02 | 1.02 |
| SP | [—] | 0.93 | 0.94 | 0.94 | 0.95 | 0.95 |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 20

<Example 9: mixture working fluid composition of cis-1,3,3,3-tetrafluoropropene and trans-1,3,3,3-tetrafluoropropene; calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | | [—] | 4.5 | 4.2 | 3.9 | 3.6 | 3.3 | 3.2 |
| Evaporator pressure | | [kPa] | 3043 | 2795 | 2570 | 2368 | 2188 | 2154 |
| Condenser pressure | | [kPa] | 450 | 408 | 371 | 340 | 313 | 308 |
| Pressure ratio | | [—] | 6.8 | 6.9 | 6.9 | 7.0 | 7.0 | 7.0 |
| Wetness | | [—] | — | — | — | — | — | — |
| Mass flow rate | | [kg/s] | 4.8 | 4.6 | 4.4 | 4.3 | 4.3 | 4.3 |
| Volumetric flow rate at expansion device entrance | | [m$^3$/s] | 0.022 | 0.025 | 0.028 | 0.031 | 0.034 | 0.034 |
| Volumetric flow rate at expansion device exit | | [m$^3$/s] | 0.213 | 0.230 | 0.249 | 0.269 | 0.291 | 0.295 |
| Pump power | | [kW] | 14.1 | 12.4 | 11.0 | 9.9 | 9.0 | 8.9 |
| Work of expansion device | | [kW] | 130.4 | 130.8 | 130.9 | 131.1 | 131.6 | 131.8 |
| Power generator output | | [kW] | 123.9 | 124.2 | 124.4 | 124.6 | 125.0 | 125.2 |
| Net work | | [kW] | 109.7 | 111.8 | 113.4 | 114.7 | 116.0 | 116.3 |
| Power generation cycle efficiency | | [%] | 11.6 | 11.8 | 12.0 | 12.1 | 12.3 | 12.3 |
| SP | | [m] | 0.033 | 0.034 | 0.035 | 0.036 | 0.038 | 0.038 |
| Temperature gradient (evaporator) | | [K] | 3.0 | 3.6 | 3.8 | 3.3 | 2.1 | 1.8 |
| Temperature gradient (condenser) | | [K] | 7.3 | 7.7 | 7.4 | 6.2 | 3.9 | 3.2 |

| Working fluid | 1st component<br>2nd component | | 95<br>5 | 97<br>3 | 98<br>2 | 99<br>1 | 99.9<br>0.1 |
|---|---|---|---|---|---|---|---|
| GWP | | [—] | 3.2 | 3.1 | 3.1 | 3.0 | 3.0 |
| Evaporator pressure | | [kPa] | 2105 | 2073 | 2057 | 2042 | 2028 |
| Condenser pressure | | [kPa] | 301 | 296 | 294 | 292 | 290 |
| Pressure ratio | | [—] | 7.0 | 7.0 | 7.0 | 7.0 | 7.0 |
| Wetness | | [—] | — | — | — | — | — |
| Mass flow rate | | [kg/s] | 4.3 | 4.3 | 4.3 | 4.3 | 4.3 |
| Volumetric flow rate at expansion device entrance | | [m$^3$/s] | 0.035 | 0.036 | 0.036 | 0.037 | 0.037 |
| Volumetric flow rate at expansion device exit | | [m$^3$/s] | 0.302 | 0.307 | 0.310 | 0.312 | 0.315 |
| Pump power | | [kW] | 8.6 | 8.5 | 8.5 | 8.4 | 8.3 |
| Work of expansion device | | [kW] | 132.1 | 132.4 | 132.5 | 132.7 | 132.8 |
| Power generator output | | [kW] | 125.5 | 125.7 | 125.8 | 126.0 | 126.2 |
| Net work | | [kW] | 116.9 | 117.2 | 117.4 | 117.6 | 117.8 |
| Power generation cycle efficiency | | [%] | 12.3 | 12.4 | 12.4 | 12.4 | 12.4 |
| SP | | [m] | 0.038 | 0.039 | 0.039 | 0.039 | 0.039 |
| Temperature gradient (evaporator) | | [K] | 1.2 | 0.7 | 0.5 | 0.3 | 0.0 |
| Temperature gradient (condenser) | | [K] | 2.2 | 1.4 | 0.9 | 0.5 | 0.0 |

Table 21 shows the relative values of the volumetric flow rate at the expansion device entrance, the volumetric flow rate at the expansion device exit, the power generation cycle efficiency, and the SP in example 9 shown in Table 20 where the corresponding values of 1,1,1,3,3-pentafluoropropane are 1.

TABLE 21

<Example 9: mixture working fluid composition of cis-1,3,3,3-tetrafluoropropene and trans-1,3,3,3-tetrafluoropropene; relative values of calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | | [—] | 0.61 | 0.69 | 0.76 | 0.84 | 0.93 | 0.94 |
| Volumetric flow rate at expansion device exit | | [—] | 0.63 | 0.68 | 0.74 | 0.80 | 0.86 | 0.88 |
| Power generation cycle efficiency | | [—] | 0.95 | 0.97 | 0.98 | 0.99 | 1.00 | 1.00 |
| SP | | [—] | 0.81 | 0.83 | 0.86 | 0.89 | 0.92 | 0.93 |

TABLE 21-continued

<Example 9: mixture working fluid composition of cis-1,3,3,3-tetrafluoropropene and trans-1,3,3,3-tetrafluoropropene; relative values of calculation conditions 3>

| Working fluid | 1st component<br>2nd component | 95<br>5 | 97<br>3 | 98<br>2 | 99<br>1 | 99.9<br>0.1 |
|---|---|---|---|---|---|---|
| Volumetric flow rate at expansion device entrance | [—] | 0.97 | 0.99 | 1.00 | 1.01 | 1.02 |
| Volumetric flow rate at expansion device exit | [—] | 0.90 | 0.91 | 0.92 | 0.93 | 0.93 |
| Power generation cycle efficiency | [—] | 1.01 | 1.01 | 1.01 | 1.02 | 1.02 |
| SP | [—] | 0.94 | 0.94 | 0.95 | 0.95 | 0.95 |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 22

<Example 10: mixture working fluid composition of cis-1,3,3,3-tetrafluoropropene and 2,3,3,3-tetrafluoropropene; calculation conditions 1>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 3.5 | 3.4 | 3.3 | 3.2 | 3.1 | 3.1 |
| Evaporator pressure | [kPa] | | 1381 | 1239 | 1120 | 1019 | 933 | 917 |
| Condenser pressure | [kPa] | | 480 | 426 | 382 | 346 | 315 | 310 |
| Pressure ratio | [—] | | 2.9 | 2.9 | 2.9 | 2.9 | 3.0 | 3.0 |
| Wetness | [—] | | — | — | — | — | — | — |
| Mass flow rate | [kg/s] | | 4.9 | 4.7 | 4.6 | 4.5 | 4.5 | 4.5 |
| Volumetric flow rate at expansion device entrance | [m$^3$/s] | | 0.067 | 0.074 | 0.081 | 0.089 | 0.098 | 0.100 |
| Volumetric flow rate at expansion device exit | [m$^3$/s] | | 0.209 | 0.231 | 0.253 | 0.276 | 0.302 | 0.307 |
| Pump power | [kW] | | 5.1 | 4.4 | 3.9 | 3.5 | 3.1 | 3.1 |
| Work of expansion device | [kW] | | 81.7 | 81.1 | 80.6 | 80.4 | 80.7 | 80.9 |
| Power generator output | [kW] | | 77.7 | 77.1 | 76.6 | 76.4 | 76.7 | 76.8 |
| Net work | [kW] | | 72.5 | 72.7 | 72.7 | 73.0 | 73.5 | 73.7 |
| Power generation cycle efficiency | [%] | | 7.66 | 7.67 | 7.68 | 7.70 | 7.76 | 7.78 |
| SP | [m] | | 0.038 | 0.039 | 0.041 | 0.043 | 0.044 | 0.045 |
| Temperature gradient (evaporator) | [K] | | 9.1 | 9.5 | 8.9 | 7.3 | 4.4 | 3.6 |
| Temperature gradient (condenser) | [K] | | 12.2 | 12.4 | 11.5 | 9.4 | 5.8 | 4.8 |
| Working fluid | 1st component<br>2nd component | | 95<br>5 | 97<br>3 | 98<br>2 | 99<br>1 | 99.9<br>0.1 | |
| GWP | [—] | | 3.1 | 3.0 | 3.0 | 3.0 | 3.0 | |
| Evaporator pressure | [kPa] | | 894 | 880 | 873 | 866 | 859 | |
| Condenser pressure | [kPa] | | 302 | 297 | 295 | 292 | 290 | |
| Pressure ratio | [—] | | 3.0 | 3.0 | 3.0 | 3.0 | 3.0 | |
| Wetness | [—] | | — | — | — | — | — | |
| Mass flow rate | [kg/s] | | 4.5 | 4.5 | 4.5 | 4.5 | 4.5 | |
| Volumetric flow rate at expansion device entrance | [m$^3$/s] | | 0.103 | 0.105 | 0.106 | 0.107 | 0.108 | |
| Volumetric flow rate at expansion device exit | [m$^3$/s] | | 0.316 | 0.322 | 0.325 | 0.328 | 0.331 | |
| Pump power | [kW] | | 3.0 | 3.0 | 3.0 | 2.9 | 2.9 | |
| Work of expansion device | [kW] | | 81.1 | 81.4 | 81.5 | 81.7 | 81.8 | |
| Power generator output | [kW] | | 77.1 | 77.3 | 77.4 | 77.6 | 77.7 | |
| Net work | [kW] | | 74.1 | 74.3 | 74.5 | 74.6 | 74.8 | |
| Power generation cycle efficiency | [%] | | 7.81 | 7.84 | 7.85 | 7.87 | 7.89 | |
| SP | [m] | | 0.045 | 0.046 | 0.046 | 0.046 | 0.046 | |
| Temperature gradient (evaporator) | [K] | | 2.4 | 1.5 | 1.0 | 0.5 | 0.1 | |

TABLE 22-continued

<Example 10: mixture working fluid composition of cis-1,3,3,3-tetrafluoropropene
and 2,3,3,3-tetrafluoropropene; calculation conditions 1>

| | | | | | | |
|---|---|---|---|---|---|---|
| Temperature gradient (condenser) | [K] | 3.2 | 2.0 | 1.4 | 0.7 | 0.1 |

Table 23 shows the relative values of the volumetric flow rate at the expansion device entrance, the volumetric flow rate at the expansion device exit, the power generation cycle efficiency, and the SP in example 10 shown in Table 22 where the corresponding values of 1,1,1,3,3-pentafluoropropane are 1.

preferably smaller than "1". When the volumetric flow rate at the expansion device entrance and the volumetric flow rate at the expansion device exit of a mixture working fluid composition are each close to "1", such a mixture working fluid composition is usable as an alternative working fluid

TABLE 23

<Example 10: mixture working fluid composition of cis-1,3,3,3-tetrafluoropropene
and 2,3,3,3-tetrafluoropropene; relative values of calculation conditions 1>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | [—] | | 0.62 | 0.68 | 0.75 | 0.82 | 0.90 | 0.92 |
| Volumetric flow rate at expansion device exit | [—] | | 0.59 | 0.65 | 0.71 | 0.77 | 0.85 | 0.86 |
| Power generation cycle efficiency | [—] | | 0.98 | 0.99 | 0.99 | 0.99 | 1.00 | 1.00 |
| SP | [—] | | 0.77 | 0.80 | 0.83 | 0.87 | 0.90 | 0.91 |
| Working fluid | 1st component<br>2nd component | | 95<br>5 | 97<br>3 | 98<br>2 | 99<br>1 | 99.9<br>0.1 | |
| Volumetric flow rate at expansion device entrance | [—] | | 0.94 | 0.96 | 0.97 | 0.98 | 0.99 | |
| Volumetric flow rate at expansion device exit | [—] | | 0.89 | 0.90 | 0.91 | 0.92 | 0.93 | |
| Power generation cycle efficiency | [—] | | 1.00 | 1.01 | 1.01 | 1.01 | 1.01 | |
| SP | [—] | | 0.92 | 0.93 | 0.94 | 0.94 | 0.95 | |

Here, the relative value of the cycle efficiency is preferable larger than "1", and the relative value of the SP is composition for an existing organic rankine cycle device using 1,1,1,3,3-pentafluoropropane.

TABLE 24

<Example 11: mixture working fluid composition of cis-1,3,3,3-tetrafluoropropene
and 2,3,3,3-tetrafluoropropene; calculation conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 3.5 | 3.4 | 3.3 | 3.2 | 3.1 | 3.1 |
| Evaporator pressure | [kPa] | | 2156 | 1941 | 1757 | 1600 | 1466 | 1441 |
| Condenser pressure | [kPa] | | 480 | 426 | 382 | 346 | 315 | 310 |
| Pressure ratio | [—] | | 4.5 | 4.6 | 4.6 | 4.6 | 4.6 | 4.6 |
| Wetness | [—] | | — | — | — | — | — | — |
| Mass flow rate | [kg/s] | | 4.8 | 4.6 | 4.5 | 4.4 | 4.3 | 4.3 |
| Volumetric flow rate at expansion device entrance | [m³/s] | | 0.038 | 0.042 | 0.047 | 0.052 | 0.057 | 0.058 |
| Volumetric flow rate at expansion device exit | [m³/s] | | 0.204 | 0.224 | 0.246 | 0.268 | 0.293 | 0.299 |
| Pump power | [kW] | | 9.3 | 8.0 | 7.0 | 6.2 | 5.6 | 5.5 |
| Work of expansion device | [kW] | | 109.5 | 109.0 | 108.5 | 108.4 | 108.9 | 109.1 |
| Power generator output | [kW] | | 104.0 | 103.5 | 103.1 | 103.0 | 103.4 | 103.6 |
| Net work | [kW] | | 94.7 | 95.5 | 96.1 | 96.8 | 97.8 | 98.1 |
| Power generation cycle efficiency | [%] | | 10.0 | 10.1 | 10.2 | 10.2 | 10.3 | 10.4 |
| SP | [m] | | 0.034 | 0.036 | 0.037 | 0.038 | 0.040 | 0.040 |
| Temperature gradient (evaporator) | [K] | | 7.1 | 7.6 | 7.3 | 6.0 | 3.6 | 3.0 |

TABLE 24-continued

<Example 11: mixture working fluid composition of cis-1,3,3,3-tetrafluoropropene and 2,3,3,3-tetrafluoropropene; calculation conditions 2>

| | | | | | | |
|---|---|---|---|---|---|---|
| Temperature gradient (condenser) | [K] | 12.2 | 12.4 | 11.5 | 9.4 | 5.8 | 4.8 |

| Working fluid | 1st component | 95 | 97 | 98 | 99 | 99.9 |
|---|---|---|---|---|---|---|
| | 2nd component | 5 | 3 | 2 | 1 | 0.1 |

| | | | | | | |
|---|---|---|---|---|---|---|
| GWP | [—] | 3.1 | 3.0 | 3.0 | 3.0 | 3.0 |
| Evaporator pressure | [kPa] | 1405 | 1382 | 1371 | 1360 | 1350 |
| Condenser pressure | [kPa] | 302 | 297 | 295 | 292 | 290 |
| Pressure ratio | [—] | 4.7 | 4.7 | 4.7 | 4.7 | 4.7 |
| Wetness | [—] | — | — | — | — | — |
| Mass flow rate | [kg/s] | 4.3 | 4.4 | 4.4 | 4.4 | 4.4 |
| Volumetric flow rate at expansion device entrance | [m$^3$/s] | 0.060 | 0.061 | 0.062 | 0.062 | 0.063 |
| Volumetric flow rate at expansion device exit | [m$^3$/s] | 0.307 | 0.313 | 0.316 | 0.319 | 0.322 |
| Pump power | [kW] | 5.4 | 5.3 | 5.3 | 5.3 | 5.2 |
| Work of expansion device | [kW] | 109.5 | 109.8 | 109.9 | 110.1 | 110.3 |
| Power generator output | [kW] | 104.0 | 104.3 | 104.4 | 104.6 | 104.8 |
| Net work | [kW] | 98.6 | 99.0 | 99.2 | 99.4 | 99.6 |
| Power generation cycle efficiency | [%] | 10.4 | 10.4 | 10.5 | 10.5 | 10.5 |
| SP | [m] | 0.041 | 0.041 | 0.042 | 0.042 | 0.042 |
| Temperature gradient (evaporator) | [K] | 2.0 | 1.2 | 0.8 | 0.4 | 0.0 |
| Temperature gradient (condenser) | [K] | 3.2 | 2.0 | 1.4 | 0.7 | 0.1 |

Table 25 shows the relative values of the volumetric flow rate at the expansion device entrance, the volumetric flow rate at the expansion device exit, the power generation cycle efficiency, and the SP in example 11 shown in Table 24 where the corresponding values of 1,1,1,3,3-pentafluoropropane are 1.

TABLE 25

<Example 11: mixture working fluid composition of cis-1,3,3,3-tetrafluoropropene and 2,3,3,3-tetrafluoropropene; relative values of calculation conditions 2>

| Working fluid | 1st component | 50 | 60 | 70 | 80 | 90 | 92 |
|---|---|---|---|---|---|---|---|
| | 2nd component | 50 | 40 | 30 | 20 | 10 | 8 |

| | | | | | | | |
|---|---|---|---|---|---|---|---|
| Volumetric flow rate at expansion device entrance | [—] | 0.61 | 0.68 | 0.75 | 0.83 | 0.91 | 0.93 |
| Volumetric flow rate at expansion device exit | [—] | 0.59 | 0.65 | 0.71 | 0.78 | 0.85 | 0.87 |
| Power generation cycle efficiency | [—] | 0.97 | 0.98 | 0.98 | 0.99 | 1.00 | 1.00 |
| SP | [—] | 0.78 | 0.81 | 0.84 | 0.87 | 0.91 | 0.92 |

| Working fluid | 1st component | 95 | 97 | 98 | 99 | 99.9 |
|---|---|---|---|---|---|---|
| | 2nd component | 5 | 3 | 2 | 1 | 0.1 |

| | | | | | | |
|---|---|---|---|---|---|---|
| Volumetric flow rate at expansion device entrance | [—] | 0.96 | 0.98 | 0.99 | 1.00 | 1.01 |
| Volumetric flow rate at expansion device exit | [—] | 0.89 | 0.91 | 0.91 | 0.92 | 0.93 |
| Power generation cycle efficiency | [—] | 1.01 | 1.01 | 1.01 | 1.01 | 1.02 |
| SP | [—] | 0.93 | 0.94 | 0.94 | 0.94 | 0.95 |

Here, the relative value of the cycle efficiency is preferable larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 26

<Example 12: mixture working fluid composition of cis-1,3,3,3-tetrafluoropropene and 2,3,3,3-tetrafluoropropene; calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | | [—] | 3.5 | 3.4 | 3.3 | 3.2 | 3.1 | 3.1 |
| Evaporator pressure | | [kPa] | 3277 | 2938 | 2654 | 2413 | 2206 | 2168 |
| Condenser pressure | | [kPa] | 480 | 426 | 382 | 346 | 315 | 310 |
| Pressure ratio | | [—] | 6.8 | 6.9 | 6.9 | 7.0 | 7.0 | 7.0 |
| Wetness | | [—] | 0.02 | — | — | — | — | — |
| Mass flow rate | | [kg/s] | 4.9 | 4.6 | 4.4 | 4.3 | 4.3 | 4.2 |
| Volumetric flow rate at expansion device entrance | | [m³/s] | 0.019 | 0.023 | 0.026 | 0.030 | 0.033 | 0.034 |
| Volumetric flow rate at expansion device exit | | [m³/s] | 0.202 | 0.221 | 0.241 | 0.263 | 0.287 | 0.292 |
| Pump power | | [kW] | 16.0 | 13.3 | 11.4 | 10.1 | 9.0 | 8.9 |
| Work of expansion device | | [kW] | 129.5 | 129.9 | 130.0 | 130.2 | 131.0 | 131.2 |
| Power generator output | | [kW] | 123.0 | 123.4 | 123.5 | 123.7 | 124.4 | 124.7 |
| Net work | | [kW] | 107.0 | 110.1 | 112.0 | 113.6 | 115.4 | 115.8 |
| Power generation cycle efficiency | | [%] | 11.3 | 11.7 | 11.9 | 12.0 | 12.2 | 12.2 |
| SP | | [m] | 0.033 | 0.034 | 0.035 | 0.036 | 0.038 | 0.038 |
| Temperature gradient (evaporator) | | [K] | 3.8 | 4.9 | 5.2 | 4.5 | 2.8 | 2.3 |
| Temperature gradient (condenser) | | [K] | 12.2 | 12.4 | 11.5 | 9.4 | 5.8 | 4.8 |

| Working fluid | 1st component<br>2nd component | | 95<br>5 | 97<br>3 | 98<br>2 | 99<br>1 | 99.9<br>0.1 |
|---|---|---|---|---|---|---|---|
| GWP | | [—] | 3.1 | 3.0 | 3.0 | 3.0 | 3.0 |
| Evaporator pressure | | [kPa] | 2113 | 2078 | 2060 | 2043 | 2028 |
| Condenser pressure | | [kPa] | 302 | 297 | 295 | 292 | 290 |
| Pressure ratio | | [—] | 7.0 | 7.0 | 7.0 | 7.0 | 7.0 |
| Wetness | | [—] | — | — | — | — | — |
| Mass flow rate | | [kg/s] | 4.2 | 4.2 | 4.2 | 4.2 | 4.3 |
| Volumetric flow rate at expansion device entrance | | [m³/s] | 0.035 | 0.036 | 0.036 | 0.037 | 0.037 |
| Volumetric flow rate at expansion device exit | | [m³/s] | 0.300 | 0.306 | 0.309 | 0.312 | 0.315 |
| Pump power | | [kW] | 8.7 | 8.5 | 8.5 | 8.4 | 8.3 |
| Work of expansion device | | [kW] | 131.7 | 132.1 | 132.3 | 132.6 | 132.8 |
| Power generator output | | [kW] | 125.1 | 125.5 | 125.7 | 125.9 | 126.2 |
| Net work | | [kW] | 116.5 | 117.0 | 117.3 | 117.5 | 117.8 |
| Power generation cycle efficiency | | [%] | 12.3 | 12.4 | 12.4 | 12.4 | 12.4 |
| SP | | [m] | 0.038 | 0.039 | 0.039 | 0.039 | 0.039 |
| Temperature gradient (evaporator) | | [K] | 1.5 | 1.0 | 0.6 | 0.3 | 0.0 |
| Temperature gradient (condenser) | | [K] | 3.2 | 2.0 | 1.4 | 0.7 | 0.1 |

Table 27 shows the relative values of the volumetric flow rate at the expansion device entrance, the volumetric flow rate at the expansion device exit, the power generation cycle efficiency, and the SP in example 12 shown in Table 26 where the corresponding values of 1,1,1,3,3-pentafluoropropane are 1.

TABLE 27

<Example 12: mixture working fluid composition of cis-1,3,3,3-tetrafluoropropene and 2,3,3,3-tetrafluoropropene; relative values of calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | | [—] | 0.53 | 0.63 | 0.72 | 0.81 | 0.91 | 0.93 |
| Volumetric flow rate at expansion device exit | | [—] | 0.60 | 0.66 | 0.72 | 0.78 | 0.85 | 0.87 |
| Power generation cycle efficiency | | [—] | 0.93 | 0.95 | 0.97 | 0.98 | 1.00 | 1.00 |
| SP | | [—] | 0.80 | 0.82 | 0.85 | 0.88 | 0.91 | 0.92 |

TABLE 27-continued

<Example 12: mixture working fluid composition of cis-1,3,3,3-tetrafluoropropene and 2,3,3,3-tetrafluoropropene; relative values of calculation conditions 3>

| Working fluid | 1st component<br>2nd component | | 95<br>5 | 97<br>3 | 98<br>2 | 99<br>1 | 99.9<br>0.1 |
|---|---|---|---|---|---|---|---|
| Volumetric flow rate at expansion device entrance | [—] | | 0.96 | 0.99 | 1.00 | 1.01 | 1.02 |
| Volumetric flow rate at expansion device exit | [—] | | 0.89 | 0.91 | 0.92 | 0.93 | 0.93 |
| Power generation cycle efficiency | [—] | | 1.01 | 1.01 | 1.01 | 1.01 | 1.02 |
| SP | [—] | | 0.93 | 0.94 | 0.95 | 0.95 | 0.95 |

Here, the relative value of the cycle efficiency is preferable larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 28

<Comparative examples 1 through 3: 1,1,1,3,3-pentafluoropropane; calculation conditions 1 through 3>

| | | Comparative example 1 | Comparative example 2 | Comparative example 3 |
|---|---|---|---|---|
| GWP | [-] | 1030 | 1030 | 1030 |
| Evaporator pressure | [kPa] | 789 | 1265 | 1927 |
| Condenser pressure | [kPa] | 250 | 250 | 250 |
| Pressure ratio | [-] | 3.2 | 5.0 | 7.7 |
| Wetness | [-] | — | — | — |
| Mass flow rate | [kg/s] | 4.8 | 4.5 | 4.3 |
| Volumetric flow rate at expansion device entrance | [m³/s] | 0.109 | 0.062 | 0.036 |
| Volumetric flow rate at expansion device exit | [m³/s] | 0.357 | 0.345 | 0.336 |
| Pump power | [kW] | 2.7 | 4.7 | 7.5 |
| Work of expansion device | [kW] | 80.5 | 108.1 | 129.9 |
| Power generator output | [kW] | 76.5 | 102.7 | 123.4 |
| Net work | [kW] | 73.8 | 97.9 | 115.9 |
| Power generation cycle efficiency | [%] | 7.78 | 10.3 | 12.2 |
| SP | [m] | 0.049 | 0.044 | 0.041 |

TABLE 29

<Comparative examples 4 through 6: cis-1-chloro-3,3,3-trifluoropropene; calculation conditions 1 through 3>

| | | Comparative example 4 | Comparative example 5 | Comparative example 6 |
|---|---|---|---|---|
| GWP | [-] | 4.0 | 4.0 | 4.0 |
| Evaporator pressure | [kPa] | 344 | 563 | 876 |
| Condenser pressure | [kPa] | 104 | 104 | 104 |
| Pressure ratio | [-] | 3.3 | 5.4 | 8.4 |
| Wetness | [-] | — | — | — |
| Mass flow rate | [kg/s] | 4.3 | 4.0 | 3.8 |
| Volumetric flow rate at expansion device entrance | [m³/s] | 0.255 | 0.148 | 0.090 |
| Volumetric flow rate at expansion device exit | [m³/s] | 0.826 | 0.798 | 0.774 |
| Pump power | [kW] | 1.1 | 1.9 | 3.1 |
| Work of expansion device | [kW] | 82.6 | 112.3 | 136.7 |
| Power generator output | [kW] | 78.5 | 106.7 | 129.8 |
| Net work | [kW] | 77.4 | 104.8 | 126.8 |
| Power generation cycle efficiency | [%] | 8.15 | 11.0 | 13.4 |
| SP | [m] | 0.072 | 0.064 | 0.059 |

TABLE 30

<Comparative example 7: mixture working fluid composition of cis-1-chloro-3,3,3-trifluoropropene and 1,1,1,3,3-pentafluoropropane; calculation conditions 1>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 517.0 | 414.4 | 311.8 | 209.2 | 106.6 | 85.2 |
| Evaporator pressure | [kPa] | | 526 | 479 | 437 | 401 | 370 | 365 |
| Condenser pressure | [kPa] | | 161 | 146 | 133 | 121 | 112 | 110 |
| Pressure ratio | [—] | | 3.3 | 3.3 | 3.3 | 3.3 | 3.3 | 3.3 |
| Wetness | [—] | | — | — | — | — | — | — |
| Mass flow rate | [kg/s] | | 4.4 | 4.3 | 4.3 | 4.3 | 4.2 | 4.2 |
| Volumetric flow rate at expansion device entrance | [m³/s] | | 0.162 | 0.178 | 0.195 | 0.213 | 0.233 | 0.237 |
| Volumetric flow rate at expansion device exit | [m³/s] | | 0.532 | 0.583 | 0.637 | 0.694 | 0.756 | 0.769 |

TABLE 30-continued

<Comparative example 7: mixture working fluid composition of
cis-1-chloro-3,3,3-trifluoropropene and 1,1,1,3,3-pentafluoropropane;
calculation conditions 1>

| | | | | | | | |
|---|---|---|---|---|---|---|---|
| Pump power | [kW] | 1.7 | 1.5 | 1.3 | 1.2 | 1.1 | 1.1 |
| Work of expansion device | [kW] | 80.8 | 80.7 | 80.7 | 80.9 | 81.4 | 81.6 |
| Power generator output | [kW] | 76.8 | 76.7 | 76.7 | 76.8 | 77.3 | 77.5 |
| Net work | [kW] | 75.1 | 75.2 | 75.3 | 75.6 | 76.2 | 76.4 |
| Power generation cycle efficiency | [%] | 7.92 | 7.92 | 7.94 | 7.97 | 8.03 | 8.05 |
| SP | [m] | 0.059 | 0.061 | 0.064 | 0.066 | 0.069 | 0.070 |
| Temperature gradient (evaporator) | [K] | 6.4 | 7.3 | 7.4 | 6.6 | 4.3 | 3.6 |
| Temperature gradient (condenser) | [K] | 6.2 | 7.0 | 7.1 | 6.3 | 4.2 | 3.5 |

| | | | | | | |
|---|---|---|---|---|---|---|
| Working fluid | 1st component | 95 | 97 | 98 | 99 | 99.9 |
| | 2nd component | 5 | 3 | 2 | 1 | 0.1 |
| GWP | [—] | 54.4 | 33.8 | 23.5 | 13.3 | 4.0 |
| Evaporator pressure | [kPa] | 357 | 351 | 349 | 346 | 344 |
| Condenser pressure | [kPa] | 108 | 106 | 105 | 104 | 104 |
| Pressure ratio | [—] | 3.3 | 3.3 | 3.3 | 3.3 | 3.3 |
| Wetness | [—] | — | — | — | — | — |
| Mass flow rate | [kg/s] | 4.3 | 4.3 | 4.3 | 4.3 | 4.3 |
| Volumetric flow rate at expansion device entrance | [m$^3$/s] | 0.243 | 0.248 | 0.250 | 0.253 | 0.255 |
| Volumetric flow rate at expansion device exit | [m$^3$/s] | 0.790 | 0.804 | 0.811 | 0.818 | 0.825 |
| Pump power | [kW] | 1.1 | 1.1 | 1.1 | 1.1 | 1.1 |
| Work of expansion device | [kW] | 81.9 | 82.1 | 82.3 | 82.4 | 82.6 |
| Power generator output | [kW] | 77.8 | 78.0 | 78.2 | 78.3 | 78.4 |
| Net work | [kW] | 76.7 | 76.9 | 77.1 | 77.2 | 77.4 |
| Power generation cycle efficiency | [%] | 8.08 | 8.11 | 8.12 | 8.14 | 8.15 |
| SP | [m] | 0.071 | 0.071 | 0.072 | 0.072 | 0.072 |
| Temperature gradient (evaporator) | [K] | 2.5 | 1.6 | 1.1 | 0.5 | 0.1 |
| Temperature gradient (condenser) | [K] | 2.4 | 1.5 | 1.1 | 0.5 | 0.1 |

Table 31 shows the relative values of the volumetric flow rate at the expansion device entrance, the volumetric flow rate at the expansion device exit, the power generation cycle efficiency, and the SP in comparative example 7 shown in Table 30 where the corresponding values of 1,1,1,3,3-pentafluoropropane are 1.

TABLE 31

<Comparative example 7: mixture working fluid composition of cis-1-chloro-3,3,3-trifluoropropene
and 1,1,1,3,3-pentafluoropropane; relative values of calculation conditions 1>

| | | | | | | | |
|---|---|---|---|---|---|---|---|
| Working fluid | 1st component | 50 | 60 | 70 | 80 | 90 | 92 |
| | 2nd component | 50 | 40 | 30 | 20 | 10 | 8 |
| Volumetric flow rate at expansion device entrance | [—] | 1.49 | 1.64 | 1.79 | 1.96 | 2.14 | 2.18 |
| Volumetric flow rate at expansion device exit | [—] | 1.49 | 1.63 | 1.79 | 1.95 | 2.12 | 2.16 |
| Power generation cycle efficiency | [—] | 1.02 | 1.02 | 1.02 | 1.02 | 1.03 | 1.03 |
| SP | [—] | 1.19 | 1.25 | 1.30 | 1.35 | 1.41 | 1.42 |

| | | | | | | |
|---|---|---|---|---|---|---|
| Working fluid | 1st component | 95 | 97 | 98 | 99 | 99.9 |
| | 2nd component | 5 | 3 | 2 | 1 | 0.1 |
| Volumetric flow rate at expansion device entrance | [—] | 2.24 | 2.28 | 2.30 | 2.32 | 2.34 |
| Volumetric flow rate at expansion device exit | [—] | 2.21 | 2.25 | 2.27 | 2.29 | 2.31 |
| Power generation cycle efficiency | [—] | 1.04 | 1.04 | 1.04 | 1.05 | 1.05 |
| SP | [—] | 1.44 | 1.45 | 1.45 | 1.46 | 1.47 |

Here, the relative value of the cycle efficiency is preferable larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 32

<Comparative example 8: mixture working fluid composition of cis-1-chloro-3,3,3-trifluoropropene and 1,1,1,3,3-pentafluoropropane; calculation conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | | [—] | 517.0 | 414.4 | 311.8 | 209.2 | 106.6 | 85.2 |
| Evaporator pressure | | [kPa] | 859 | 783 | 716 | 658 | 607 | 598 |
| Condenser pressure | | [kPa] | 161 | 146 | 133 | 121 | 112 | 110 |
| Pressure ratio | | [—] | 5.3 | 5.4 | 5.4 | 5.4 | 5.4 | 5.4 |
| Wetness | | [—] | — | — | — | — | — | — |
| Mass flow rate | | [kg/s] | 4.2 | 4.1 | 4.1 | 4.0 | 4.0 | 4.0 |
| Volumetric flow rate at expansion device entrance | | [m$^3$/s] | 0.093 | 0.103 | 0.113 | 0.124 | 0.135 | 0.138 |
| Volumetric flow rate at expansion device exit | | [m$^3$/s] | 0.514 | 0.564 | 0.616 | 0.671 | 0.731 | 0.743 |
| Pump power | | [kW] | 3.0 | 2.7 | 2.4 | 2.2 | 2.0 | 2.0 |
| Work of expansion device | | [kW] | 109.5 | 109.6 | 109.7 | 110.0 | 110.8 | 111.0 |
| Power generator output | | [kW] | 104.0 | 104.1 | 104.2 | 104.5 | 105.2 | 105.4 |
| Net work | | [kW] | 101.0 | 101.4 | 101.8 | 102.3 | 103.2 | 103.4 |
| Power generation cycle efficiency | | [%] | 10.65 | 10.69 | 10.72 | 10.78 | 10.87 | 10.90 |
| SP | | [m] | 0.053 | 0.055 | 0.057 | 0.059 | 0.062 | 0.062 |
| Temperature gradient (evaporator) | | [K] | 6.3 | 7.2 | 7.3 | 6.5 | 4.2 | 3.6 |
| Temperature gradient (condenser) | | [K] | 6.2 | 7.0 | 7.1 | 6.3 | 4.2 | 3.5 |

| Working fluid | 1st component<br>2nd component | | 95<br>5 | 97<br>3 | 98<br>2 | 99<br>1 | 99.9<br>0.1 |
|---|---|---|---|---|---|---|---|
| GWP | | [—] | 54.4 | 33.8 | 23.5 | 13.3 | 4.0 |
| Evaporator pressure | | [kPa] | 585 | 576 | 572 | 567 | 564 |
| Condenser pressure | | [kPa] | 108 | 106 | 105 | 104 | 104 |
| Pressure ratio | | [—] | 5.4 | 5.4 | 5.4 | 5.4 | 5.4 |
| Wetness | | [—] | — | — | — | — | — |
| Mass flow rate | | [kg/s] | 4.0 | 4.0 | 4.0 | 4.0 | 4.0 |
| Volumetric flow rate at expansion device entrance | | [m$^3$/s] | 0.142 | 0.144 | 0.146 | 0.147 | 0.148 |
| Volumetric flow rate at expansion device exit | | [m$^3$/s] | 0.763 | 0.776 | 0.783 | 0.790 | 0.797 |
| Pump power | | [kW] | 2.0 | 1.9 | 1.9 | 1.9 | 1.9 |
| Work of expansion device | | [kW] | 111.4 | 111.7 | 111.9 | 112.1 | 112.3 |
| Power generator output | | [kW] | 105.8 | 106.2 | 106.3 | 106.5 | 106.7 |
| Net work | | [kW] | 103.9 | 104.2 | 104.4 | 104.6 | 104.8 |
| Power generation cycle efficiency | | [%] | 10.94 | 10.98 | 11.00 | 11.02 | 11.04 |
| SP | | [m] | 0.063 | 0.064 | 0.064 | 0.064 | 0.064 |
| Temperature gradient (evaporator) | | [K] | 2.4 | 1.5 | 1.0 | 0.5 | 0.1 |
| Temperature gradient (condenser) | | [K] | 2.4 | 1.5 | 1.1 | 0.5 | 0.1 |

Table 33 shows the relative values of the volumetric flow rate at the expansion device entrance, the volumetric flow rate at the expansion device exit, the power generation cycle efficiency, and the SP in comparative example 8 shown in Table 32 where the corresponding values of 1,1,1,3,3-pentafluoropropane are 1.

TABLE 33

<Comparative example 8: mixture working fluid composition of cis-1-chloro-3,3,3-trifluoropropene and 1,1,1,3,3-pentafluoropropane; relative values of calculation conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | [—] | | 1.50 | 1.65 | 1.81 | 1.98 | 2.17 | 2.21 |
| Volumetric flow rate at expansion device exit | [—] | | 1.49 | 1.63 | 1.78 | 1.94 | 2.12 | 2.15 |
| Power generation cycle efficiency | [—] | | 1.03 | 1.03 | 1.04 | 1.04 | 1.05 | 1.05 |
| SP | [—] | | 1.19 | 1.24 | 1.29 | 1.35 | 1.40 | 1.41 |
| Working fluid | 1st component<br>2nd component | | 95<br>5 | 97<br>3 | 98<br>2 | 99<br>1 | 99.9<br>0.1 | |
| Volumetric flow rate at expansion device entrance | [—] | | 2.27 | 2.32 | 2.34 | 2.36 | 2.38 | |
| Volumetric flow rate at expansion device exit | [—] | | 2.21 | 2.25 | 2.27 | 2.29 | 2.31 | |
| Power generation cycle efficiency | [—] | | 1.06 | 1.06 | 1.06 | 1.07 | 1.07 | |
| SP | [—] | | 1.43 | 1.44 | 1.45 | 1.45 | 1.46 | |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 34

<Comparative example 9: mixture working fluid composition of cis-1-chloro-3,3,3-trifluoropropene and 1,1,1,3,3-pentafluoropropane; calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 517.0 | 414.4 | 311.8 | 209.2 | 106.6 | 85.2 |
| Evaporator pressure | [kPa] | | 1332 | 1218 | 1115 | 1024 | 945 | 930 |
| Condenser pressure | [kPa] | | 161 | 146 | 133 | 121 | 112 | 110 |
| Pressure ratio | [—] | | 8.3 | 8.4 | 8.4 | 8.4 | 8.4 | 8.4 |
| Wetness | [—] | | — | — | — | — | — | — |
| Mass flow rate | [kg/s] | | 4.0 | 3.9 | 3.9 | 3.8 | 3.8 | 3.8 |
| Volumetric flow rate at expansion device entrance | [m$^3$/s] | | 0.056 | 0.061 | 0.068 | 0.074 | 0.082 | 0.083 |
| Volumetric flow rate at expansion device exit | [m$^3$/s] | | 0.500 | 0.548 | 0.599 | 0.652 | 0.710 | 0.722 |
| Pump power | [kW] | | 4.8 | 4.3 | 3.9 | 3.5 | 3.3 | 3.2 |
| Work of expansion device | [kW] | | 132.8 | 133.0 | 133.3 | 133.8 | 134.8 | 135.0 |
| Power generator output | [kW] | | 126.1 | 126.4 | 126.6 | 127.1 | 128.0 | 128.3 |
| Net work | [kW] | | 121.4 | 122.1 | 122.8 | 123.6 | 124.8 | 125.1 |
| Power generation cycle efficiency | [%] | | 12.80 | 12.87 | 12.94 | 13.02 | 13.15 | 13.18 |
| SP | [m] | | 0.049 | 0.051 | 0.053 | 0.055 | 0.057 | 0.058 |
| Temperature gradient (evaporator) | [K] | | 5.9 | 6.8 | 7.0 | 6.2 | 4.0 | 3.4 |
| Temperature gradient (condenser) | [K] | | 6.2 | 7.0 | 7.1 | 6.3 | 4.2 | 3.5 |

TABLE 34-continued

<Comparative example 9: mixture working fluid composition of cis-1-chloro-3,3,3-trifluoropropene and 1,1,1,3,3-pentafluoropropane; calculation conditions 3>

| Working fluid | | 1st component<br>2nd component | 95<br>5 | 97<br>3 | 98<br>2 | 99<br>1 | 99.9<br>0.1 |
|---|---|---|---|---|---|---|---|
| GWP | [—] | | 54.4 | 33.8 | 23.5 | 13.3 | 4.0 |
| Evaporator pressure | [kPa] | | 909 | 896 | 889 | 882 | 877 |
| Condenser pressure | [kPa] | | 108 | 106 | 105 | 104 | 104 |
| Pressure ratio | [—] | | 8.4 | 8.4 | 8.4 | 8.4 | 8.4 |
| Wetness | [—] | | — | — | — | — | — |
| Mass flow rate | [kg/s] | | 3.8 | 3.8 | 3.8 | 3.8 | 3.8 |
| Volumetric flow rate at expansion device entrance | [m³/s] | | 0.086 | 0.087 | 0.088 | 0.089 | 0.090 |
| Volumetric flow rate at expansion device exit | [m³/s] | | 0.741 | 0.754 | 0.761 | 0.767 | 0.774 |
| Pump power | [kW] | | 3.2 | 3.1 | 3.1 | 3.1 | 3.1 |
| Work of expansion device | [kW] | | 135.6 | 136.0 | 136.2 | 136.4 | 136.6 |
| Power generator output | [kW] | | 128.8 | 129.2 | 129.4 | 129.6 | 129.8 |
| Net work | [kW] | | 125.6 | 126.0 | 126.3 | 126.5 | 126.8 |
| Power generation cycle efficiency | [%] | | 13.24 | 13.28 | 13.31 | 13.33 | 13.36 |
| SP | [m] | | 0.058 | 0.059 | 0.059 | 0.059 | 0.059 |
| Temperature gradient (evaporator) | [K] | | 2.3 | 1.4 | 1.0 | 0.5 | 0.1 |
| Temperature gradient (condenser) | [K] | | 2.4 | 1.5 | 1.1 | 0.5 | 0.1 |

Table 35 shows the relative values of the volumetric flow rate at the expansion device entrance, the volumetric flow rate at the expansion device exit, the power generation cycle efficiency, and the SP in comparative example 9 shown in Table 34 where the corresponding values of 1,1,1,3,3-pentafluoropropane are 1.

TABLE 35

<Comparative example 9: mixture working fluid composition of cis-1-chloro-3,3,3-trifluoropropene and 1,1,1,3,3-pentafluoropropane; relative values of calculation conditions 3>

| Working fluid | | 1st component<br>2nd component | 50<br>50 | 60<br>40 | 70<br>30 | 80<br>20 | 90<br>10 | 92<br>8 |
|---|---|---|---|---|---|---|---|---|
| Volumetric flow rate at expansion device entrance | [—] | | 1.53 | 1.69 | 1.86 | 2.05 | 2.25 | 2.29 |
| Volumetric flow rate at expansion device exit | [—] | | 1.49 | 1.63 | 1.78 | 1.94 | 2.11 | 2.15 |
| Power generation cycle efficiency | [—] | | 1.05 | 1.05 | 1.06 | 1.06 | 1.07 | 1.08 |
| SP | [—] | | 1.18 | 1.23 | 1.28 | 1.34 | 1.39 | 1.40 |

| Working fluid | | 1st component<br>2nd component | 95<br>5 | 97<br>3 | 98<br>2 | 99<br>1 | 99.9<br>0.1 |
|---|---|---|---|---|---|---|---|
| Volumetric flow rate at expansion device entrance | [—] | | 2.36 | 2.40 | 2.43 | 2.45 | 2.47 |
| Volumetric flow rate at expansion device exit | [—] | | 2.20 | 2.24 | 2.26 | 2.28 | 2.30 |
| Power generation cycle efficiency | [—] | | 1.08 | 1.09 | 1.09 | 1.09 | 1.09 |
| SP | [—] | | 1.42 | 1.43 | 1.44 | 1.44 | 1.45 |

Here, the relative value of the cycle efficiency is preferably larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 36

<Comparative example 10: mixture working fluid composition of
cis-1,1,1,4,4,4-hexafluoro-2-butene and pentane; calculation conditions 1>

| Working fluid | 1st component<br>2nd component | 50<br>50 | 60<br>40 | 70<br>30 | 80<br>20 | 90<br>10 | 92<br>8 |
|---|---|---|---|---|---|---|---|
| GWP | [—] | 6.0 | 6.6 | 7.2 | 7.8 | 8.4 | 8.5 |
| Evaporator pressure | [kPa] | 379 | 382 | 385 | 389 | 394 | 395 |
| Condenser pressure | [kPa] | 118 | 118 | 119 | 120 | 120 | 120 |
| Pressure ratio | [—] | 3.2 | 3.2 | 3.2 | 3.3 | 3.3 | 3.3 |
| Wetness | [—] | — | — | — | — | — | — |
| Mass flow rate | [kg/s] | 3.3 | 3.5 | 3.9 | 4.2 | 4.7 | 4.7 |
| Volumetric flow rate at expansion device entrance | [m³/s] | 0.226 | 0.223 | 0.220 | 0.216 | 0.211 | 0.210 |
| Volumetric flow rate at expansion device exit | [m³/s] | 0.733 | 0.727 | 0.720 | 0.713 | 0.705 | 0.704 |
| Pump power | [kW] | 1.4 | 1.4 | 1.4 | 1.4 | 1.4 | 1.4 |
| Work of expansion device | [kW] | 80.2 | 80.1 | 80.0 | 79.9 | 79.8 | 79.7 |
| Power generator output | [kW] | 76.2 | 76.1 | 76.0 | 75.9 | 75.8 | 75.7 |
| Net work | [kW] | 74.8 | 74.7 | 74.6 | 74.5 | 74.4 | 74.3 |
| Power generation cycle efficiency | [%] | 7.88 | 7.87 | 7.86 | 7.85 | 7.84 | 7.83 |
| SP | [m] | 0.064 | 0.065 | 0.066 | 0.068 | 0.069 | 0.069 |
| Temperature gradient (evaporator) | [K] | 0.1 | 0.1 | 0.1 | 0.0 | 0.0 | 0.0 |
| Temperature gradient (condenser) | [K] | 0.0 | 0.0 | 0.0 | 0.0 | 0.0 | 0.0 |

| Working fluid | 1st component<br>2nd component | 95<br>5 | 97<br>3 | 98<br>2 | 99<br>1 | 99.9<br>0.1 |
|---|---|---|---|---|---|---|
| GWP | [—] | 8.7 | 8.8 | 8.9 | 8.9 | 9.0 |
| Evaporator pressure | [kPa] | 396 | 397 | 398 | 398 | 398 |
| Condenser pressure | [kPa] | 120 | 120 | 120 | 120 | 120 |
| Pressure ratio | [—] | 3.3 | 3.3 | 3.3 | 3.3 | 3.3 |
| Wetness | [—] | — | — | — | — | — |
| Mass flow rate | [kg/s] | 4.9 | 5.0 | 5.1 | 5.1 | 5.2 |
| Volumetric flow rate at expansion device entrance | [m³/s] | 0.209 | 0.208 | 0.207 | 0.207 | 0.206 |
| Volumetric flow rate at expansion device exit | [m³/s] | 0.701 | 0.700 | 0.699 | 0.698 | 0.698 |
| Pump power | [kW] | 1.4 | 1.4 | 1.4 | 1.4 | 1.4 |
| Work of expansion device | [kW] | 79.7 | 79.7 | 79.7 | 79.6 | 79.6 |
| Power generator output | [kW] | 75.7 | 75.7 | 75.7 | 75.7 | 75.7 |
| Net work | [kW] | 74.3 | 74.3 | 74.3 | 74.3 | 74.2 |
| Power generation cycle efficiency | [%] | 7.83 | 7.83 | 7.82 | 7.82 | 7.82 |
| SP | [m] | 0.070 | 0.070 | 0.070 | 0.070 | 0.070 |
| Temperature gradient (evaporator) | [K] | 0.0 | 0.0 | 0.0 | 0.0 | 0.0 |
| Temperature gradient (condenser) | [K] | 0.0 | 0.0 | 0.0 | 0.0 | 0.0 |

Table 37 shows the relative values of the volumetric flow rate at the expansion device entrance, the volumetric flow rate at the expansion device exit, the power generation cycle efficiency, and the SP in comparative example 10 shown in Table 36 where the corresponding values of 1,1,1,3,3-pentafluoropropane are 1.

TABLE 37

<Comparative example 10: mixture working fluid composition of
cis-1,1,1,4,4,4-hexafluoro-2-butene and pentane; relative values of calculation
conditions 1>

| Working fluid | 1st component<br>2nd component | 50<br>50 | 60<br>40 | 70<br>30 | 80<br>20 | 90<br>10 | 92<br>8 |
|---|---|---|---|---|---|---|---|
| Volumetric flow rate at expansion device entrance | [—] | 2.07 | 2.05 | 2.02 | 1.98 | 1.94 | 1.93 |
| Volumetric flow rate at expansion device exit | [—] | 2.05 | 2.04 | 2.02 | 2.00 | 1.98 | 1.97 |
| Power generation cycle efficiency | [—] | 1.01 | 1.01 | 1.01 | 1.01 | 1.01 | 1.01 |
| SP | [—] | 1.31 | 1.33 | 1.35 | 1.37 | 1.40 | 1.41 |

TABLE 37-continued

<Comparative example 10: mixture working fluid composition of cis-1,1,1,4,4,4-hexafluoro-2-butene and pentane; relative values of calculation conditions 1>

| Working fluid | 1st component<br>2nd component | | 95<br>5 | 97<br>3 | 98<br>2 | 99<br>1 | 99.9<br>0.1 |
|---|---|---|---|---|---|---|---|
| Volumetric flow rate at expansion device entrance | | [—] | 1.92 | 1.91 | 1.90 | 1.90 | 1.89 |
| Volumetric flow rate at expansion device exit | | [—] | 1.97 | 1.96 | 1.96 | 1.96 | 1.96 |
| Power generation cycle efficiency | | [—] | 1.01 | 1.01 | 1.01 | 1.01 | 1.00 |
| SP | | [—] | 1.42 | 1.42 | 1.43 | 1.43 | 1.43 |

Here, the relative value of the cycle efficiency is preferable larger than "1", and the relative value of the SP is preferably smaller than "1". When the volumetric flow rate at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 38

<Comparative example 11: mixture working fluid composition of cis-1,1,1,4,4,4-hexafluoro-2-butene and pentane; calculation conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | | [—] | 6.0 | 6.6 | 7.2 | 7.8 | 8.4 | 8.5 |
| Evaporator pressure | | [kPa] | 613 | 619 | 625 | 634 | 643 | 645 |
| Condenser pressure | | [kPa] | 118 | 118 | 119 | 120 | 120 | 120 |
| Pressure ratio | | [—] | 5.2 | 5.2 | 5.3 | 5.3 | 5.4 | 5.4 |
| Wetness | | [—] | — | — | — | — | — | — |
| Mass flow rate | | [kg/s] | 3.1 | 3.3 | 3.6 | 3.9 | 4.3 | 4.4 |
| Volumetric flow rate at expansion device entrance | | [m$^3$/s] | 0.130 | 0.128 | 0.126 | 0.123 | 0.120 | 0.119 |
| Volumetric flow rate at expansion device exit | | [m$^3$/s] | 0.702 | 0.696 | 0.690 | 0.683 | 0.675 | 0.674 |
| Pump power | | [kW] | 2.4 | 2.4 | 2.5 | 2.5 | 2.5 | 2.5 |
| Work of expansion device | | [kW] | 107.7 | 107.5 | 107.3 | 107.1 | 106.9 | 106.8 |
| Power generator output | | [kW] | 102.3 | 102.1 | 101.9 | 101.7 | 101.5 | 101.5 |
| Net work | | [kW] | 99.9 | 99.7 | 99.5 | 99.3 | 99.0 | 99.0 |
| Power generation cycle efficiency | | [%] | 10.5 | 10.5 | 10.5 | 10.5 | 10.4 | 10.4 |
| SP | | [m] | 0.057 | 0.058 | 0.059 | 0.060 | 0.061 | 0.062 |
| Temperature gradient (evaporator) | | [K] | 0.1 | 0.1 | 0.1 | 0.1 | 0.0 | 0.0 |
| Temperature gradient (condenser) | | [K] | 0.0 | 0.0 | 0.0 | 0.0 | 0.0 | 0.0 |

| Working fluid | 1st component<br>2nd component | | 95<br>5 | 97<br>3 | 98<br>2 | 99<br>1 | 99.9<br>0.1 |
|---|---|---|---|---|---|---|---|
| GWP | | [—] | 8.7 | 8.8 | 8.9 | 8.9 | 9.0 |
| Evaporator pressure | | [kPa] | 648 | 651 | 652 | 653 | 654 |
| Condenser pressure | | [kPa] | 120 | 120 | 120 | 120 | 120 |
| Pressure ratio | | [—] | 5.4 | 5.4 | 5.4 | 5.4 | 5.5 |
| Wetness | | [—] | — | — | — | — | — |
| Mass flow rate | | [kg/s] | 4.5 | 4.6 | 4.7 | 4.8 | 4.8 |
| Volumetric flow rate at expansion device entrance | | [m$^3$/s] | 0.118 | 0.117 | 0.117 | 0.116 | 0.116 |
| Volumetric flow rate at expansion device exit | | [m$^3$/s] | 0.671 | 0.670 | 0.669 | 0.669 | 0.668 |
| Pump power | | [kW] | 2.5 | 2.5 | 2.5 | 2.5 | 2.5 |
| Work of expansion device | | [kW] | 106.7 | 106.7 | 106.7 | 106.6 | 106.6 |
| Power generator output | | [kW] | 101.4 | 101.4 | 101.3 | 101.3 | 101.3 |
| Net work | | [kW] | 98.9 | 98.8 | 98.8 | 98.8 | 98.8 |
| Power generation cycle efficiency | | [%] | 10.4 | 10.4 | 10.4 | 10.4 | 10.4 |

TABLE 38-continued

<Comparative example 11: mixture working fluid composition of
cis-1,1,1,4,4,4-hexafluoro-2-butene and pentane; calculation conditions 2>

| | | | | | | |
|---|---|---|---|---|---|---|
| SP | [m] | 0.062 | 0.062 | 0.062 | 0.063 | 0.063 |
| Temperature gradient (evaporator) | [K] | 0.0 | 0.0 | 0.0 | 0.0 | 0.0 |
| Temperature gradient (condenser) | [K] | 0.0 | 0.0 | 0.0 | 0.0 | 0.0 |

Table 39 shows the relative values of the volumetric flow rate at the expansion device entrance, the volumetric flow rate at the expansion device exit, the power generation cycle efficiency, and the SP in comparative example 11 shown in Table 38 where the corresponding values of 1,1,1,3,3-pentafluoropropane are 1.

preferably smaller than "1". When the volumetric flow rate at the expansion device entrance and the volumetric flow rate at the expansion device exit of a mixture working fluid composition are each close to "1", such a mixture working fluid composition is usable as an alternative working fluid

TABLE 39

<Comparative example 11: mixture working fluid composition of
cis-1,1,1,4,4,4-hexafluoro-2-butene and pentane; relative values of calculation
conditions 2>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| Volumetric flow rate at expansion device entrance | [—] | | 2.09 | 2.06 | 2.02 | 1.98 | 1.93 | 1.91 |
| Volumetric flow rate at expansion device exit | [—] | | 2.03 | 2.02 | 2.00 | 1.98 | 1.96 | 1.95 |
| Power generation cycle efficiency | [—] | | 1.02 | 1.02 | 1.01 | 1.01 | 1.01 | 1.01 |
| SP | [—] | | 1.30 | 1.32 | 1.34 | 1.36 | 1.39 | 1.39 |
| Working fluid | 1st component<br>2nd component | | 95<br>5 | 97<br>3 | 98<br>2 | 99<br>1 | 99.9<br>0.1 | |
| Volumetric flow rate at expansion device entrance | [—] | | 1.90 | 1.88 | 1.88 | 1.87 | 1.86 | |
| Volumetric flow rate at expansion device exit | [—] | | 1.95 | 1.94 | 1.94 | 1.94 | 1.94 | |
| Power generation cycle efficiency | [—] | | 1.01 | 1.01 | 1.01 | 1.01 | 1.01 | |
| SP | [—] | | 1.40 | 1.41 | 1.41 | 1.42 | 1.42 | |

Here, the relative value of the cycle efficiency is preferable larger than "1", and the relative value of the SP is composition for an existing organic rankine cycle device using 1,1,1,3,3-pentafluoropropane.

TABLE 40

<Comparative example 12: mixture working fluid composition of
cis-1,1,1,4,4,4-hexafluoro-2-butene and pentane; calculation conditions 3>

| Working fluid | 1st component<br>2nd component | | 50<br>50 | 60<br>40 | 70<br>30 | 80<br>20 | 90<br>10 | 92<br>8 |
|---|---|---|---|---|---|---|---|---|
| GWP | [—] | | 6.0 | 6.6 | 7.2 | 7.8 | 8.4 | 8.5 |
| Evaporator pressure | [kPa] | | 941 | 952 | 964 | 979 | 997 | 1001 |
| Condenser pressure | [kPa] | | 118 | 118 | 119 | 120 | 120 | 120 |
| Pressure ratio | [—] | | 8.0 | 8.0 | 8.1 | 8.2 | 8.3 | 8.3 |
| Wetness | [—] | | — | — | — | — | — | — |
| Mass flow rate | [kg/s] | | 2.9 | 3.1 | 3.3 | 3.7 | 4.0 | 4.1 |
| Volumetric flow rate at expansion device entrance | [m$^3$/s] | | 0.078 | 0.076 | 0.075 | 0.073 | 0.071 | 0.070 |
| Volumetric flow rate at expansion device exit | [m$^3$/s] | | 0.677 | 0.672 | 0.665 | 0.658 | 0.651 | 0.649 |
| Pump power | [kW] | | 3.8 | 3.8 | 3.8 | 3.9 | 3.9 | 3.9 |
| Work of expansion device | [kW] | | 129.5 | 129.3 | 129.0 | 128.7 | 128.3 | 128.2 |
| Power generator output | [kW] | | 123.0 | 122.8 | 122.5 | 122.2 | 121.9 | 121.8 |
| Net work | [kW] | | 119.3 | 119.0 | 118.7 | 118.3 | 117.9 | 117.9 |
| Power generation cycle efficiency | [%] | | 12.6 | 12.5 | 12.5 | 12.5 | 12.4 | 12.4 |

TABLE 40-continued

<Comparative example 12: mixture working fluid composition of
cis-1,1,1,4,4,4-hexafluoro-2-butene and pentane; calculation conditions 3>

| | | | | | | |
|---|---|---|---|---|---|---|
| SP | [m] | 0.053 | 0.053 | 0.054 | 0.055 | 0.056 | 0.057 |
| Temperature gradient (evaporator) | [K] | 0.1 | 0.1 | 0.1 | 0.1 | 0.1 | 0.1 |
| Temperature gradient (condenser) | [K] | 0.0 | 0.0 | 0.0 | 0.0 | 0.0 | 0.0 |

| | | | | | | |
|---|---|---|---|---|---|---|
| Working fluid | 1st component | 95 | 97 | 98 | 99 | 99.9 |
| | 2nd component | 5 | 3 | 2 | 1 | 0.1 |
| GWP | [—] | 8.7 | 8.8 | 8.9 | 8.9 | 9.0 |
| Evaporator pressure | [kPa] | 1007 | 1011 | 1013 | 1016 | 1018 |
| Condenser pressure | [kPa] | 120 | 120 | 120 | 120 | 120 |
| Pressure ratio | [—] | 8.4 | 8.4 | 8.4 | 8.5 | 8.5 |
| Wetness | [—] | — | — | — | — | — |
| Mass flow rate | [kg/s] | 4.3 | 4.4 | 4.4 | 4.4 | 4.5 |
| Volumetric flow rate at expansion device entrance | [m³/s] | 0.069 | 0.069 | 0.068 | 0.068 | 0.068 |
| Volumetric flow rate at expansion device exit | [m³/s] | 0.647 | 0.646 | 0.645 | 0.644 | 0.644 |
| Pump power | [kW] | 3.9 | 3.9 | 3.9 | 3.9 | 3.9 |
| Work of expansion device | [kW] | 128.1 | 128.0 | 127.9 | 127.9 | 127.8 |
| Power generator output | [kW] | 121.7 | 121.6 | 121.5 | 121.5 | 121.5 |
| Net work | [kW] | 117.7 | 117.6 | 117.6 | 117.5 | 117.5 |
| Power generation cycle efficiency | [%] | 12.4 | 12.4 | 12.4 | 12.4 | 12.4 |
| SP | [m] | 0.057 | 0.057 | 0.057 | 0.058 | 0.058 |
| Temperature gradient (evaporator) | [K] | 0.1 | 0.1 | 0.1 | 0.1 | 0.0 |
| Temperature gradient (condenser) | [K] | 0.0 | 0.0 | 0.0 | 0.0 | 0.0 |

Table 41 shows the relative values of the volumetric flow rate at the expansion device entrance, the volumetric flow rate at the expansion device exit, the power generation cycle efficiency, and the SP in comparative example 12 shown in Table 40 where the corresponding values of 1,1,1,3,3-pentafluoropropane are 1.

at the expansion device entrance and the volumetric flow rate at the expansion device exit of a mixture working fluid composition are each close to "1", such a mixture working fluid composition is usable as an alternative working fluid composition for an existing organic rankine cycle device using 1,1,1,3,3-pentafluoropropane.

TABLE 41

<Comparative example 12: mixture working fluid composition of
cis-1,1,1,4,4,4-hexafluoro-2-butene and pentane; relative values of calculation
conditions 3>

| | | | | | | | |
|---|---|---|---|---|---|---|---|
| Working fluid | 1st component | 50 | 60 | 70 | 80 | 90 | 92 |
| | 2nd component | 50 | 40 | 30 | 20 | 10 | 8 |
| Volumetric flow rate at expansion device entrance | [—] | 2.14 | 2.10 | 2.06 | 2.00 | 1.94 | 1.93 |
| Volumetric flow rate at expansion device exit | [—] | 2.01 | 2.00 | 1.98 | 1.96 | 1.93 | 1.93 |
| Power generation cycle efficiency | [—] | 1.03 | 1.03 | 1.02 | 1.02 | 1.02 | 1.02 |
| SP | [—] | 1.28 | 1.30 | 1.32 | 1.35 | 1.37 | 1.38 |

| | | | | | | |
|---|---|---|---|---|---|---|
| Working fluid | 1st component | 95 | 97 | 98 | 99 | 99.9 |
| | 2nd component | 5 | 3 | 2 | 1 | 0.1 |
| Volumetric flow rate at expansion device entrance | [—] | 1.90 | 1.89 | 1.88 | 1.87 | 1.86 |
| Volumetric flow rate at expansion device exit | [—] | 1.92 | 1.92 | 1.92 | 1.92 | 1.91 |
| Power generation cycle efficiency | [—] | 1.01 | 1.01 | 1.01 | 1.01 | 1.01 |
| SP | [—] | 1.39 | 1.39 | 1.40 | 1.40 | 1.40 |

Here, the relative value of the cycle efficiency is preferable larger than "1", and the relative value of the SP is preferably smaller than "1". When the volumetric flow rate As shown in Tables 4 through 41, the mixture working fluid composition according to the present invention, when being applied to an organic rankine cycle, has a value of power generation cycle efficiency that is higher than, and a value of expansion device size parameter (SP) that is lower than, that of 1,1,1,3,3-pentafluoropropane working fluid described in Japanese Laid-Open Patent Publication No. Hei 2-272086 and Japanese Laid-Open Patent Publication No. 2007-6684. Namely, when the working fluid composition according to the present invention is used as a working fluid in an organic rankine cycle for converting thermal energy of 60° C. to 150° C. into mechanical energy (and electric energy), the cycle efficiency is higher and the device can be more compact than when 1,1,1,3,3-pentafluoropropane working fluid is used.

As shown in Tables 4 through 41, the mixture working fluid composition according to the present invention, when being applied to an organic rankine cycle, has a value of expansion device size parameter (SP) that is lower than that of cis-1-chloro-3,3,3-trifluoropropene working fluid described in Japanese PCT National Phase Laid-Open Patent Publication No. 2012-511087. Namely, when the working fluid composition according to the present invention is used as a working fluid in an organic rankine cycle for converting thermal energy of 60° C. to 150° C. into mechanical energy (and electric energy), the device can be more compact than when cis-1-chloro-3,3,3-trifluoropropene working fluid is used.

As shown in Tables 4 through 41, the mixture working fluid composition according to the present invention, when being applied to an organic rankine cycle, has a value of expansion device size parameter (SP) that is lower than, and a value of power generation cycle efficiency that is equivalent to, that of the mixture working fluid composition of cis-1,1,1,4,4,4-hexafluoro-2-butene and pentane described in Japanese PCT National Phase Laid-Open Patent Publication No. 2013-500374. Namely, when the working fluid composition according to the present invention is used as a working fluid in an organic rankine cycle for converting thermal energy of 60° C. to 150° C. into mechanical energy (and electric energy), the cycle performance that is equivalent to that provided by the mixture working fluid composition of cis-1,1,1,4,4,4-hexafluoro-2-butene and pentane is realized with a more compact device.

Example 13

30 g of working fluid was put into an autoclave formed of SUS316, heated to 150° C. and kept for 5 weeks. Presence/absence of a decomposition product and presence/absence of an isomer product of the working fluid were evaluated by use of gas chromatography. Table 42 shows the results.

TABLE 42

| | Purity [GC %] | | | |
|---|---|---|---|---|
| | Before the test | | 5 weeks later | |
| Working fluid | Working fluid | Geometrical isomer | Working fluid | Geometrical isomer |
| 1234ze (E) | 99.96 | 0.01 | 99.95 | 0.01 |
| 1234ze (Z) | 99.71 | 0.01 | 99.71 | 0.01 |
| 1233zd (E) | 99.97 | 0.01 | 98.96 | 1.00 |
| 1233zd (Z) | 99.83 | 0.00 | 19.77 | 79.98 |
| 245fa | 99.98 | — | 99.98 | — |

With any of the working fluids, no thermal decomposition product was observed. As is clear from the results shown in Table 42, no isomerization reaction of HFO-1234ze advanced either from the trans isomer or the cis isomer. Regarding HCFO-1233zd, a small amount of the trans isomer was confirmed to be isomerized into the cis isomer, and 80% of the cis isomer was confirmed to be isomerized into the trans isomer. It is seen that the working fluid compositions used in the present invention have high thermal stability at the temperature condition lower than or equal to 150° C.

Example 14

A thermal stability test was performed on cis-1,3,3,3-tetrafluoropropene (HFO-1234ze(Z)). In conformity to the sealed tube test of WS-K-2211, "Refrigerating machine oils", 1.0 g of working fluid and metal pieces (test pieces of iron, copper, and aluminum) were sealed in a glass test tube, heated to a predetermined temperature and kept for 2 weeks. The heating temperature was set to 175° C. and 200° C. Two weeks later, the external appearance, the purity and the acid content ($F^-$ ion) of the working fluid were measured to evaluate the thermal stability. Table 43 shows the results.

TABLE 43

| Temperature [° C.] | HFO-1234ze (Z) purity [GC%] | | Acid content (F) [ppm] | External appearance |
|---|---|---|---|---|
| | Working fluid | Geometrical isomer | | |
| Before the test | 99.78 | 0.00 | 0 | Colorless, transparent |
| 175 | 99.68 | 0.11 | 3 | Colorless, transparent |
| 200 | 99.63 | 0.15 | 2 | Colorless, transparent |

Example 15

A thermal stability test was performed on 1,1,1,3,3-pentafluoropropane (HFC-245fa). In conformity to the sealed tube test of JIS-K-2211, "Refrigerating machine oils", 1.0 g of working fluid composition and metal pieces (test pieces of iron, copper, and aluminum) were sealed in a glass test tube, heated to a predetermined temperature and kept for 2 weeks. The heating temperature was set to 175° C. and 200° C. Two weeks later, the external appearance, the purity and the acid content ($F^-$ ion) of the working fluid were measured to evaluate the thermal stability. Table 44 shows the results.

TABLE 44

| Temperature [° C.] | HFC-245fa purity [GC %] | Acid content ($F^-$) [ppm] | External appearance |
|---|---|---|---|
| Before the test | 99.97 | None | Colorless, transparent |
| 175 | 99.97 | <1 | Colorless, transparent |
| 200 | 99.97 | <1 | Colorless, transparent |

As is clear from the results shown in Tables 43 and 44, no thermal decomposition product of cis-1,3,3,3-tetrafluoropropene or 1,1,1,3,3-pentafluoropropane was observed. The acid content ($F^-$) generated as a byproduct after the thermal stability test was performed was minute. It is seen that the working fluids used in the present invention have high thermal stability even under a high temperature condition.

Example 16

In conformity to the compatibility test of a working fluid composition and refrigerating machine oil of WS-K-2211, "Refrigerating machine oils", 1.7 g of working fluid and 0.3 g of refrigerating machine oil were put into a thick glass test tube and cooled with liquid nitrogen, and thus a mixture of the working fluid composition and the refrigerating machine oil was solidified. After the mixture of the working fluid and the refrigerating machine oil was solidified, a top part of the test tube was connected to a vacuum pump to remove the remaining air, and the top part of the test tube was sealed by use of a gas burner. The sealed thick glass test tube was put into an thermostatic chamber cooled to −20° C., and kept still until the temperature of the thermostatic chamber and the temperature of the composition in the glass test tube became equal to each other. Then, the compatibility of the working fluid composition and the refrigerating machine oil was evaluated by visual observation. For evaluating the compatibility, the temperature of the isothermal tank was changed from −20 to +80° C. Tables 45 through 49 show the results. In Tables 45 through 49, "0" indicates that the working fluid and the refrigerating machine oil were compatible and uniformly mixed. "X" indicates that the working fluid and the refrigerating machine oil were separated into two layers, or that the composition was clouded.

For the compatibility test, the following five types of lubricant were used.

Mineral oil (MO): SUNISO 4GS (produced by Japan Sun Oil Company, Ltd.)
Polyolester oil (POE): SUN ICE T68 (produced by Japan Sun Oil Company, Ltd.)
Alkylbenzene oil (AB): ATMOS 68N (produced by JX Nippon Oil & Energy Corporation)
Polyalkyleneglycol oil (PAG): SUNICE P56 (produced by Japan Sun Oil Company, Ltd.)
Polyvinylether oil (PVE): Daphne Hermetic Oil FVC68D (produced by Idemitsu Kosan Co., Ltd.)

TABLE 45

<Mineral oil: SUNISO 4GS>

| Working fluid | Temperature [° C.] | | | | | |
|---|---|---|---|---|---|---|
| | −20 | 0 | 20 | 40 | 60 | 80 |
| HFO-1234ze(E) | X | X | X | X | X | X |
| HFO-1234ze(Z) | X | X | X | X | X | X |
| HFO-1233zd(E) | ◯ | ◯ | ◯ | ◯ | ◯ | ◯ |
| HFO-1233zd(Z) | ◯ | ◯ | ◯ | ◯ | ◯ | ◯ |
| HFC-245fa | X | X | X | X | X | X |

TABLE 46

<Polyolester oil: SUNICE T68>

| Working fluid | Temperature [° C.] | | | | | |
|---|---|---|---|---|---|---|
| | −20 | 0 | 20 | 40 | 60 | 80 |
| HFO-1234ze(E) | ◯ | ◯ | ◯ | ◯ | ◯ | ◯ |
| HFO-1234ze(Z) | ◯ | ◯ | ◯ | ◯ | ◯ | ◯ |
| HFO-1233zd(E) | ◯ | ◯ | ◯ | ◯ | ◯ | ◯ |
| HFO-1233zd(Z) | ◯ | ◯ | ◯ | ◯ | ◯ | ◯ |
| HFC-245fa | ◯ | ◯ | ◯ | ◯ | ◯ | ◯ |

TABLE 47

<Alkylbenzene oil: ATMOS 68N>

| Working fluid | Temperature [° C.] | | | | | |
|---|---|---|---|---|---|---|
| | −20 | 0 | 20 | 40 | 60 | 80 |
| HFO-1234ze(E) | X | X | X | X | X | X |
| HFO-1234ze(Z) | X | X | X | X | X | X |
| HFO-1233zd(E) | ◯ | ◯ | ◯ | ◯ | ◯ | ◯ |
| HFO-1233zd(Z) | ◯ | ◯ | ◯ | ◯ | ◯ | ◯ |
| HFC-245fa | X | X | X | X | X | X |

TABLE 48

<Polyalkyleneglycol oil: SUNICE P56>

| Working fluid | Temperature [° C.] | | | | | |
|---|---|---|---|---|---|---|
| | −20 | 0 | 20 | 40 | 60 | 80 |
| HFO-1234ze(E) | ◯ | ◯ | ◯ | ◯ | ◯ | ◯ |
| HFO-1234ze(Z) | ◯ | ◯ | ◯ | ◯ | ◯ | ◯ |
| HFO-1233zd(E) | ◯ | ◯ | ◯ | ◯ | ◯ | ◯ |
| HFO-1233zd(Z) | ◯ | ◯ | ◯ | ◯ | ◯ | ◯ |
| HFC-245fa | ◯ | ◯ | ◯ | ◯ | ◯ | ◯ |

TABLE 49

<Polyvinylether oil: Daphne Hermetic Oil FVC68D>

| Working fluid | Temperature [° C.] | | | | | |
|---|---|---|---|---|---|---|
| | −20 | 0 | 20 | 40 | 60 | 80 |
| HFO-1234ze(E) | ◯ | ◯ | ◯ | ◯ | ◯ | ◯ |
| HFO-1234ze(Z) | ◯ | ◯ | ◯ | ◯ | ◯ | ◯ |
| HFO-1233zd(E) | ◯ | ◯ | ◯ | ◯ | ◯ | ◯ |
| HFO-1233zd(Z) | ◯ | ◯ | ◯ | ◯ | ◯ | ◯ |
| HFC-245fa | ◯ | ◯ | ◯ | ◯ | ◯ | ◯ |

All the working fluids exhibited good compatibility with POE, PAG and PVE, which were synthetic oils. Regarding HCFO-1233zd containing chlorine, both of the trans isomer and the cis isomer exhibited good compatibility also with the mineral oil and the alkylbenzene oil.

According to the present invention, a mixture working fluid, for an organic rankine cycle, that is non-flammable or low flammable, has little influence on the environment, and has high heat transfer characteristics and high thermal energy conversion characteristics is provided. Also according to the present invention, an organic rankine cycle device that provides high heat transfer characteristics and high thermal energy conversion characteristics by use of the working fluid composition of the present invention is provided. According to the present invention, a method for replacing a working fluid having a high global warming potential with a novel working fluid composition is provided.

The present invention is directed to a method for converting thermal energy into mechanical energy when a non-flammable or low flammable working fluid composition having little environmental load is used as a working fluid for an organic rankine cycle system. This method is more preferably usable at an evaporation temperature higher than or equal to 60° C. and lower than or equal to 150° C., as compared with a conventional thermal energy conversion method using a hydrofluorocarbon working fluid. In addition, the high cycle efficiency and the excellent expansion device size parameter provided by the present invention significantly contribute to production of electric energy from thermal energy. The method according to the present invention realizes utilization of middle-to-low-temperature thermal energy, which has not been fully utilized so far, namely, reuse of the middle-to-low-temperature thermal energy as electric energy.

The invention claimed is:

1. A method for converting thermal energy into mechanical energy by use of an organic rankine cycle system accommodating a working fluid composition, the method comprising sequentially performing:
    evaporating the working fluid composition;
    expanding the working fluid composition;
    condensing the working fluid composition; and
    transferring the working fluid composition, while raising a pressure thereof, by a pump;
    wherein the working fluid composition contains cis-1,3,3,3-tetrafluoropropene at a ratio higher than or equal to 92.0% by mass and lower than or equal to 99.9% by mass and trans-1,3,3,3-tetrafluoropropene or 2,3,3,3-tetrafluoropropene at a ratio higher than or equal to 0.1% by mass and lower than or equal to 8.0% by mass; and has an evaporation temperature higher than or equal to 60° C. and lower than or equal to 150° C.

2. The method for converting thermal energy into mechanical energy according to claim 1, wherein the working fluid composition contains a lubricant.

3. The method for converting thermal energy into mechanical energy according to claim 1, wherein the working fluid composition further contains a stabilizer.

4. The method for converting thermal energy into mechanical energy according to claim 1, wherein the working fluid composition further contains a flame retardant.

5. The method for converting thermal energy into mechanical energy according to claim 1, wherein hot water, pressurized hot water or overheated steam having a temperature higher than or equal to 60° C. and lower than or equal to 150° C. is used as a heat source of an evaporator.

6. An organic rankine cycle device using the method for converting thermal energy into mechanical energy according to claim 1.

7. A method for replacing a working fluid in an organic rankine cycle device, wherein:
    the working fluid contains 1,1,1,3,3-pentafluoropropane as a main component; and
    the method includes supplying the working fluid used in the method for converting thermal energy into mechanical energy according to claim 1 to the organic rankine cycle device that uses, used, or is designed to use, the working fluid.

8. A method for converting thermal energy into mechanical energy by use of an organic rankine cycle system accommodating a working fluid composition, the method comprising sequentially performing:
    evaporating the working fluid composition;
    expanding the working fluid composition;
    condensing the working fluid composition; and
    transferring the working fluid composition, while raising a pressure thereof, by a pump;
    wherein the working fluid composition contains cis-1,3,3,3-tetrafluoropropene at a ratio higher than or equal to 80.0% by mass and lower than or equal to 99.9% by mass and 1,1,1,3,3-pentafluoropropane at a ratio higher than or equal to 0.1% by mass and lower than or equal to 20.0% by mass; and has an evaporation temperature higher than or equal to 60° C. and lower than or equal to 150° C.

9. The method for converting thermal energy into mechanical energy according to claim 8, wherein the working fluid composition contains cis-1,3,3,3-tetrafluoropropene at a ratio higher than or equal to 90.0% by mass and lower than or equal to 99.9% by mass and 1,1,1,3,3-pentafluoropropane at a ratio higher than or equal to 0.1% by mass and lower than or equal to 10.0% by mass.

10. The method for converting thermal energy into mechanical energy according to claim 8, wherein the working fluid composition contains a lubricant.

11. The method for converting thermal energy into mechanical energy according to claim 8, wherein the working fluid composition further contains a stabilizer.

12. The method for converting thermal energy into mechanical energy according to claim 8, wherein the working fluid composition further contains a flame retardant.

13. The method for converting thermal energy into mechanical energy according to claim 8, wherein hot water, pressurized hot water or overheated steam having a temperature higher than or equal to 60° C. and lower than or equal to 150° C. is used as a heat source of an evaporator.

14. A method for converting thermal energy into mechanical energy by use of an organic rankine cycle system accommodating a working fluid composition, the method comprising sequentially performing:
    evaporating the working fluid composition;
    expanding the working fluid composition;
    condensing the working fluid composition; and
    transferring the working fluid composition, while raising a pressure thereof, by a pump;
    wherein the working fluid composition contains cis-1,3,3,3-tetrafluoropropene at a ratio higher than or equal to 50.0% by mass and lower than or equal to 99.9% by mass and trans-1-chloro-3,3,3-trifluoropropene at a ratio higher than or equal to 0.1% by mass and lower than or equal to 50.0% by mass; and has an evaporation temperature higher than or equal to 60° C. and lower than or equal to 150° C.

15. The method for converting thermal energy into mechanical energy according to claim 14, wherein the working fluid composition contains cis-1,3,3,3-tetrafluoropropene at a ratio higher than or equal to 80.0% by mass and lower than or equal to 99.9% by mass and trans-1-chloro-3,3,3-trifluoropropene at a ratio higher than or equal to 0.1% by mass and lower than or equal to 20.0% by mass.

16. The method for converting thermal energy into mechanical energy according to claim 14, wherein the working fluid composition contains a lubricant.

17. The method for converting thermal energy into mechanical energy according to claim 14, wherein the working fluid composition further contains a stabilizer.

18. The method for converting thermal energy into mechanical energy according to claim 14, wherein the working fluid composition further contains a flame retardant.

19. The method for converting thermal energy into mechanical energy according to claim 14, wherein hot water, pressurized hot water or overheated steam having a temperature higher than or equal to 60° C. and lower than or equal to 150° C. is used as a heat source of an evaporator.

* * * * *